United States Patent [19]
Ito et al.

[11] Patent Number: 5,966,141
[45] Date of Patent: Oct. 12, 1999

[54] APPARATUS AND METHOD FOR ANIMATION USING TOPOLOGY

[75] Inventors: Hirofumi Ito; Yoshihisa Shinagawa; Tosiyasu Laurence Kunii, all of Tokyo, Japan

[73] Assignee: Monolith Co., Ltd., Tokyo, Japan

[21] Appl. No.: 08/847,936

[22] Filed: Apr. 28, 1997

[30] Foreign Application Priority Data

Sep. 3, 1996 [JP] Japan ................................. 8-233492

[51] Int. Cl.⁶ .................................................. G06T 17/00
[52] U.S. Cl. ............................................................ 345/473
[58] Field of Search ................................. 345/473–475, 345/419–421, 423–425

[56] References Cited

U.S. PATENT DOCUMENTS

| 4,385,634 | 5/1983 | Bowen | 600/407 |
| 4,574,240 | 3/1986 | Libove et al. | 324/306 |

FOREIGN PATENT DOCUMENTS

| 855233 | 2/1996 | Japan. |
| 855241 | 2/1996 | Japan. |

OTHER PUBLICATIONS

Yoshihisa Shinagawa, "A Study of a Surface Construction System Based on Morse Theory and Reeb Graph", Dissertation Submitted to the Department of Information Science, Faculty of Science, The University of Tokyo, (1991).

*Primary Examiner*—Almis R. Jankus
*Attorney, Agent, or Firm*—Fleshner & Kim

[57] ABSTRACT

An animation solid is created by an animation solid generator such that the shape of its cross section at t=t0 coincides with the shape of the contour of an object contained in a frame to be displayed at t=t0, wherein time t is set in the height z direction of the solid. For creation of this solid, topological considerations, including connected components and the tree structure of contours, are used. By chopping this solid, intermediate dividing can be performed. The basis of the topological geometry rests on Morse theory.

27 Claims, 45 Drawing Sheets

| INDEX | 0 | 1 | 1 | 2 |
|---|---|---|---|---|
| EXPRESSION OF SINGULAR POINTS | $x^2+y^2$ | $-x^2+y^2$ | $x^2-y^2$ | $-x^2-y^2$ |
SHAPE OF SINGULAR POINT NEIGHBORHOOD
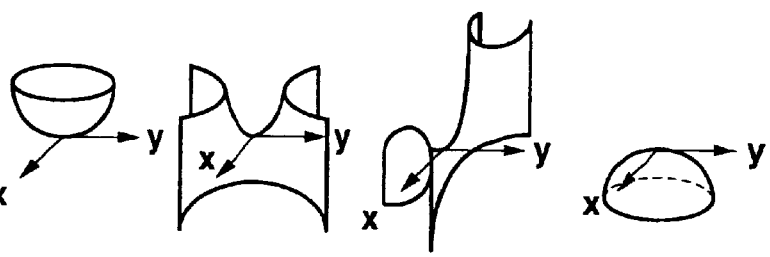
GIVE 0 CELL    GIVE 1 CELL    GIVE 1 CELL    GIVE 2 CELLS
EQUIVALENT CELL COMPLEX  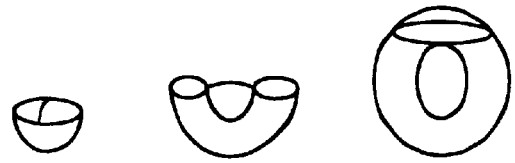
SET OF POINTS BELOW CROSS SECTION 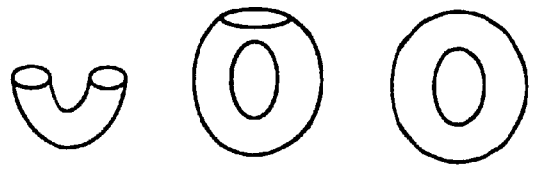
Fig. 2

```
program operators(input, output);
constant
          enabled = true;
          disabled = false;
          inside = true;
          outside = false;
          end_of_list = -1;
type
          contour_number = 0..max_contour_number;
          child_list = array[1..maxchildren] of contour_number;
          pointer_to_child_list = ↑ child_list;
var
          children: array[contour_number] of pointer_to_child_list;
          parent#: array[contour_number] of contour_number;
          number of children: array[contour_number] of integer;
          most_recently_created#: contour_number;
          contour_status: array[contour_number] of boolean;
```

FIG. 7

```
procedure add_listed_children(n:contour_number;clist:pointer_to_child_list);
          {details are omitted}
procedure remove_listed_children(n:contour_number;clist:pointer_to_child_list);
          {details are omitted}
function are_children(n:contour_number;clist:pointer_to_child_list):boolean;
          {details are omitted}
function in_list(n:contour_number;clist:pointer_to_child_list):boolean;
          {details are omitted}
function list_containing_only(n:contour_number):pointer_to_child_list;
var       n_as_list: pointer_to_child_list;
begin
          new(n_as_list);
          n_as_list ↑ [1]:= n;
          n_as_list ↑ [2]:= end_of_list;
          list_containing_only:= n_as_list;
end;
```

FIG. 8 a
```
procedure put_e2(n: contour_number);
begin
        if (contour_status[n] = disabled) then go to error;
        create_new_contour;
        add_listed_childred(n,list_containing_only(most_recently_created#));
end;
``` b
```
procedure put_e0(n: contour_number);
begin
        if ((contour_status[n] = disabled) or not all_successor_disabled(n))
                then goto error;
        contour_status[n]:= disabled;
end;
``` c
```
procedure put_e1_divide(n:contour_number); clist: pointer_to_child_list; inside:boolean);
begin
        if ((contour_status[n] = disabled) or (contour_status[parent#[n]]=disabled))
                then goto error;
        create_new_contour;
        add_listed_children(most_recently_created#, clist);
        if(not inside and are_children(parent#[n], clist)
        and not in_list(n, list)) or (clist = nil)) )
                then begin
                        remove_listed_children(parent#[n], clist);
                        add_listed_children(n,list_containing_only(most_recently_created#));
                end
        else if (inside and(are_children(n, clist) or (clist = nil)))
                then begin
                        remove_listed_children(n, clist);
                        add_listed_children(parent#[n],list_containing_only(most_recently_created#));
                end
        else go to error;
end;
``` d
```
procedure put_e1_merge(c1:contour_number; c2:contour_number);
begin
        if ((contour_status[c1] = disabled) or (contour_status[c2] = disabled))
                then goto error;
        if (c1 = parent#[c2]) then
                add_listed_children(parent#[c1], children[c2]);
        else if (parent#[c1] = parent#[c2] then
                add_listed_children(c1, children[c2]);
        else go to error;
        remove_listed_child(parent#[c2], list_containing_only(c2));
        contour_status[c2]:= disabled;
end;
```

FIG. 9

1. PUT_E2(0);
2. PUT_E2(1);
3. PUT_E1_DIVIDE(1, nil, INSIDE);
4. PUT_E1_DIVIDE(2, nil, INSIDE);
5. PUT_E2(2); PUT_E2(4);
6. PUT_E1_MERGE(1, 4);
7. PUT_E2(0);
8. PUT_E1_DIVIDE(3, list_containing_only(7), OUTSIDE);
9. PUT_E1_MERGE(3, 8); PUT_E0(7); PUT_E0(3);
10. PUT_E1_MERGE(1, 2);
11. PUT_E0(5);
12. PUT_E1_MERGE(1, 6);
13. PUT_E0(1);

FIG. 14

GUIDING CURVE

HEIGHT

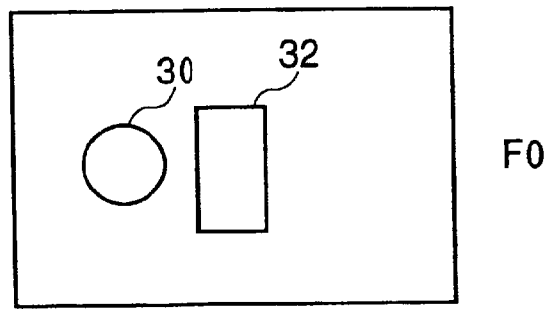
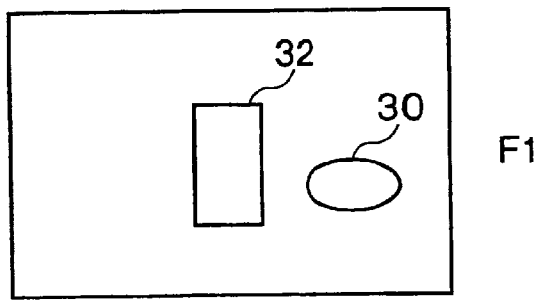
FIG. 35
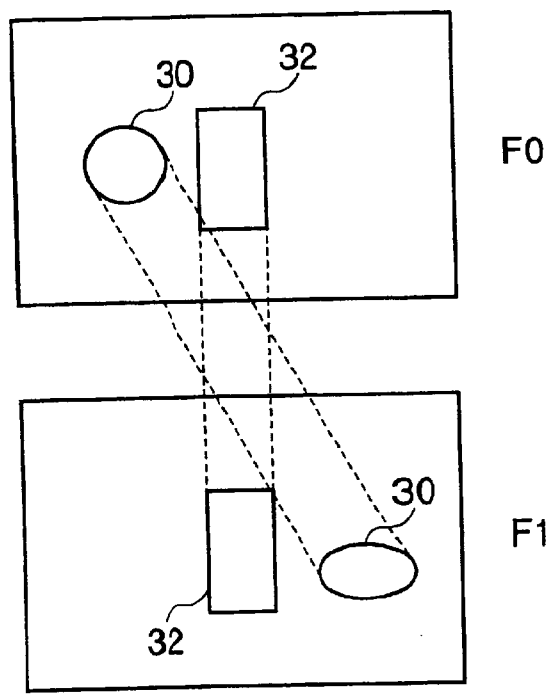
FIG. 36

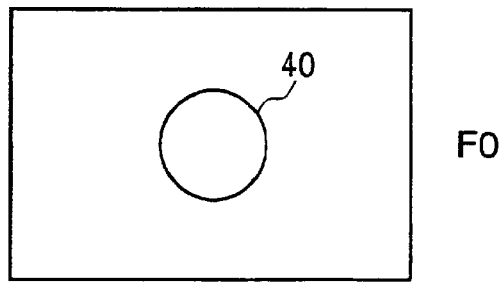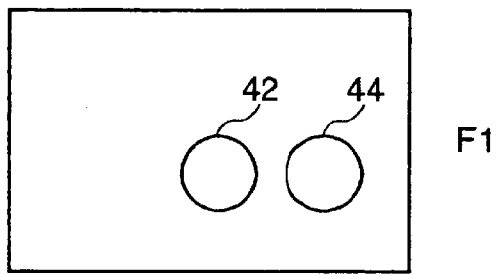
FIG. 42
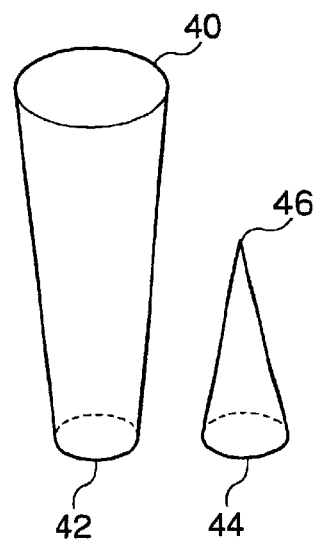
FIG.43

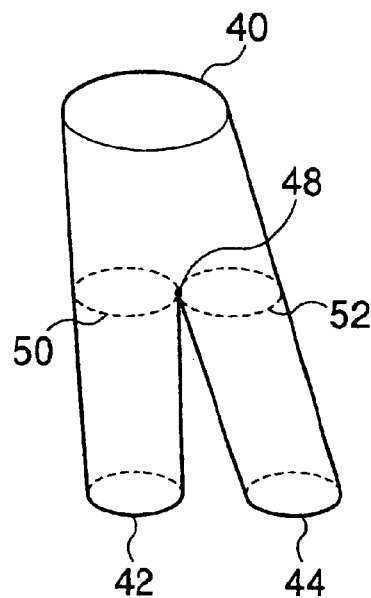
FIG.45
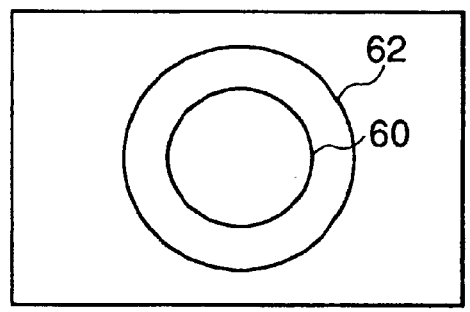
F0
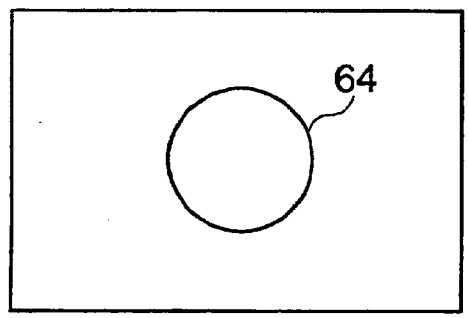
F1
FIG.47

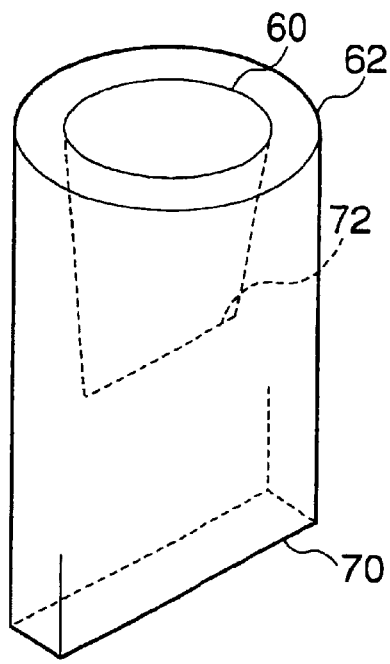
FIG.50
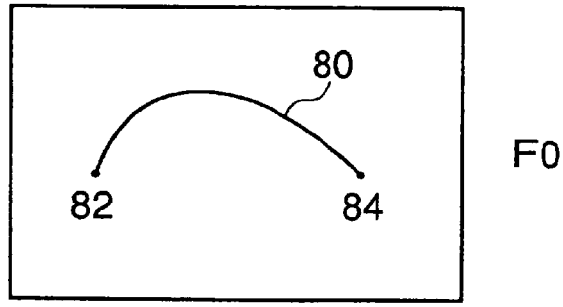
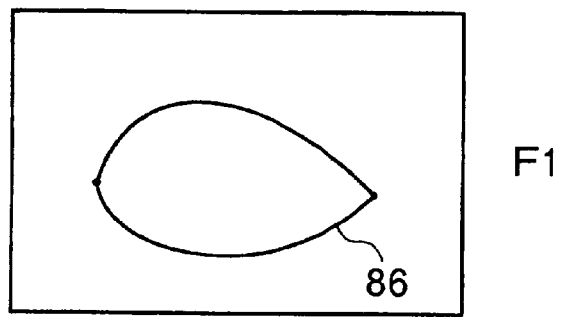
FIG. 52

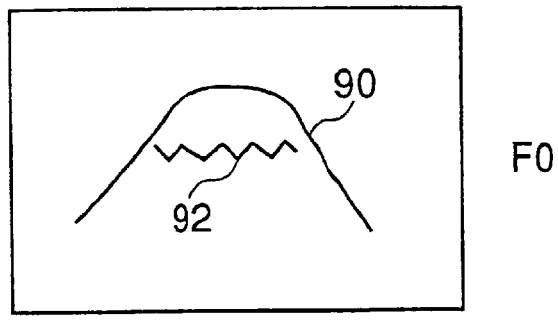
F0
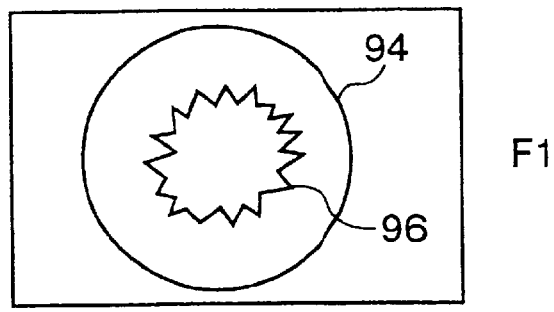
F1
FIG.55
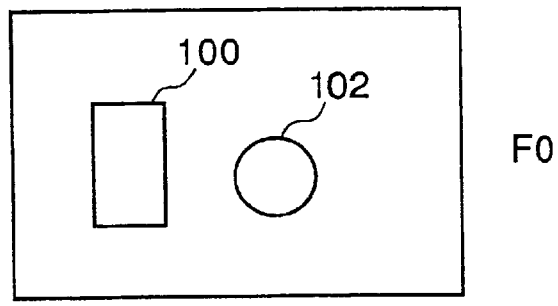
F0
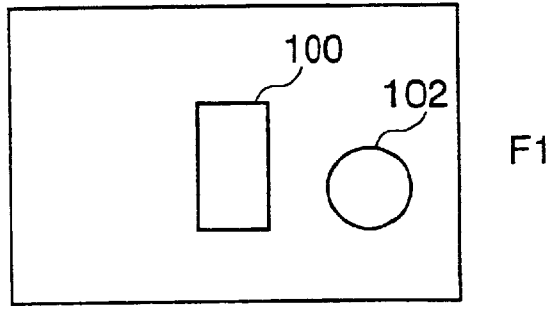
F1
FIG.56

APPARATUS AND METHOD FOR ANIMATION USING TOPOLOGY

BACKGROUND OF THE INVENTION

1. Field of the Invention

The present invention relates to a method for generating animation. In this method, frames containing images are classified as key frames or intermediate frames. This method can be used to automate intermediate dividing in animation creation, such as the techniques known as "inbetweening" or "tweening". The present invention also relates to recording media for storing a program for the above method and to an animation transmission/receiving system using this method.

2. Description of the Prior Art

Much of the modern world has only been made possible because of developments in techniques for communicating visual images. Visual images have grown, along with audio, to play a central role in today's information and entertainment culture. The increasing demand for images in a variety of forms has promoted development of imaging-related techniques and resulted in the creation of a global "video culture". The field of animation is a clear example. Improved video quality and the introduction of computer graphics (hereinafter "CG") has made it possible for generators to express refined and complicated images and works of art that would have remained forever trapped within the imaginations of their predecessors.

In NTSC, one of the currently common television standards, thirty frames per second (30 FPS) are generally displayed; a simplified display method called limited animation requires fifteen frames per second (15 FPS); while for motion pictures, twenty-four frames (24 FPS) is most common. The current situation requires a number of pictures no less than fifteen times the length of the animation in seconds in order to create animation. An hour long animation requires an enormous number of pictures, numbering in the tens of thousands.

In order to achieve more efficient picture production, an intermediate dividing method has been known where one animator first draws important frames called key frames and other animators then cooperate to draw the frames in between (hereinafter "intermediate frames"). The efficiency of this method is, however, still restricted because the pictures are hand drawn.

Recently, this intermediate dividing method has been applied to CG animation programs. In such programs, object movements are allotted according to a time axis. A key frame is allotted to a moment when an event occurs. An animation in which a nail is hammered may, for example, require two key frames, one showing a hammer flung up and another showing the hammer as it has just hit the nail. After being drawn, the key frames are first input into a computer. The positions of the object between the two key frames are then calculated for intermediate dividing.

The easiest applicable calculation is linear interpolation. With linear interpolation, an object is shown moving between two frames at a constant speed. Recently, other methods called ease-in (acceleration) and ease-out (deceleration) have also been put into practice to cope with object which do not move at a constant speed between key frames. Still further, a technique for generating natural and smooth intermediate frames has become available for expressing an object's moving path with a spline line.

Japanese Patent Laid-open No. Sho 60-191366 discloses a conventional general intermediate dividing technique. According to this invention, when a character on key frames consists of a plurality of curves, its shape on intermediate frames is created through calculation after a user manually designates correspondence of the respective curves between a plurality of key frames.

3. Problems to be Solved by the Invention

Although animation programs capable of intermediate dividing are able to improve the efficiency of animation creation, they impose unique burdens from those of free-hand drawing. For instance, to prepare for intermediate dividing a user must pre-input corresponding points between key frames or draw a polygon having vertexes which are corresponding points.

There is a more critical problem. Intermediate dividing according to an animation program may often produce illegally-shaped objects for intermediate frames. For instance, in an animation in which a hand is rotated by 180 degrees, automatic recognition of corresponding fingers between key frames is extremely difficult. A middle finger in one key frame may be erroneously related to an index finger in the following key frame and unrealistic intermediate frames may thus be created.

In general, research has been made in the field of image recognition so as to achieve correct corresponding of objects between frames. Various methods, such as area matching, have been suggested, but perfect correspondence may barely be possible, and will definitely require expensive hardware and long calculation times. Improving precision will require the preparation of a multitudinous number of key frames so that object movement between successive key frames will remain small. This is contrary to the effort to improve efficiency of animation creation. What makes it worse is that corresponding with sufficient precision is still very scare. In particular, if scenes showing a plurality of fingers overlapping or separated now and then due to rotation of the palm are intermingled, an image recognition approach is hardly achievable.

SUMMARY OF THE INVENTION

The present invention has the aims of providing correctly shaped objects for automatically created intermediate frames based a key frames, reducing the numbers of key frames that must be prepared, eliminating the need to supply frame correspondence information to key frames, generating intermediate frames using relatively easy hardware and for a short time, and of offering simple user operation.

In order to achieve these objects, the present inventors first analyzed cases which resulted in illegally-shaped objects drawn on intermediate frames. This analysis proved that this matter can be accounted for using the concepts of topology. That is, the reasonableness of an object's shape can be explained in terms of its topology. The present invention lays out a method for securing reasonably-shaped objects using an expanded concept of topology, particularly Morse theory (described later).

In the present invention, a solid is assumed such that its cross sectional shape is the same as the shape of an object drawn on a key frame. This solid is called an animation solid. Chopping an animation solid can provide the shape of that object in intermediate frames. In other words, a solid whose cross sectional shape coincides with the shape of an object for an intermediate frame at the position corresponding to that cross section is an animation solid.

For instance, provided that the first key frame contains a sphere A, and the second frame contains spheres B and C.

This case can be understood as that, in Case 1, one of the spheres B or C is the original sphere A itself and the other sphere is generated in an intermediate frame. Beside this understanding, it is also possibly understood that, as in Case 2, the sphere A splits into the spheres B and C. Many other ways of understanding are of course possible.

Either case can be accounted for in view of topology with an animation solid introduced. Concretely, Case 1 is described as "the spheres A and B belong to the same connected component, whereas the sphere C belongs to another connected component." That is, an animation solid is an assembly of two solids, one having a cross section consisting of the spheres A and B, the other having that consisting of the sphere C alone. On the other hand, Case 2 is described as "the spheres A, B, and C all belong to the same connected component." The animation solid splits or branches somewhere between the cross sections of the sphere A and of the spheres B and C. Branches can also be explained using topology.

As described above, in the present invention animation solids are created using the concepts of topology. This allows provision of reasonably-shaped objects for intermediate frames according to conditions depending on the situation. Given a general rule "a sphere does not split," for instance, the present invention reliably creates an intermediate frame according to the Case 1. A Split is treated as a branch in the field of topology. Possible shapes which an object may take can be clearly classified using topology.

(1) In one aspect of the present invention, a method is provided which classifies image frames into key frames and intermediate frames comprising key frame preparation step of preparing a plurality of key frames each having an object contained therein; and a solid generation step of generating an animation solid, the surface thereof being generated through matching of a cross sectional contour of the solid with a contour of the object contained in the key frames and through consideration of the topology of the solid.

In this aspect, image frames are first classified into either key frames or other, intermediate frames.

With this arrangement, a plurality of key frames are first prepared, and an animation solid is subsequently created. The shape of an animation solid is defined by the shapes of the plurality of its cross sections. The shapes of cross sections coincide with the shapes of objects in corresponding key frames. Once key frames are prepared, the surface of the animation solid is created focusing on the topology of the solid to thereby complete the solid.

Once an animation solid is completed, chopping of the solid can provide a desired intermediate frame. Thus, a small number of key frames are sufficient to create a larger number of intermediate frames. An animation database can be created by storing animation data in the form of animation solids.

(2) According to another aspect of the invention, the solid creation step comprises; a corresponding contour detection step of detecting correspondence of contours between adjacent key frames based on proximity of contours of objects contained in the adjacent key frames; and a surface creation step of generating a surface between corresponding contours using homotopy. Taking the above Case 1 as an example, whether the sphere A becomes sphere B or C can be judged by calculating the proximity between the spheres A and B, and between the spheres A and C. For proximity evaluation, points are first determined on the contour of the sphere A having an equal interval. Then, the distances from the respective points of the sphere A to the closest points on the contour of the sphere B are obtained. Proximity is evaluated based on the total of these distances. The proximity is similarly obtained in sphere C. Given that the value relating to sphere B is smaller, the sphere A is considered as having become the sphere B. Repetition of this process can identify pairs of contours corresponding to each other between different key frames (hereinafter "corresponding contour pairs").

A surface is created between paired corresponding contours using the concept of homotopy. Homotopy, whose precise definition will be given later, is in short a function F for successive modification of a certain function f into a different function g. Given homotopy F is defined that, when one of paired corresponding contours is a function f and the other is a function g, a surface will be created between the paring corresponding contours according to homotopy F. Repetition of this processing for all corresponding contour pairs will complete an animation solid.

In this aspect, comprehension of correspondence between contours can be automated based on an empirical rule such that close contours may correspond to each other between different key frames. This automation allows users to draw by free hand an image for a key frame, eliminating the need to input image correspondence between key frames. This also makes it possible to provide reasonably-shaped objects for intermediate frames.

In this aspect, the surface of a solid is created according to the concept of homotopy. Thus, if a function for homotopy is once determined, a surface can be uniquely expressed by that function. In general, unique determination of a method for pasting surface patches is rarely achievable for solid modeling. This difficulty hinders automation of surface pasting. As a sub-effect in the present invention, an animation solid can be uniquely expressed, allowing unique expression of the animation itself.

(3) According to still another aspect of the invention, the corresponding contour detection step deduces the occurrence of spontaneous disappearance or generation of a contour between the key frames when numbers of contours does not coincide between the key frames. "Spontaneous disappearance" and "spontaneous generation" refer to disappearance and generation irrespective of branching or other external factors.

This aspect is equivalent to selection of the above Case 1. That is, the contour of the sphere A is successive to that of the sphere B in Case 1, whereas that of the sphere C is spontaneously generated in an immediate frame. In Case 2, on the other hand, the contour of the sphere A branches into the spheres B and C, causing no spontaneous contour generation.

This aspect is based on an empirical rule stating, "there is only a low probability that an existing 3D object will split or merge." Therefore, in the above example, Case 1 is more likely to occur than Case 2. Thus, the method according to this aspect can in most cases succeed in providing desired animation without receiving case specification by users, thereby simplifying user handling.

(4) According to yet another aspect of the invention, the corresponding contour detection step deduces spontaneously disappearing or generated contours by referring to a tree structure of contours. When, for instance, a torus is rotated by 90 degrees, an initially seen central hole may gradually become invisible. When a contour includes another contour, the former is referred to as a parent contour, and the latter is referred to as a child contour. The external contour of the torus is a parent contour, while the internal contour is a child contour. Thus, the contour to disappear is a child contour. In a general 3D object, a child contour can exist only in cases where a parent contour has existed. A parent contour will not disappear and leave only a child contour behind. Similarly, a spontaneously generated contour will never be a parent contour. In this aspect, contours to spontaneously disappear or be generated are presumed in the above point of view. "A tree structure" represents a parent-child relation of contours, and allows the above presumption.

In this aspect, users can easily operate the system, without the need to laboriously specify the contours to spontaneously disappear, or the like.

(5) According to further another aspect of the invention, the corresponding contour detection comprehends branches of contours based on numbers of connected components of the animation solid. In the above example using spheres, the number of concerned connected components is two in Case 1, while the number of contours varies from one to two without branches. This case can be explained generally as "a contour does not branch if the number of contours is less than that of connected components." In Case 2, on the other hand, the number of concerned connected components is one, while the number of contours similarly varies from one to two. In this case, the contour branches. This case can thus be explained generally as "a contour branches if the number of contours is more than that of connected components."

When the number of connected components is given beforehand, occurrence or non-occurrence of branching usually can be automatically anticipated from the number of contours.

(6) According to yet further another aspect of the invention, the key frame preparation step prepares key frames in which 2D shapes of objects become non-homeomorphic with time. An example of a critical frame is a frame at the very moment when one object is extended to bifurcate into two objects.

In this aspect, a topological change of an object is reflected to a key frame corresponding to the moment when the topology actually changes. This means that the topology is not changed in intermediate frames. This is preferable for surface creation by means of homotopy, because homotopy itself is a successive function and a surface created as a locus of homotopy does not change the topology of an animation solid.

In this aspect, the probability of obtaining a reasonably-shaped object for intermediate frames is increased because a topological change is specified using key frames and frames other than key frames are created using the concept of homotopy, which does not change the topology. In this aspect, the system dose not need to presume a topological change. In actual animation creation, animators often use a critical frame as a key frame, often unconsciously, so that this aspect can be smoothly implemented.

(7) According to yet still another aspect of the present invention relates to a system for transmitting animation. The system classifies an animation creation system which classifies image frames into key frames and intermediate frames, comprising a transmitter for transmitting a plurality of key frames and an animation solid having cross sectional contours each coinciding with a contour of an object contained in the key frame; and a receiver for receiving the key frames and the animation solid.

With this arrangement, the 2D shape of an object contained in an intermediate frame is obtained based on the shape of a cross section obtained by chopping an animation solid received via this system's receiver. Successive display of more than a certain number of intermediate frames may create a desired animation.

With this system, animation can be transmitted with a very small amount of transmission data.

BRIEF DESCRIPTION OF THE DRAWINGS

The above and the other objects, features, and advantages, will become further apparent from the following description of a preferred embodiment taken in conjunction with the accompanying drawings wherein:

FIG. 2 shows the relation among indices of singularities, k-cells, and objects to be coded with them;

FIG. 7 shows an example of programming operators in pseudo-Pascal code;

FIG. 8 shows an example of programming operators in pseudo-Pascal code;

FIG. 9 shows an example of programming operators in pseudo-Pascal code;

FIG. 14 is a list of operators for constructing an object;

FIG. 35 shows key frames F0 and F1 of the first embodiment;

FIG. 36 shows correspondence between images in key frames F0 and F1 determined at S6 of the first embodiment;

FIG. 42 shows key frames F0 and F1 in Example 1 of the second embodiment;

FIG. 43 shows an animation solid created in Example 1 of the second embodiment.

FIG. 45 shows an animation solid created in Example 2 of the second embodiment;

FIG. 47 shows key frames F0 and F1 in Example 3 of the second embodiment;

FIG. 50 shows an animation solid created in Example 4 of the second embodiment;

FIG. 52 shows images on key frames F0 and F1 for use in explaining the function 1 of the third embodiment;

FIG. 55 shows key frames F0 and F1 for use in explaining the advantage of the function 1 of the third embodiment;

FIG. 56 shows key frames F0 and F1 for use in explaining the function 2 in the third embodiment;

DESCRIPTION OF THE PREFERRED EMBODIMENTS

Although the preferred embodiments of the present invention will be described later, its true scope is much broader than these preferred embodiments and the following "premised technique" are introduced in order to help explain the subject area.

These "premised techniques" are based on a dissertation given by one of the inventors Dr. Yoshihisa Shinagawa of Tokyo University, in 1993. The full dissertation is one publication that may be used to help understand the present invention.

The premised techniques aim at the precise 3D expression of a solid with the help of topology. The ultimate object of the present invention, on the other hand, is to create a cross sectional 2D shape of a solid, a solid different use from the premised techniques. In the present invention, frame images for animation are obtained, based on the cross sectional shape of a solid. In the following, premised techniques are first quoted and preferred embodiments of the present invention are subsequently described referring to the premised techniques with necessary modifications and expansion added thereto.

Premised Techniques
[1] Surface Coding Based on Morse Theory
(1) Introduction 3D objects may be interpreted using Morse theory as a mathematical tool. However, Morse theory alone is not sufficient for precise 3D surface coding. The following explains the reasons for this, and describes an effort to solve that problem by developing some effective extensions to Morse theory.

The shape of a solid or a surface in 3D space is generally represented as a sequence of symbols for coding. In the case of natural objects, a shape can have so many degrees of freedom that coding them demands certain simplification. Topology is a mathematical means for performing such simplifications.

(2) Coding system requirements

The shape data of natural objects is often available in the form of cross sections, such as those of X-ray computerized tomography. The coding of this data should be usable by surface reconstruction systems that generate triangular patches or other interpolations between contours on adjacent cross-sectional planes. The coding method presented here is based on contours from cross-sectional planes. (Hereafter, "contour" refers to a cross-sectional contour).

This coding system should be able to code objects that have branches, handles, and internal structures with multi-layered surfaces, such as the semicircular canals of the human inner ear. To code such objects, one cannot merely record the set of contours on a series of cross-sectional planes; that does not fully account for the surface.

Figure 1:
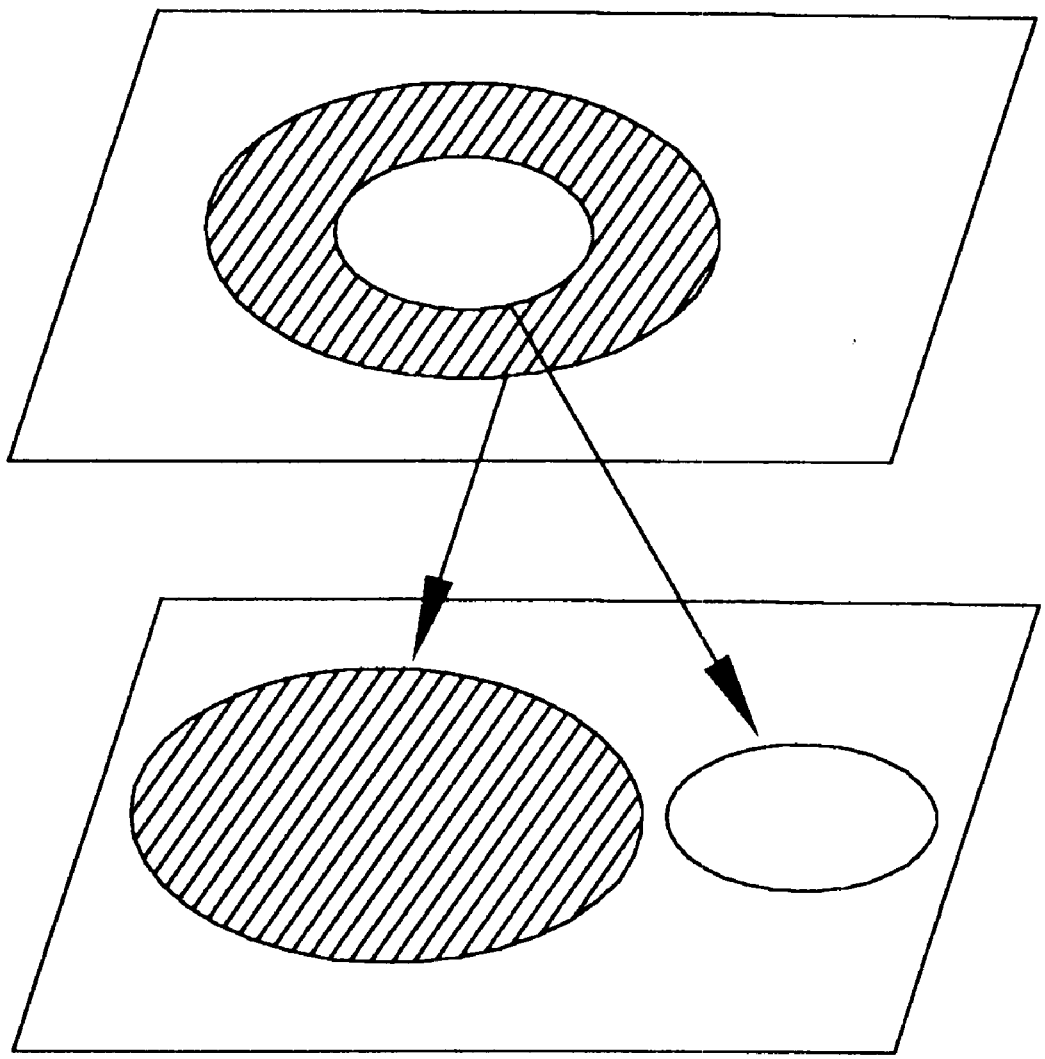
FIG. 1 shows an illegal transformation of contours.

This coding system must be able to maintain the topological integrity of the coded surface. Otherwise, the coded surface might not be physically valid. FIG. 1 shows an illegal change of contour structure. There are two contours and one is contained by the other. The former cannot exceed the bounds of the latter on the other cross-sectional plane. Unless this rule is observed, proper coding cannot be achieved. Surface coding systems are required to maintain the topological integrity of a surface.

(3) Classical Morse theory

Morse theory was primarily motivated by the calculus of variations, where the problem is describing the minima of the functional on an infinite dimensional space of paths. Conversely, one can also use the minima of a functional to describe some topological features of spaces that are otherwise hardly describable. The following is a brief look at Morse theory.

◎ Differentiable manifolds

The spaces to which Morse theory can be applied are differentiable manifolds. Finite dimensional manifolds will next be considered.

Given an integer n, an n-dimensional manifold is a topological space such that any point has a neighborhood that can be mapped, one-to-one and bicontinuously, on a subset of the n-dimensional space $R^n$. Such a mapping is called a chart and provides coordinates for the points in its domain, which correspond to latitude and longitude in the case of the globe. For the manifolds to be p times differentiable, the transformation from one coordinate system to another should also be p times differentiable for points in the range of two different charts.

One can thus see a manifold as being made of pieces of $R^n$ overlapping in a differentiable way. For instance, a line and a circle can be given with structures of 1-dimensional manifolds, and the surface of a sphere can be made a 2-manifold using at least two charts. One can make the surface of a torus a 2-manifold using at least four charts. Removing knotted circles from $R^3$ gives examples of 3-manifolds, and higher dimensional manifolds appear concretely as configuration spaces of robot arms.

◎ Differentiable mapping and singularities

Using charts, mapping from a p-manifold to an n-manifold can be numerically expressed as mapping from pieces of $R^p$ to pieces of $R^n$. For this mapping, one can check differentiability: A mapping is of class $C^k$ if its components are k times continuously differentiable.

Let's define a height function on coordinates, which returns the height of a given point (such as z-coordinate of an object embedded in 3D-space). Jacobian matrix of a height function h: $R^2 \rightarrow R$ is given as $$J = \begin{pmatrix} \frac{\partial h}{\partial x_1} \\ \frac{\partial h}{\partial x_2} \end{pmatrix} \quad [1]$$

One can compute a Jacobian matrix at each point. Its rank is at most min(n, p). Points at which the rank of the Jacobian matrix reaches this maximal value are called "regular points", while the others are called "singular points" or "critical points". Singular points concerning the height function include "peak points", "saddle points" and "pits". In other words, at singular points, the vector of Jacobian matrix becomes zero, and the normal vector is oriented to the same direction as that of height. Points on which singular points are mapped are called singular values.

◎ Hessian matrix and index

For a mapping from an n-manifold to R (we call such mapping "functions on a manifold"), a point is critical if and only if all partial derivatives are null. At such a point the aforementioned function is thus approximated by a quadratic form based on second order partial derivatives, the matrix of which is called the Hessian matrix, and its components are described as follows.

$$h = \begin{pmatrix} \frac{\partial^2 f}{\partial x_1^2} & \frac{\partial^2 f}{\partial x_1 \partial x_1} & \cdots & \frac{\partial^2 f}{\partial x_1 \partial x_n} \\ \frac{\partial^2 f}{\partial x_1 \partial x_1} & \frac{\partial^2 f}{\partial x_2^2} & \cdots & \frac{\partial^2 f}{\partial x_2 \partial x_n} \\ \cdots & \cdots & \cdots & \cdots \\ \frac{\partial^2 f}{\partial x_n \partial x_1} & \frac{\partial^2 f}{\partial x_n \partial x_2} & \cdots & \frac{\partial^2 f}{\partial x_n^2} \end{pmatrix} \quad [2]$$

Figure 4A:
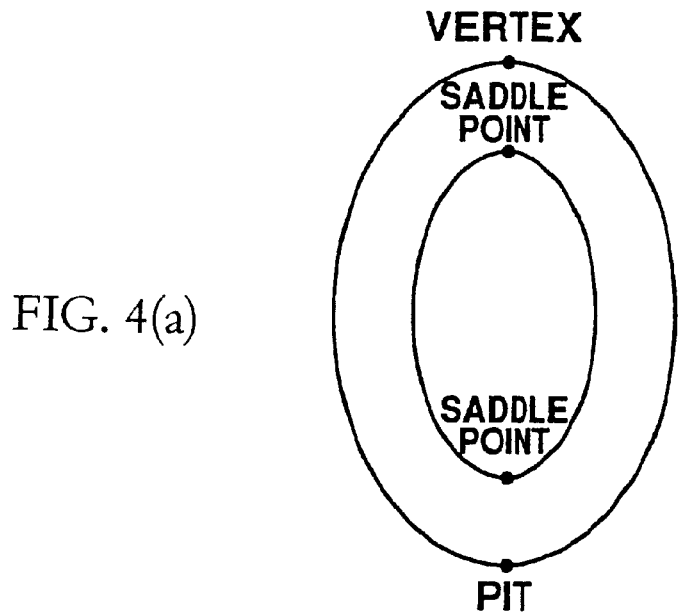
FIG. 4a shows the relation between a torus and its Reeb graph.
Figure 4B:
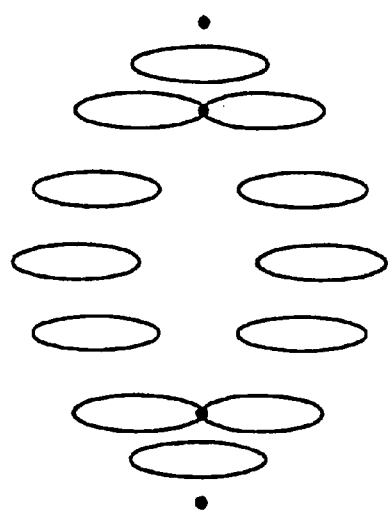
FIG. 4b shows the relation between a torus and its Reeb graph.
Figure 4C:
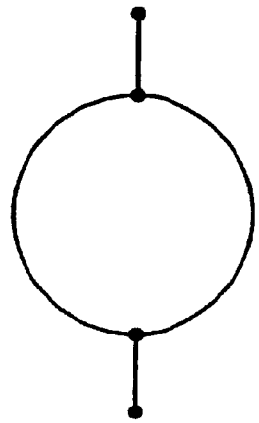
FIG. 4c shows the relation between a torus and its Reeb graph.

The number of negative definite of Hessian matrix at the singular point is called the index of the singularity. As shown in FIG. 2 below, the index is also equal to the number of minus signs in the reduced form. Indices of peak point, saddle point and pit are 2, 1 an 0, respectively. As shown in FIGS. 4a–4c, a torus has one, two and one critical points having indices 2, 1 and 0, respectively.

A singularity is not degenerate if the Hessian matrix has rank n at that critical point, and it is then called "nondegenerate". Any $C^2$ function can be approximated by a Morse function. A function on a manifold is called a Morse function if none of the singularities are degenerate. Therefore, the critical points of a Morse function are isolated, so for a compact manifold, only a finite number of them exist. It can be convenient to require that no two singular values be equal, which leads to a similar approximation result.

◎ Homotopy types

Given a manifold and a Morse function on it and knowing the sequence of the indices of that function's singularities, Morse theory shows that a topological space with the same homotopy type as the manifold can be constructed as a cell complex after a sequence of operations corresponding to the singularities of the Morse function.

For any real number representing a height, the cell gives a model for the part of the manifold whose points are below that heights. As R is scanned from top to bottom, the topology of the complex does not change between two successive singular values, but each time a singular value is crossed, the cell complex is updated by attaching a k-cell to the former complex, where k is the index of the singularity. In brief, the shape of an object can be retrieved by attaching cells with the same dimensions as those of critical points.

FIG. 2 shows the relationship among indices of singularities, k-cells and an object to be coded by them. Here, the object is represented by a torus. A shown in FIG. 2, each time the threshold crosses critical heights, the topology of the set of points below the threshold changes. This change is topologically equivalent to attaching a k-cell. As shown in this Figure, 2-cell (k=2), 1-cell (k=1), and 0-cell (k=0) can be represented by shapes such as a bowl laid upside down, a string, or a single point, respectively. Shape of the original object can be retrieved by attaching those cells to build a cell complex followed by transforming it as in clay works. In the case of torus, it can be built by attaching one 2-cell, two 1-cells, and one 0-cell.

Figure 3A:
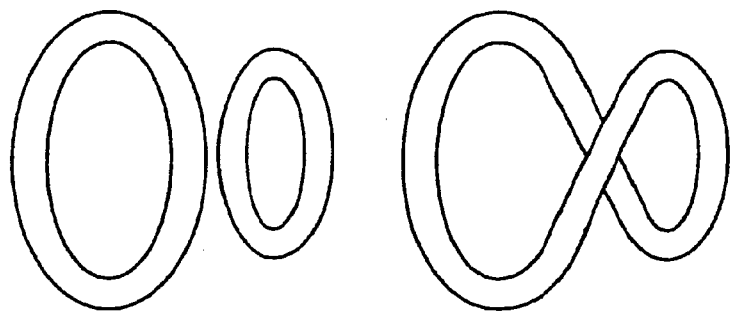
FIG. 3a shows one pair of surfaces with the same sequence of Morse indices.
Figure 3B:
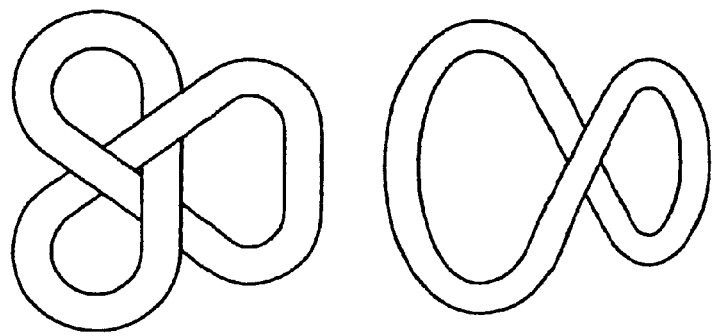
FIG. 3b shows another pair of surfaces with the same sequence of Morse indices.
Figure 3C:
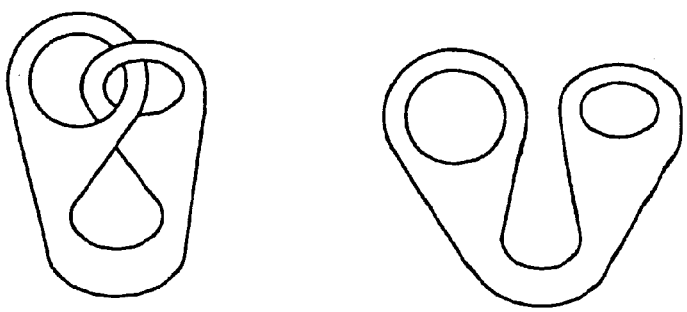
FIG. 3c shows still another pair of surfaces with the same sequence of Morse indices.

Note that the mere sequence of indices does not completely describe the cell complex. FIGS. 3a–3c show three pairs of surfaces with the same sequences of Morse indices, respectively. Thus, with the sequence of indices only, the cell complex cannot be completely determined. Therefore, one must know which connected components of the cross section will be involved in attaching each cell.

G. Reeb proposed considering a graph obtained from the manifold as a topological quotient space. The Reeb graph is to represent the mutual relationship of singularities, and is obtained by representing the object's surface with contour lines and the connected components of each coordinate with a single point. He did this by identifying in the manifold (assumed to be compact) all the points that have the same value under the Morse function and that are in the same connected component as the corresponding cross section. That is, the connected components of the part of the manifold situated strictly between two critical levels are thus represented by separate line segments—the edges of the graph. Each singularity corresponds to a vertex of the graph. The Reeb graph can be said to be a graph representing the skeleton of an object.

FIGS. 4a–4c show the relationship between a torus and the Reeb graph. FIG. 4a shows an original torus, FIG. 4b its cross sections, and FIG. 4c its Reeb graph, respectively. Disjointed cross-sectional circles on the same plane in FIG. 4b correspond to the separate two edges in FIG. 4c.

(4) Limits of the theory

Importantly, using Morse theory in this classical way permits only the recovery of the manifold's intrinsic topological properties. The sequence of indices does not code the way the manifold is embedded in space. For instance, you cannot determine whether an embedded torus is knotted in space, since both possible configurations can lead to the same singularities, as shown in FIG. 4b. The existence of links (shown in FIG. 4c) is another feature overlooked by simple Morse coding.

(5) Extending Morse coding

This section is restricted to the case of surfaces associated with compact 2-manifolds of class $C^2$ (that are $C^2$ embedded in 3D space). It is desired that this Morse function on the surface to be induced by a height function in space. In fact, it is actually sufficient to slightly rotate a $C^2$ surface to have singularities become nondegenerate, thereby enabling its height function to become Morse.

Morse theory also states that between two critical levels (heights of the planes containing critical points) the topological type of the section does not change. Thus, a number of more or less bent cylinders can be used to model the surface between two such levels. Since nonsingular cross sections are made of circles embedded in a plane, the possible nested configuration call for hierarchical and structural coding—grouping plural circles that are contained in the same circle.

Besides information relative to the Reed graph (that is, on how vertices are connected to each other), an extended coding is proposed which adds more information to the Morse index—information about the way cylinders are exchanged and turn around each other between two successive critical values.

(6) Coding system example

The prototype coding system will next be explained. This system describes a surface by attaching a k-cell to it and tracking the changes in the hierarchical structure of contours on cross-sectional planes. Operators are introduced to describe the attachment of cells and code the surface. The ionic representation of cells attached by the operators enables easy understanding of the structure of the surface to be coded.

The major advantage of this coding system is that the topological integrity is guaranteed by the resulting code. As shown in FIG. 1, not all changes in the hierarchical structure of contours between cross-sectional planes define a valid physical surface. That is, merely coding the hierarchical structure of contours on the cross-sectional planes does not guarantee topological integrity. Therefore, the operations that cause the changes in the hierarchical structure of contours must also be coded.

◎ Contours with parent-child relations

The method for representing the hierarchical structure of contours will next be described. Here, a tree structure is used.

Figure 5A:
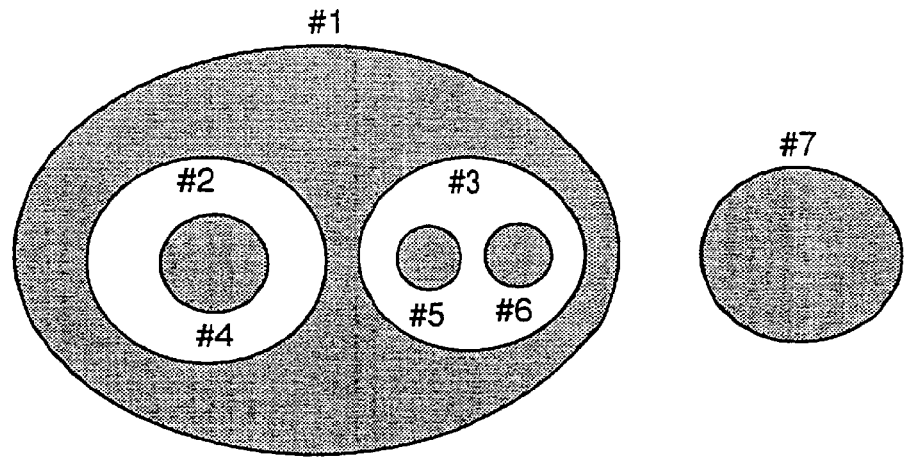
FIG. 5a shows the parent-child relation of contours.
Figure 5B:
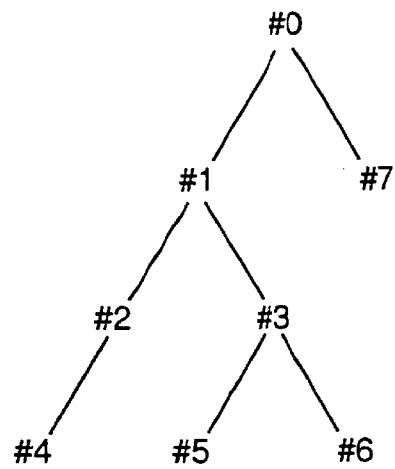
FIG. 5b shows the tree structure of contours having a parent-child relation.

When a contour contains another contour, the former is called the parent contour of the latter and the latter is called the child contour of the former. FIGS. 5a and 5b show the parent-child relation of contours and its tree structure representation, respectively. The parent-child relation can be nested, as shown in FIG. 5a. In the following, for example, contour Number 1 is abbreviated #1. It is the parent contour of #2, which in turn is the parent contour of #4. For convenience, contours that have no parents, such as #1 and #7, are described as the child contours of "virtual contour #0". Therefore, #0 comes to the top of the tree structure.

We define an array parent #[ ] to show the parent of the given contour. In the example above, parent#[1]=0. On the other hand, the child contours of a contour are listed in an array children, to which the pointer is contained. For example, the pointer to the child contours of #3 is contained in children[3] and the child contours #5 and #6 are represented as children[3]↑[1]=5 and children[3]↑[2]=6.

For convenience, contours having the same parent contours are called sibling contours. In FIG. 5a, #2 and #3 are sibling contours. The parent's parent contour is called the grandparent contour and the child's child contour is called grandchild contour. Also, a contour in whose interior the object exists is called a solid contour and a contour in whose interior the object does not exist is called a hollow contour. In FIG. 5a, #1, #4, #5, #6, and #7 are solid contours, while #2 and #3 are hollow contours.

◎ Operators for attaching cells

There are defined four operators: Put_e0, Put_e1_merge, Put_e1_divide, and Put_e2. These paste the cells. In what follows, a k-cell is abbreviated to $e^k$.

Construction proceeds from the top to the bottom of an object. The process ends when it is no longer possible to attach cells. The contour structure on the cross-sectional planes is used to represent the status of the surface which the operators are constructing.

Figure 6:
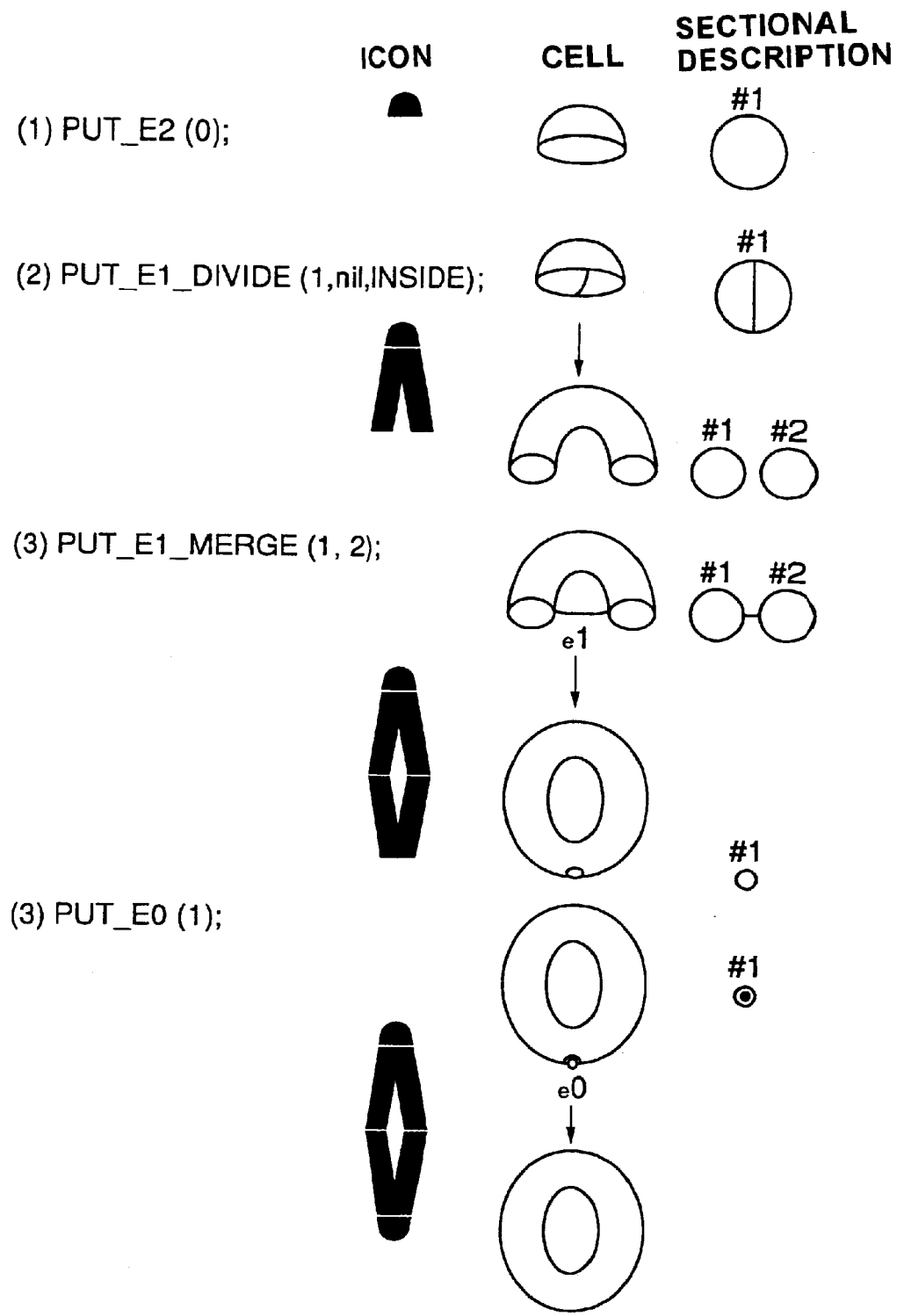
FIG. 6 is a diagram for explaining a method for encoding a torus using operators.

FIG. 6 shows methods for constructing a torus using these operators. In the following, functions of the operators will be described with reference to this Figure.

1. First, Put_e2(0) is used to create a cell $e^2$ as shown at the top of FIG. 6. The parameter "0" of Put _e2(0) means that #1 is created inside #0, which is the virtual contour. The cross section of this cell is shown under "Cross sectional representation" in the same Figure. As shown in this Figure, Put_e2 has the function to create a contour on a cross-sectional plane. All the contours the operators create are numbered in the order in which they are created. The contour created by Put_e2(0) is #1.

The status of a newly created contour is always "enabled" at first. This means that cells can be attached to the contour. We show our ionic representation of the cell $e^2$ under "Icons" in FIG. 6.

2. A cell $e^1$ is pasted to $e^2$ by Put_e1_divide (1, nil, inside). A newly created contour is numbered as #2. The third parameter "inside" indicates that #2 is created as the child contour of parent#[1]=0, which is the virtual contour. The second parameter is the list of child contours to be referred. In this case, the second parameter is "nil", which indicates that no operation is performed toward child contour, concretely, no child contour is to be removed.

3. Another $e^1$ is pasted to merge #1 and #2 by Put_e1_merge (1, 2). This operator merges the two contours designated by the first and second parameters into the first. Since the contour indicated by the second parameter disappears by merging, the second contour is removed from the list of child contours of its parent contour. The status of the second contour is changed from "enabled" to "disabled". Therefore, no cell can be attached to this contour.

4. Finally, Put_e0 (1) eliminates #1 by pasting $e^0$. The status of #1 is changed from "enabled" to "disabled". The icon reflects this change. Note that when a contour is attached to a cell $e^0$, all of its child contours, if any, have to be disabled beforehand.

By these procedures described above, the cell attaching with operators ends here because no enabled contours remain.

FIGS. 7–9 show examples of operator programs in pseudo-Pascal code. Max_children and Max_contour_number are assumed to be defined as sufficiently large positive integers. They are used only for the implementation needs of memory allocation.

In FIG. 7, Number_of_children shows the number of child contours for each contour. Most_recently_created# shows the most recently created contour number. Contour_status shows whether each contour is enabled or disabled. Children gives the pointer to the array Child_list that contains the list of the child contours of a given contour. The end of Child_list is shown by the constant End_of_list. These variables are initialized as follows:

most_recently_created#:=0;

for i: =0 to max _contour_number do number_of_ children [i]: =0;

for i: =1 to max_contour_number do contour_status [i]: =disabled;

contour_status [0]: =enabled;

Thus, the virtual contour here becomes enabled. Next, create_new_contour creates a new contour, increases most recently_created#, and initializes its status.

Procedure create_new_contour;
begin
    most_recently_created#: =most_recently_created#+ 1;
    contour_status[most_recently_created#]: =enabled;
end In FIG. 8, we define two procedures and three functions for later use. Add_listed_ children adds the contours listed in the second parameter clist to the list of the child contours (children [n]↑) of the first parameter. Remove_listed_ children removes the contours listed in the second parameter clist from the list of the child contours (children [n]↑) of the first parameter. These two procedures also update the array Number_of_children and Parent#.

On the other hand, the function Add_children (n, clist) returns "true" when all the contours in clist are child contours of #n. Otherwise it returns "false". The function In_list (n, clist) returns "true" when clist includes #n. Otherwise it returns "false". The function List_containing_ only (n) is defined to make a list containing only one contour to be fed to the procedures Add_listed_children and Remove_listed_children.

The four operators Put_e2, Put_e0, Put_e1_divide, and Put_e1_merge can now be defined. They are shown in FIG. 9.

1. Put_e2(n) creates a new contour as the child contour of #n.

2. Put_e0(n) eliminates #n by attaching $e^0$. Here, All_ successors_disabled (n, contour_number) returns "true" if and only if all the successors of #n are disabled.

3. Put_e1_divide (n, clist, inside) divides #n to create a new contour. The contours listed in clist become the child contours of the newly created contour. They are removed from the list of the child contours of #r where either #r=#n or #r=parent#[n] holds. (This depends on whether they have been the child contours of #n or parent#[n].) Only these two cases are permitted.

4. Put_e1_merge (c1, c2) merges #2 into #c1. #c2 is removed from the list of child contours of parent#[C2]. All the child contours of #c2 become the child contours of parent#[c1] or #c1, depending on whether #c1 is the parent or the sibling contour of #c2. Only these two cases are permitted.

To easily understand the structure of the surface being coded by these operators, we propose a graphic representation of the cells that constitute the Reed graph of the surface.

Figure 10:
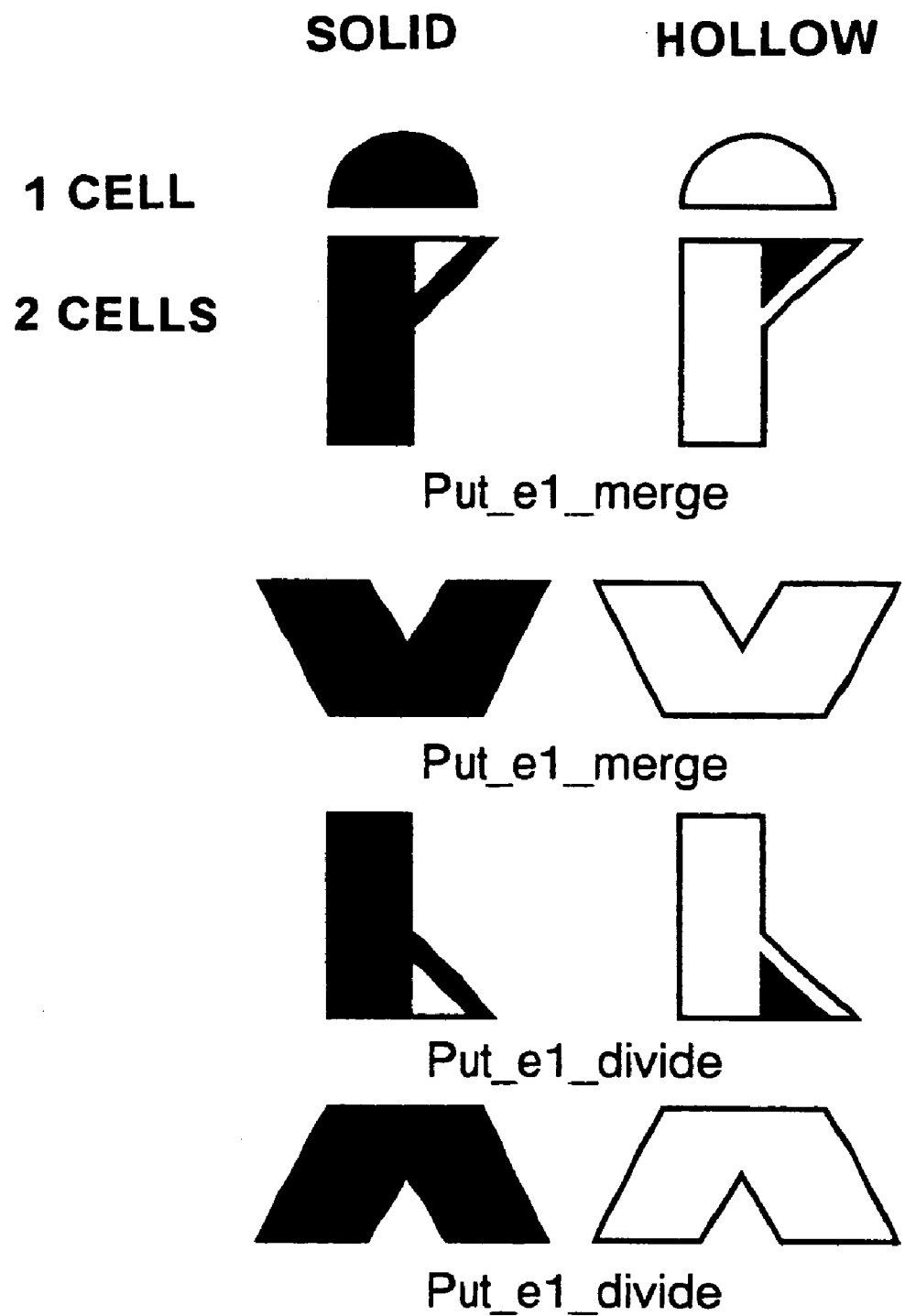
FIG. 10 shows icons corresponding to cells.

The icons depicted in FIG. 10 represent each cell. We paste two cells by letting the flat top and the flat bottom of the two coincide. We depict the cells for hollow contours with white icons and cells for solid contours with black icons. For $e^1$, plural types of icons exist.

Figure 11:
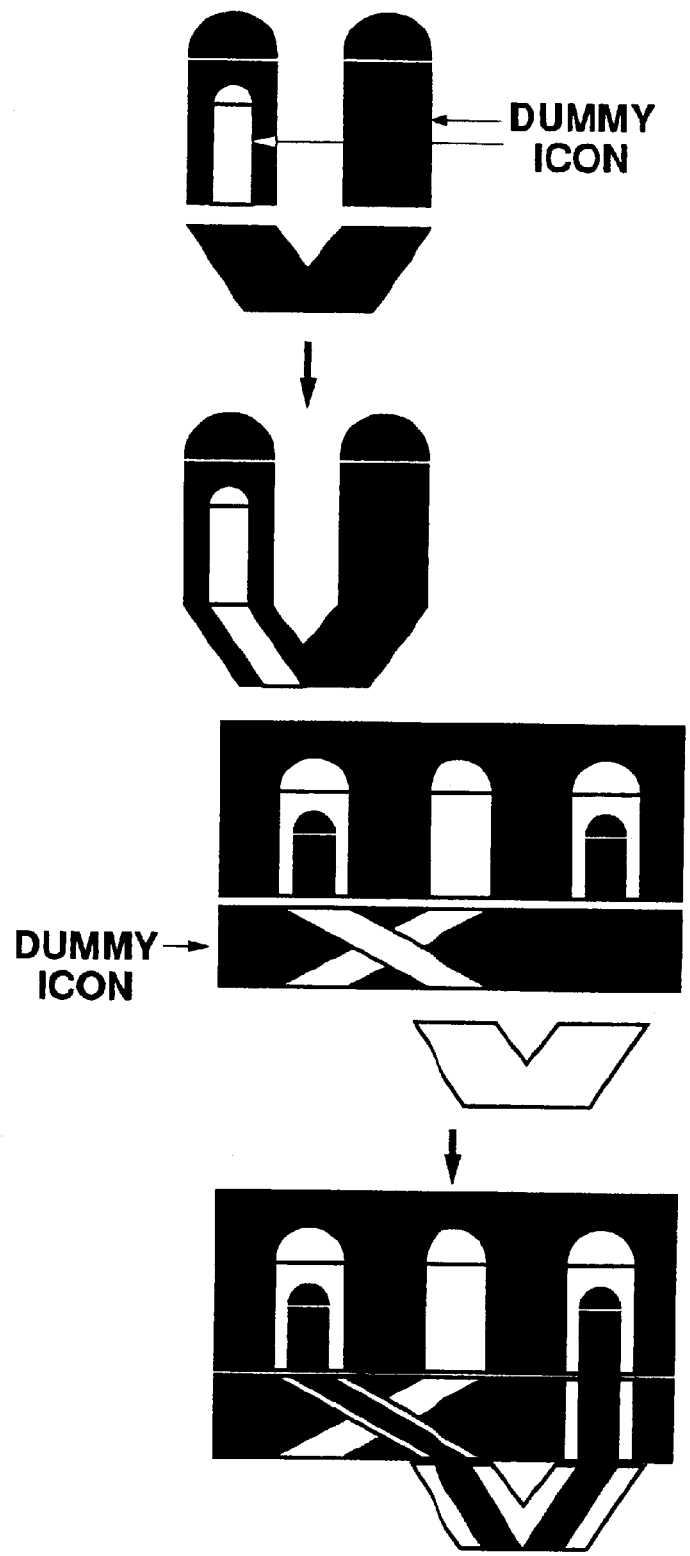
FIG. 11 shows the pasting of cells.

FIG. 11 shows the attachment of cells. The icons of child contours are drawn inside of the icons of their parent contours, as shown in this Figure. Mirror images of the icons on the vertical axis are also allowed.

Icons are characteristic in that they preserve the contour structure to which they are attached. For example, when $e^1$ is attached to the cells as shown in the top half of FIG. 11, the icon preserves the structure of the parent-child relation of the cells to which it is attached.

Dummy icons are inserted where necessary to adjust the height of cells, as shown in the bottom half of FIG. 11. Because the Reed graph may not be a planar graph, we can use the dummy icons to interchange the cells so that $e^1$ can be attached to the adjacent cells. $e^1$ interchanges the cells together with its inner structure. To preserve the hierarchical contour structure, the dummy icons cannot exceed the bounds of the parent contour of the contour to which it is attached or intrude into other contours. For this reason, only sibling contours can be interchanged using dummy icons.

Figure 12:
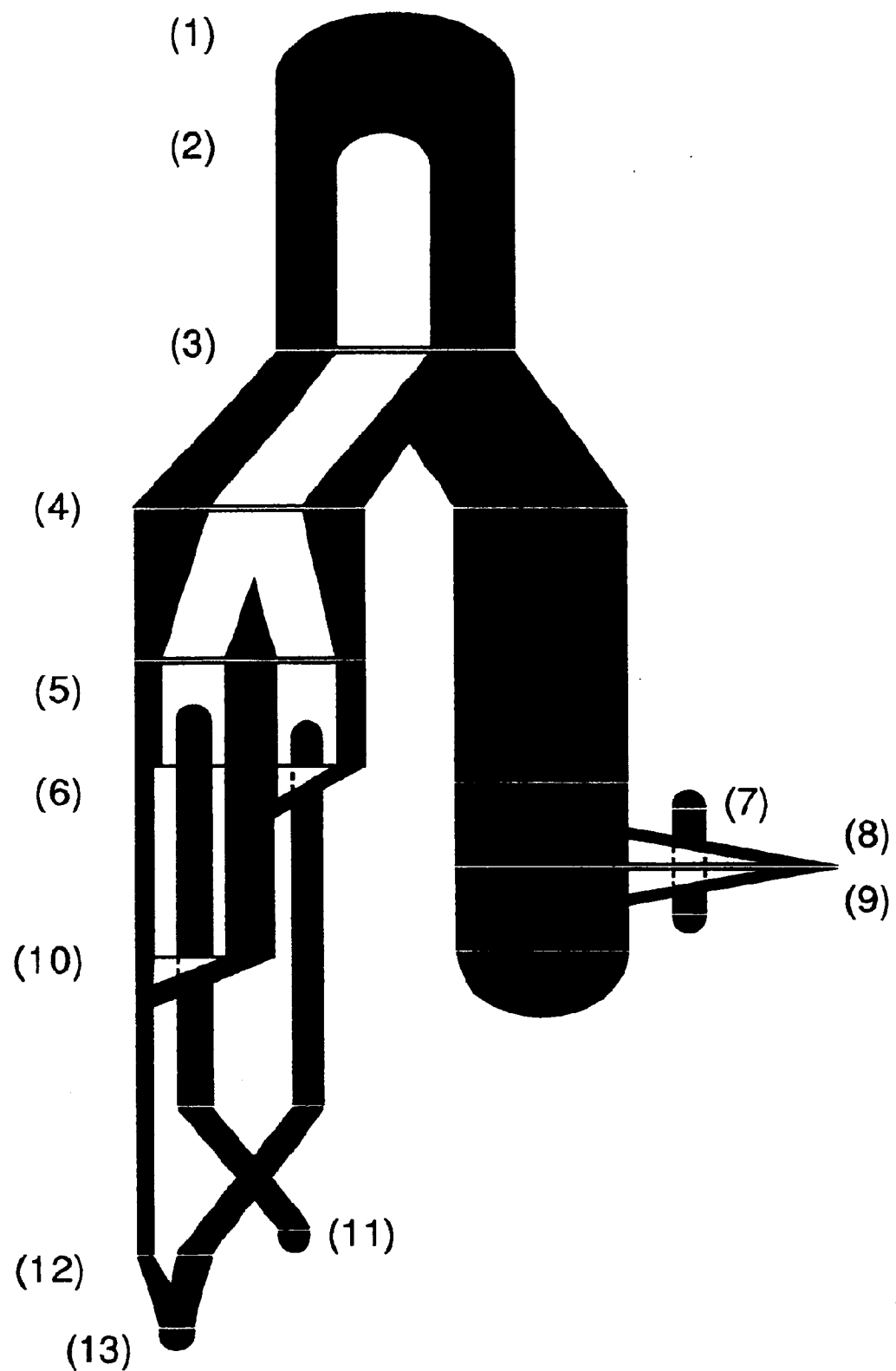
FIG. 12 shows an example of the Reeb graph of an object constructed with icons.
Figure 13:
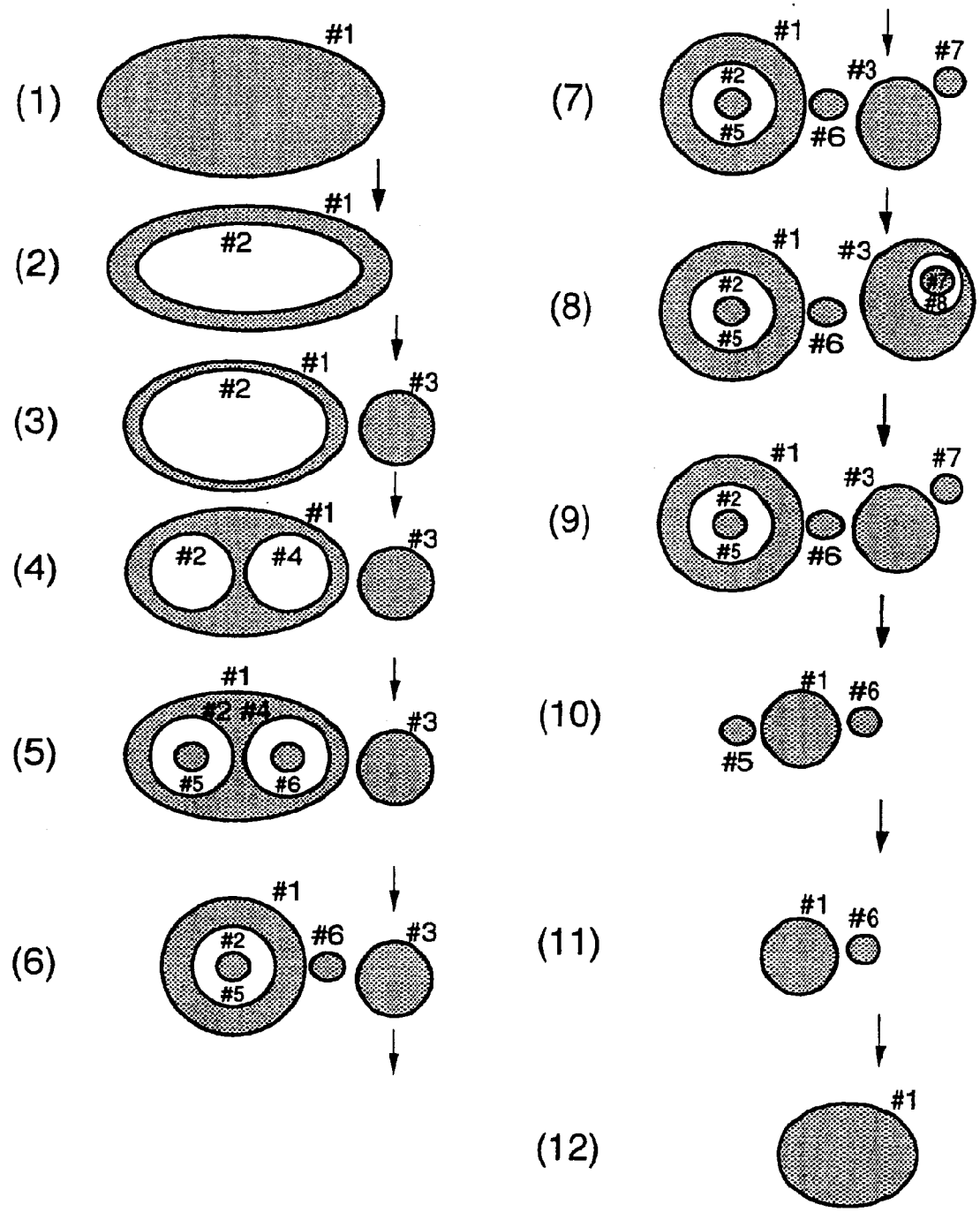
FIGS. 13(1), 13(2), 13(3), 13(4), 13(5), 13(6), 13(7), 13(8), 13(9), 13(10), 13(11), and 13(12) show the cross sectional contours of an object.

In summary, FIGS. 12–14 illustrate an example of the code for constructing an object using the operators. FIG. 12 shows an example of the Reed graph of an object using icons, FIGS. 13 (1), 13(2), 13(3), 13(4), 13(5), 13(6), 13(7), 13(8), 13(9), 13(10), 13(11), and 13(12) its corresponding cross-sectional contours, and FIG. 14 the operators for constructing the object, respectively.

[2] Surface construction from codes using operators (1) Surface generation as a locus of homotopy In this section, surface is constructed from codes obtained by the previous method.

As was previously stated, the topology of a contour does not change between critical sections. When scanned from top to bottom, the shape of a contour changes. This transformation of a contour can be best represented by the notion of a homotopy. A homotopy transforms one function to another. In what follows, all the contours are to be represented by shape functions and the transformation are described by means of homotopies. The definition of homotopy is as given below.

Definition: Let $f, g : X \to Y$ be maps where X and Y are topological spaces. Then "f is homotopic to g" if there exists a map $F: X \times I \to Y$ such that $$F(x, 0) = f(x)$$

and $$F(x, 1) = g(x) \text{ for all points } x \in X.$$

Figure 15:
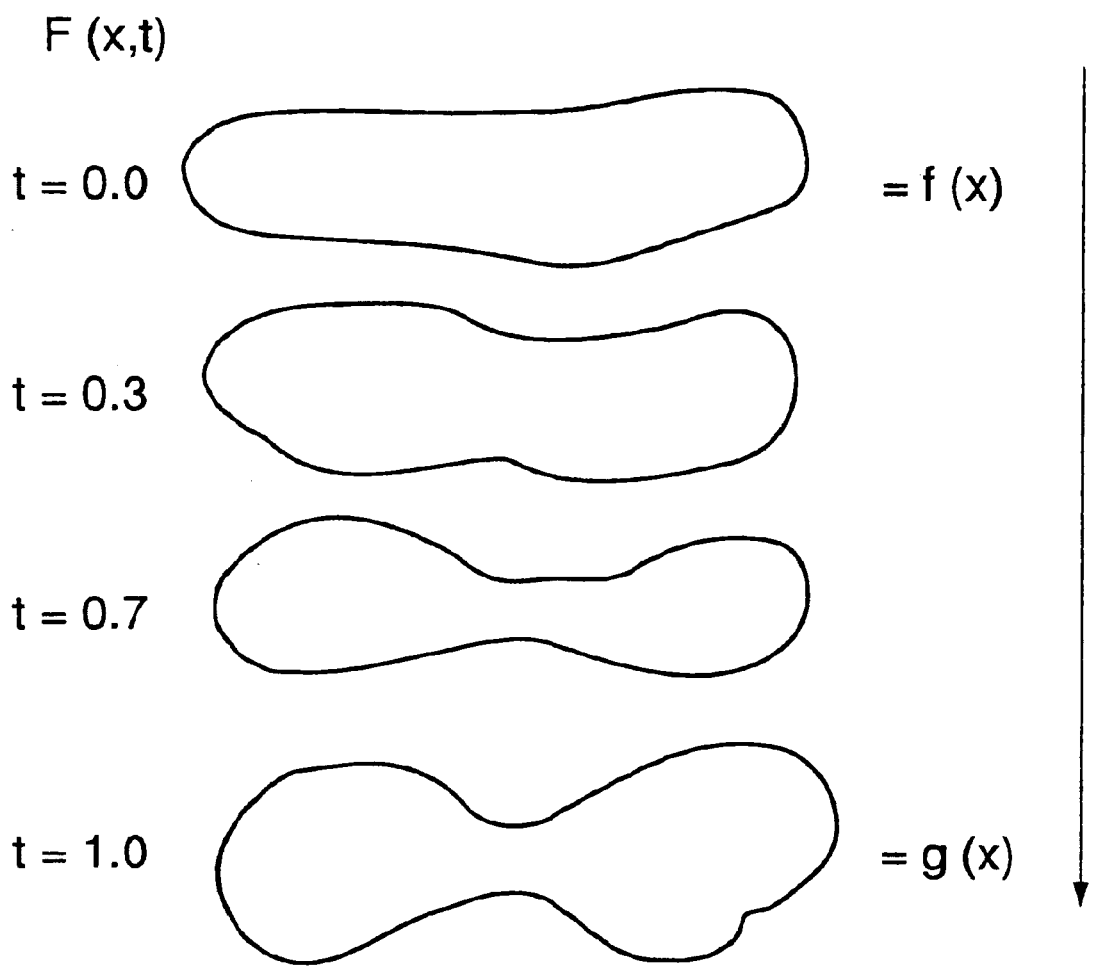
FIG. 15 shows a homotopic transformation of contours.

Here $I=[0, 1] \in R$. This map F is called "a homotopy from f to g". When F is defined by $$F(x, t) = (1-t)f(x) + tg(x),$$

it is called a straight-line homotopy. In FIG. 15, homotopic transformation of contours is shown. In this Figure, the upper contour is represented by the shape function f and the lower by g. The surface generated is the locus of the homotopy F from f to g.

(2) Elements for implementing operators

The operators that generate a surface as shown in FIG. 15 are described as transforming the contours by homotopies.

1. Elements of the operators

Figure 16:
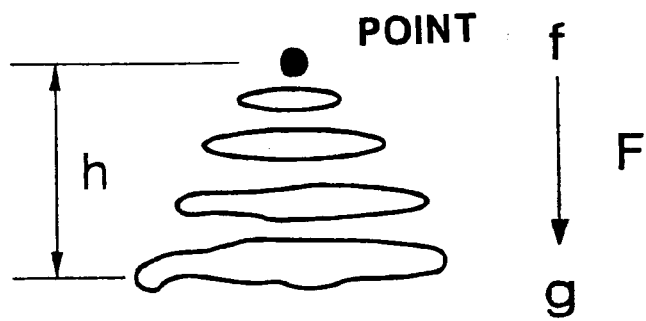
FIG. 16 shows four main parameters of an operator.

The following four main elements of the operators are described in FIG. 16.

(i) $f: I \to R^3$ gives the shape of the upper contour
(ii) $g: I \to R^3$ gives the shape of the lower contour
(iii) F: the homotopy from f to g
(iv) h: the difference of the height between the two contours 2. Shape functions The following shape functions f and g are provided.

(i) point: a constant function that always gives the location of a fixed point
(ii) circle: gives the shape of a circle
(iii) polygon: gives the shape of a polygon that connects the given vertices (iv) Bézier: An n-dimensional Bézier curve is written as $$f(u) = \sum_{i=0}^{n} B_i^n(u) P_i (0 \le t \le 1) \qquad [3]$$

and specified by an ordered set of n points called the control points $P_i \in R^3$. The control point can be modified by users. Here, $B_i^n(t)$ is a Bernstein basis function defined by $$B_i^n(u) = \binom{n}{i} u^i (1-u)^{n-i}. \qquad [4]$$

(v) NURBS (Non Uniform Rational B-Spline) curves:

The control points of NURBS curves are also defined by users. A NURBS curve is defined by $$f(u) = \frac{\sum_{i=0}^{n} N_{i,k}(u) w_i P_i}{\sum_{i=0}^{n} N_{i,k}(u) w_i} \qquad [5]$$

where $w_1$ is a weight associated with each control point. $N_{i,k}(t)$ is a piecewise polynomial of degree (k−1) called a B-spline basis function and defined as $$N_{i,0} = \begin{cases} 1 & (xi \le u < x_{i+1}) \\ 0 & \text{otherwise} \end{cases} \qquad [6]$$

$$N_{i,k}(u) = \frac{(u - x_i) N_{i,k-1}(u)}{x_{i+k} - x_i} + \frac{(x_{i+k+1} - u) N_{i+1,k-1}(u)}{x_{i+k+1} - x_{i+1}} (2 \le k \le +1).$$

NURBS is extensively used in a great number of CAD systems. It can represent a quadric surface accurately and has a local approximation property, that is, if a control point or the weight associated with it is changed, it affects the shape of the surface only in its neighborhood.

3. Homotopy F

As the homotopy F, functions are provided as follows. They output cross sectional contours.

(i) linear: a straight-line homotopy
(ii) quadrant:

$$\text{quadrant}: F(x, t) = \text{quadrant}(x, t) = \sqrt{1 - t^2} f(x) + \left(1 - \sqrt{1 - t^2}\right) g(x)$$

(iii) parabola:

$$F(x, t) = (1 - t^2) f(x) + t^2 g(x)$$

(iv) cardinal spline: A cardinal spline interpolates the upper and lower contours. Parametrization can be done automatically using a toroidal graph that indicates the correspondence between the contours.

(v) guiding curve: A contour is transformed by moving a point of the contour along a guiding curve. More than one guiding curve can be attached to a contour. When a contour is represented by a Bézier or NURBS curve, the guiding curves are attached to the control points and the transformation is decided by the movement of the control points. The movement of a control point where a guiding curve is not attached can be computed using the guiding curves of its adjacent control points.

Figure 17:
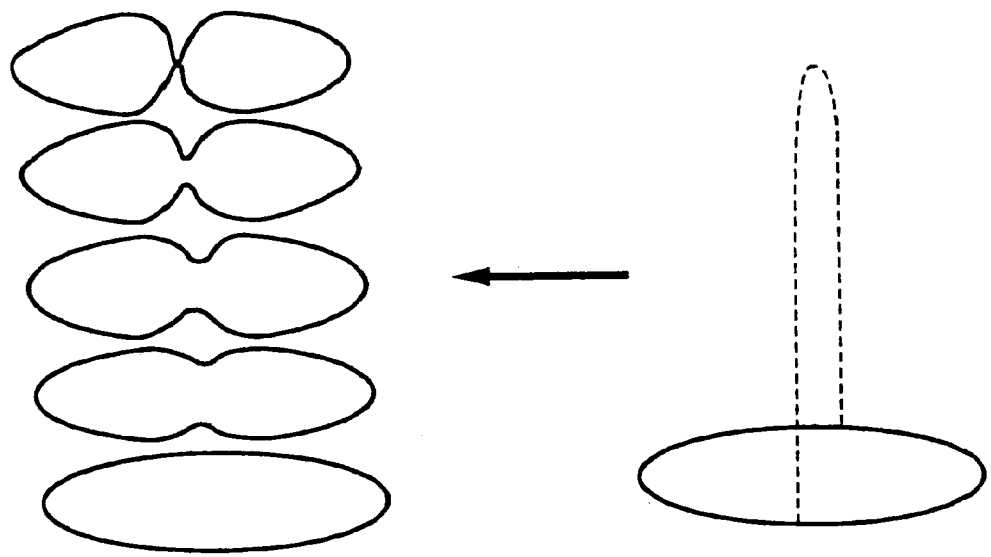
FIG. 17 shows gradual transformation of an upper contour into a lower one using a guiding curve.

FIG. 17 shows the gradual transformation of the upper contour to the lower one by attaching a guiding curve to a contour by users.

In any case, surface patches are generated among the resulting contours using the cardinal spline.

4. Shape functions of contours for the operators

The shape functions of contours for the operators are given in the following.

(i) Put_e2
   f: point
   g: specified by users (default: circle)
   F: specified by users (default: quadrant)

(ii) Put_e0
   f: the shape function of the contour to which the $e^0$ is attached
   g: point
   F: specified by users (default: quadrant)

(iii) Put_e1_divide and Put_e1_merge the path c of $e^1$: $[0, 1] \rightarrow R^3$ of $e^1$ must be decided. In the implementation, the path c is specified by the locations of c(0), c(½) and c(1). The path has to be smooth and its tangent vector at c(½) has to be parallel to the xy-plane so that c(½) becomes the saddle point of the generated surface. The default location of c(½) is at $$c(1/2) = \begin{pmatrix} \frac{c(0)_x + c(1)_x}{2} \\ \frac{c(0)_y + c(1)_y}{2} \\ c(0)_z - h \end{pmatrix} \text{ where} \quad [8]$$

$$c(t) = \begin{pmatrix} c(t)_x \\ c(t)_y \\ c(t)_z \end{pmatrix}. \quad [9]$$

The default path is an arc of an ellipse connecting c(0) and c(1) given by $$c(t) = \begin{pmatrix} \left(1 - \sqrt{1-(2t)^2}\right)c(0)_x + \sqrt{1-(2t)^2}\, c(1/2)_x \\ \left(1 - \sqrt{1-(2t)^2}\right)c(0)_y + \sqrt{1-(2t)^2}\, c(1/2)_y \\ (1-2t)c(0)_z + 2tc(1/2)_z \end{pmatrix} \quad [10]$$

for $0 \leq t \leq \frac{1}{2}$ and $$c(t) = \begin{pmatrix} \left(1 - \sqrt{1-(2-2t)^2}\right)c(1/2)_x + \sqrt{1-(2-2t)^2}\, c(1)_x \\ \left(1 - \sqrt{1-(2-2t)^2}\right)c(1/2)_y + \sqrt{1-(2-2t)^2}\, c(1)_y \\ (2-2t)c(1/2)_z + (2t-1)c(1) \end{pmatrix} \quad [11]$$

for $\frac{1}{2} \leq t \leq 1$. The projection of the default path to the xy-place is the line segment connecting c(0) and c(1). A parabolic path can easily be provided by substituting $(1-x^2)$ for $(1-x^2)^{1/2}$. The elements for Put_e1_divide and Put_e1_merge are as follows.

Put_e1_divide
   f: the shape function of the contour to which $e^1$ is attached
   c: the path of $e^1$
   c(0) and c(1): specified by $s_1$ and $S_2 \in [0, 1]$ where $c(0)=f(s_1)$ and $c(1)=f(s_2)$ respectively
   $g_1$ and $g_2$: obtained by dividing the contour along c Put_e1_merge
   c: the path of $e^1$
   $f_1$ and $f_2$: the shape functions of the contours to which $e^1$ is attached
   c(0) and c(1): specified by $s_1$ and $s_2 \in [0, 1]$ where $c(0)=f_1(s_1)$ and $c(1)=f_2(s_2)$ respectively
   g: obtained by merging the contours along c The transformation for Put_e1_divide is performed by transforming the contour using the path of $e^1$ as the guiding curve; i.e., $$F(s_1, t) = c(t/2)$$

and $$F(s_2, t) = c(1-t/2).$$

On the other hand, the transformation for Put_e1_merge is obtained as $$F_1(s_1, t) = c(t/2)$$

and $$F_2(s_2, t) = c(1-t/2).$$

(iv) Dummy icons

By using the aforementioned dummy icons, the shape of contours can be transformed without changing the contour structure. The shape functions for the dummy operator are as follows.

f: the shape function of the contour to which dummy ($e^0$) is attached
g: specified by users (default: circle)

This system automatically checks to ensure that the child contours do not exceed the bounds of their parent contours to maintain the topological integrity.

(3) Countermeasures for nondifferentiability and degeneracy

So far, $C^2$ differentiability has been imposed on object surfaces and all the critical points have been assumed to be non-degenerate. However, to design objects such as cylinders and cubes, it is convenient to include nondifferentiability and degeneracy such as polyhedra and flat tops and bottoms in the construction system.

From this point of view, such functional expansions are expressed as the deformation of a c2 differentiable manifold with nondegenerate height function.

⊙ Nondifferentiable contours

Figure 18:
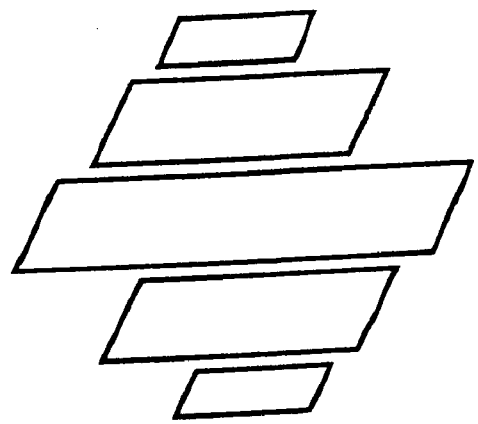
FIG. 18 shows an object having non-differentiable points.
Figure 19:
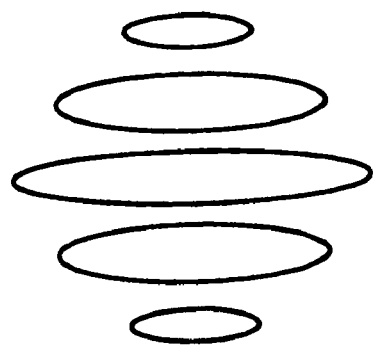
FIG. 19 shows the object in FIG. 18 substituted by an object having a differentiable shape function.

FIG. 18 shows an object containing nondifferentiable points. Such an object can be expressed by substituting a nondifferentiable shape function for a differentiable shape function, as shown in FIG. 19.

⊙ Horizontally flat tops, bottoms, or branches

Figure 20:
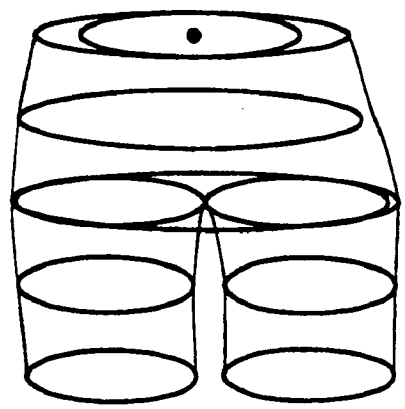
FIG. 20 shows an object having a flat top and flat branch.
Figure 21:
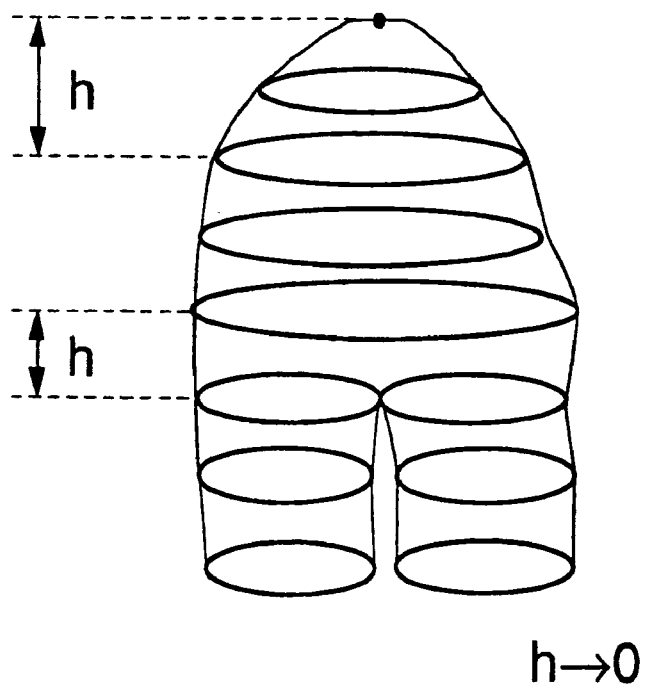
FIG. 21 shows an object, the object in FIG. 20, with height h=0.

Horizontally flat faces are introduced by setting $h \rightarrow 0$. For example, a flat top and a flat branch, as shown in FIG. 20, can be expressed by setting h=0, as shown in FIG. 21.

⊙ Ridges

Figure 22:
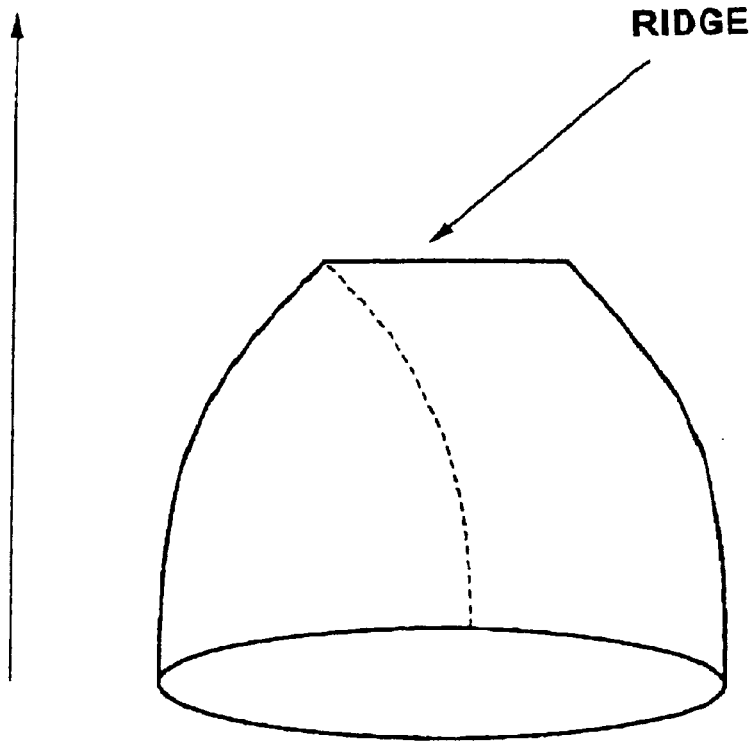
FIG. 22 shows a ridge of an object.

To include ridges, as shown in FIG. 22, the shape functions f and g can be composed of a curved segment $\alpha: I \rightarrow R^3$ by setting $$f(x), g(x) = \alpha(2x) \quad 0 \leq x \leq \frac{1}{2}$$

$$f(x), g(x) = \alpha(1-2x) \quad \frac{1}{2} \leq x \leq 1$$

That is, the shape of a string folded double.

⊙ Volcano rims

Figure 23:
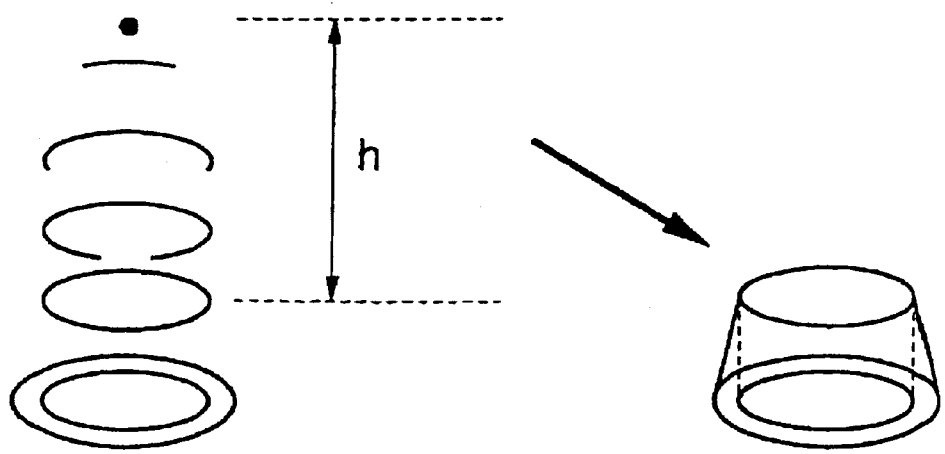
FIG. 23 shows a rim structure of a volcano.

A volcano rim can be drawn by using the technique of a ridge and setting h→0 as shown in FIG. 23.

[3] Smooth surface generation from cross sectional data (1) Introduction

There is often a need for generating a three-dimensional object from its cross-sectional data. Particularly in the medical field, to generate the entire shape of an organ from a set of sectional data is of great significance. The following surface models have been known for 3-D medical datasets generation.

Space between adjacent contours expressed i n polygon is filled by attaching triangular patches.

2. Spline approximation

Surface is generated using spline approximation.

Here is presented a new model which uses a homotopy and includes the above two surface models as special cases, overcoming their drawbacks.

This homotopy model consists of continuous toroidal graph representation of corresponding point pair on contours and homotopic generation of surfaces from the representation. The resulting surface is a generalization of classical parametric surfaces, and includes the spline approximation. Two examples are shown, one corresponding to the refinement of loft surfaces by using a straight-line homotopy and the other a cardinal spline surface.

(2) Toroidal graph representation

Toroidal graph representation has been used for triangulation technique. According to this graph theory, a simple triangulation scheme has been proposed based on the shortest diagonal algorithm. First, the original discrete (not continuous) version of the toroidal graph representation is introduced, and then it is expanded to a continuous version.

It is assumed that a contour line is to be approximated by a string of linear line segments and defined that one contour by a sequence of m distinct contour points $P_0, P_1, \ldots P_{m-1}$, and the other contour by $Q_0, Q_1, \ldots Q_{n-1}$. We assume that the orientation of both loops are the same. Triangulation must satisfy the following two conditions.

1. Two nodes of the same contour that are to be defined as the nodes of the same triangle must neighbor each other on the contour line.

2. No more than two vertices of any triangle may be recruited from the same contour line.

In the conventional toroidal graph, the two rules are reduced into one and reflected in graph theory. They represent mutual topological relations of triangles in a toroidal graph. In this graph, vertices correspond to the set of all possible spans between the points $P_0, P_1, \ldots P_{m-1}$ and the points $Q_0, Q_1, \ldots Q_{n-1}$, and the arcs correspond to the set of all the possible triangles. For example, vertices $(p_3, Q_5)$ correspond to the span connecting $P_3$ with $Q_5$, and the arc from vertices $(P_3, Q_5)$ to $(P_3, Q_6)$ corresponds to a triangle $\Delta P_3 Q_5 Q_6$.

The graph of an acceptable surface has exactly one vertical arc in every row and exactly one horizontal arc in every column. There are two kinds of acceptable surfaces: one is homeomorphic to a cylinder and the other homeomorphic to two cones. In the following, discussion is limited to the former case unless otherwise noted.

The shortest diagonal algorithm is a simple one. The adjacent contour lines are mapped onto a unit square. Here, we assume that $P_0$ and $Q_0$ are proximate. The shortest diagonal algorithm commences triangulation by connecting points $P_0$ and $Q_0$. After $P_i$ and $Q_j$ are connected, either one of the next candidates $P_i-Q_{j+1}$ and $P_{i+1}-Q_j$ is selected to be connected. Hereafter this process is repeated. This process on the plane can be represented by a step function. However, since, after making one round of the contour, the point returns to the original point, the starting and final points of the step must be the same. To represent this process, P can be oriented to move around the exterior edge of a torus along its perimeter, and Q to move vertically to the orientation of P. In this representation, when P makes one round of the exterior edge of the torus, Q also makes one round of the bent cylinder of the torus, returning to the original point.

This scheme works well when adjacent loops are similar in shape. However, if they vary widely in shape, the surfaces generated are known to have artificial wrinkles or folds due to the forced correspondence.

Figure 24:
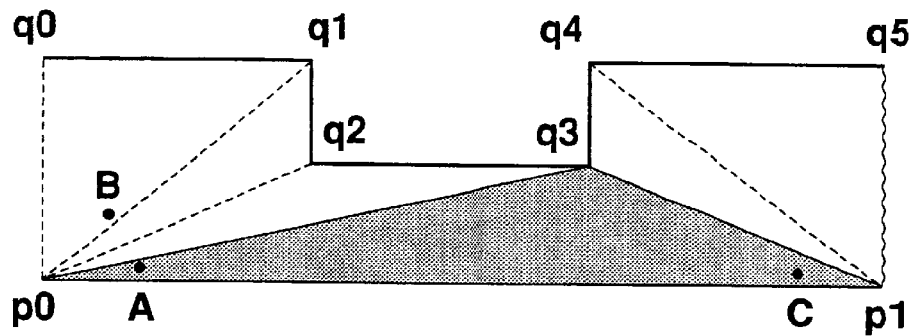
FIG. 24 shows formation of an artificial wrinkle by the conventional triangulation method.

This situation is shown in FIG. 24 ($q_3-p_0-q_2$). As shown in this Figure, the surface appears to have wrinkles around the point A. The artificial wrinkle generated cannot be eliminated, even through use of smooth shading. This problem cannot be solved by modifying the connection of nodes, because no nodes exist between $p_0$ and $p_1$.

Thus, the surface generated by the triangulation method depends heavily on the choice of the nodes for each contour. There is local difficulty, like the aforementioned wrinkles with the triangulation method, because triangle patches are attached between local segment of contours. There has been a proposal to improve the coherence between a contour pair by transforming the contours so that the perimeter of each contour is exactly equal to one. However, even this method is still based on local constrains only and cannot avoid defective triangles completely.

Another problem with the triangulation method is the smoothness of the surface generated. Although triangulated surfaces with smooth shading seem smooth, the surface normals are ambiguous, and it is hard to understand the exact shape of the objects when the shape is complicated.

(3) Heuristic approach to finding the optimal path

In the following, path means a line connecting corresponding points on corresponding contours. First, the "closest pair vertex" is defined.

Definition 1

A vertex $(P_i, Q_j)$ is a closest pair vertex if both $$d(P_i, Q_j) = \min d(P_i, Q_k) \quad (0 \leq k < n)$$

and $$d(P_i, Q_j) = \min d(P_k, Q_j) \quad (0 \leq k < m)$$

hold. Here, d(P, Q) is the distance between points P and Q.

Remark 1

At most, one closest pair vertex exists on each row and on each column of the toroidal graph.

In general, acceptable paths that connect all the closest pair vertices do not exist. Therefore, the connecting of as many closest pair vertices as possible is examined. First, vertices are weighed 1 when they are the closest pair vertices and 0 otherwise. $\Psi(S)$ is defined as the total weight of the vertices through which S passes. In other words, $\Psi(S)$ is the number of closest pair vertices through which an acceptable path S passes. Then the problem can be reduced to finding the maximum cost-acceptable path.

Although this reduction is theoretically correct, it requires a tremendous amount of computation. Therefore, a simpler approach grouping closest pair vertices has been explored. Results of our experiments have indicated that the closest pair vertices can be grouped. A group consists of a set of closest pair vertices $(P_i, Q_j), (P_{i+1}, Q_{j+1}), \ldots, (P_{i+k}, Q_{j+k})$, which is referred to as a run R of closest pair vertices whose length L(R) is k+1. When a vertex p is the constituent of the run R, it is noted as p∈R. Then the following proposition holds:

Proposition 1

When there exists an acceptable path $S_1$ that passes through a closest pair vertex ($P_i$, $Q_j$), there exists another acceptable path $S_2$ that passes through all closest pair vertices of the run R where ($P_i$, $Q_j$)∈R and $\Phi(S_1) \leq \Phi(S_2)$.

Proof

Without loss of generality, it can be assumed that $L(R) \geq 2$.

Case 1

($P_{i+1}$, $Q_{j+1}$)∈R and $S_1$ does not pass through this vertex.

Case 1a $S_1$ passes through ($P_{i+1}$, $Q_j$).

Let ($P_k$, $Q_{j+1}$) be the last vertex at which $S_1$ leaves the row (j+1).

Let $S_1 = S_3 S_4 S_5$, where $S_4$ is a path from ($P_{i+1}$, $Q_j$) to ($P_k$, $Q_{j+1}$). Since $S_4$ passes through neither ($P_i$, $Q_j$) nor ($P_{i+1}$, $Q_{j+1}$), $\Psi(S_4)=0$ holds by REMARK 1. On the other hand, obviously there is a path $S_6$ from ($P_{i+1}$, $Q_{j+1}$) to ($P_k$, $Q_{j+1}$) and $\Psi(S_6)=1$ holds, because ($P_{i+1}$, $Q_{j+1}$)∈R. Therefore, when $S_2$ is constructed as the concatenation of $S_3$, $S_6$ and $S_5$ (that is, a path includes $S_6$ in place of $S_4$), $\Psi(S_2)=\Psi(S_1)+1$.

Case 1b $S_1$ passes through ($P_i$, $Q_{j+1}$).

The discussion is the same as in Case 1a.

Case 2

($P_{i-1}$, $Q_{j-1}$)∈R and $S_1$ does not pass through this vertex. The discussion is the same as in Case 1.

Applying this construction method recursively, the path $S_2$ of Proposition 1 is obtained.

According to Proposition 1, only runs must be taken into consideration in order to maximize ψ, and not the elements constituting each run. Thus, the objective stated previously, the examination of methods for connecting closest pair vertices as many as possible, is reduced to choosing an acceptable set of runs that maximizes Ψ.

Here, a set of runs that an acceptable path passes through is defined as an acceptable set of runs. Obviously, any set of runs that consists of two runs is acceptable. A set of three runs $\{R_1, R_2, R_3\}$ that are not acceptable is as follows: suppose $R_1=(P_{i1}, Q_{j1})$ ..., $R_2=(P_{i2},Q_{j2})$ ..., $R_3=(P_{i3}, Q_{j3})$, ..., and $i_1<i_2<i_3$ (mod m). If $j_1<j_3<j_2$ (mod m) or $j_2<j_1<j_3$ (mod m) or $j_3<j_2<j_1$ (mod m), this set is not acceptable. Modulo m is used because contours return to the original point after making one round.

A set of more than four runs are acceptable if and only if any three elements constitute an acceptable set. Therefore, the above stated objective requires exhaustive computation.

Confronted with this complexity, a heuristic scheme was explored. As one cause of the complexity lies in the use of modulo m, it is abandoned. This corresponds to cutting a torus to a plane when P and Q are represented on it. By this simplification, acceptability becomes a binary relation of runs instead of the ternary relation. A set of two runs ($P_{i1}$, $Q_{j1}$), ..., and ($P_{i2}$, $Q_{j2}$), ..., is acceptable if $i_1<i_2$ and $j_1<j_2$ or $i_1>i_2$ and $j_1>j_2$. When a set of $\{R_1, R_2\}$ is not acceptable, $R_1$ is said to be inconsistent with $R_2$. This is much easier to test, while there is possibility that a run be divided into two when cutting the torus to a plane. Finally, to choose the runs that maximize Ψ, a heuristic algorithm making use of a stack is adopted as follows.

Algorithm

Assume there are N runs and for each run $R_k=(P_{ik}, Q_{jk})$, ..., $i_1<i_2<$, ..., $<j_k<$, ..., $<i_N$ holds. At first, the stack is empty.

Step 1. Push $R_1$ onto the stack.

Step 2. k=2.

Step 3. Let R be the run at the top of the stack.

Step 4. If $R_k$ and R are consistent, $R_k$ is pushed onto the stack. Else if $L(R_k) \leq L(R)$, $R_k$ is removed and k=k+1. Otherwise, R is removed from the stack.

Step 5. If $k \leq N$, go to step 3.

Figure 25:
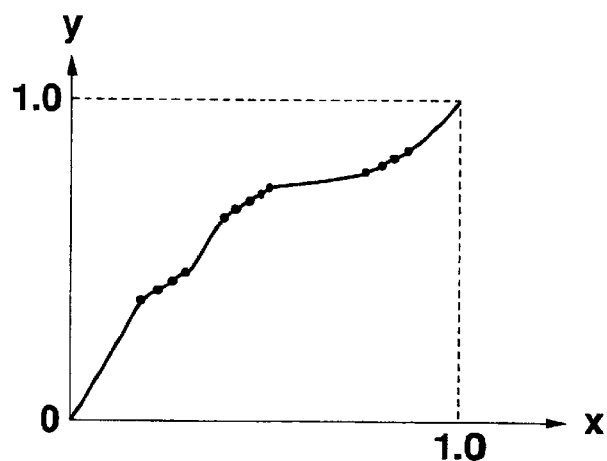
FIG. 25 shows a final acceptable set of runs by the algorithm for obtaining the longest Y ns in the maximum number.

As for $R_k$, fewer than k iterations are needed. Therefore, the time complexity of this algorithm is $O(N^2)$. By this algorithm, out of consistent runs, those which exceed a predetermined length are pushed onto the stack and secured. As a result, an acceptable set of runs that makes Ψ close to the maximum is obtained. Runs finally obtained are shown in FIG. 25.

◎ Continuous version of the toroidal graph

Next, it is necessary to decide the trail of the path in detail. Although the path must pass through the vertices of the runs chosen by the previous algorithm, the other vertices still remain arbitrary. Here, "linear interpolation" of closest pair vertices is proposed to decide the trail. Before discussing it in detail, an introduction of a continuous version of the discrete toroidal graph is necessary.

First, the lower and upper contours must be represented by parameters. Points on the contours are designated by the following function.

f, g: $I \rightarrow R^3$, where $I \subset R$ is an interval [0, 1], and f(0)=f(1) and g(0)=g(1).

In the continuous toridal graph, horizontal and vertical distance between two vertices of said graph represent the differences of the parameter values between the two. Therefore, this graph is different from the case of [2], where the parameters represent the parameter themselves of such as NURBS curves.

EXAMPLE 1

Arc length is used as the parameter. Let $l_1$ and $l_2$ be the lengths of the lower and upper loops. For example, the horizontal distance of the graph between ($P_{i1}$, $Q_{j1}$) and ($P_{i2}$, $Q_{j2}$) represents the arc length between $P_{i1}$ and $P_{i2}$ over the upper loop and the vertical distance of the graph represents the arc length between $Q_{j1}$ and $Q_{j2}$ over the lower loop. The point (x, y) on the graph is normalized to represent the pair of P and Q where P is the point whose arc length from $P_0$ is $xl_1$, and Q is the point whose arc length from $Q_0$ is $yl_2$.

EXAMPLE 2

When the shape of contour lines are close to a circle, the argument can be used as the parameter. In this case, it is essentially the same as with a cylindrical coordinate system. Furthermore, the contour lines need not be approximated by linear segments. Parametric curves such as Bézier curve, the B-spline curve or the cardinal-spline curve can be used instead.

EXAMPLE 3

The parameter of a spline-basis function is used as the parameter of the graph.

To use the linear interpolation discussed later, arc length representation is desirable. However, conversion from the curve parameter to the arc length is not easy to compute. One remedy is to approximate the spline curves by linear line segments and use its length instead of actual arc length. Display examples presented later use this approximation.

As long as the parameter monotonously increases as the point on the contour line goes farther from the initial node, it does not matter essentially what parameter is used in the following discussion. The continuous version of an acceptable path is represented on this graph as a monotonously increasing (or decreasing) "multivalued function." Strictly speaking, the path is represented as the concatenation of the graph $y=U_i(x)$ and $x=V_i(y)$, where $U_i$: $[x_{2i}, x_{2i+1}] \to I$ and $V_i$: $[y_{2i}, y_{2i+1}] \to I$ $(0=x_0 \leq x_1 \leq \ldots x_{2nn-1} < 1, 0=y_0 \leq y_1 \leq \ldots y_{2nn-1} < 1)$ are monotonously increasing (decreasing) functions and on each joint $(x_{2i+1}, y_{2i+1})$ of $U_i$ and $V_i$, $$U_i(x_{2i+1}) = V_i(y_{2i+1})$$

and $$U_0(0) = V_{nn-1}(1)$$

hold and on each joint $(x_{2i+2}, y_{2i+2})$ of $V_i$ and $U_{i+1}$, $$V_i(y_{2i+2}) = U_{i+1}(x_{2i+2})$$

hold.

Figure 26:
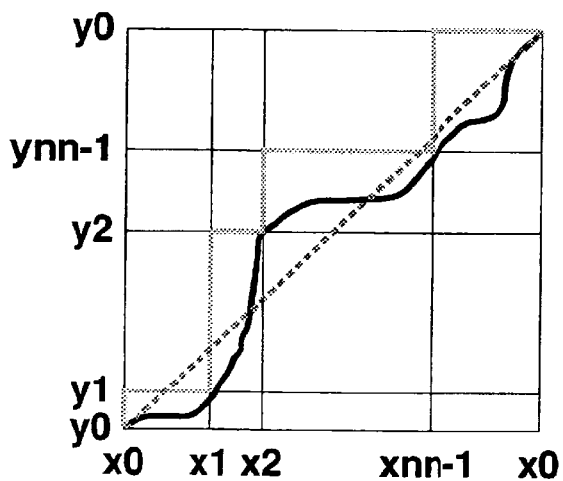
FIG. 26 shows an acceptable path on the continuous toroidal graph wherein nn=2.

FIG. 26 shows an example where nn=2. In this Figure, the solid line corresponds to a homotopy model, the dotted line a spline model, and the step line a triangulation model. The discrete toroidal graph is a special case of this continuous version and the conversion is straightforward. Its graph is the concatenation of that of $y=q_i$ and $x=p_i$.

Based on the aforementioned discussion, finally, the details of the path is determined on this graph. Suppose the closest pair vertices are $(x_i, y_i)$ (i=0, 1, ..., k-1) and $0=x_0<, \ldots, <x_{k-1}$. The path is to be represented as a function $U(x): I \to I$ such that $$U(x) = (y_{i+1} - y_i)\frac{(x - x_i)}{(x_{i+1} - x_i)} + y_i (x_i \leq x < x_{i+1}). \quad [12]$$

Figure 27:
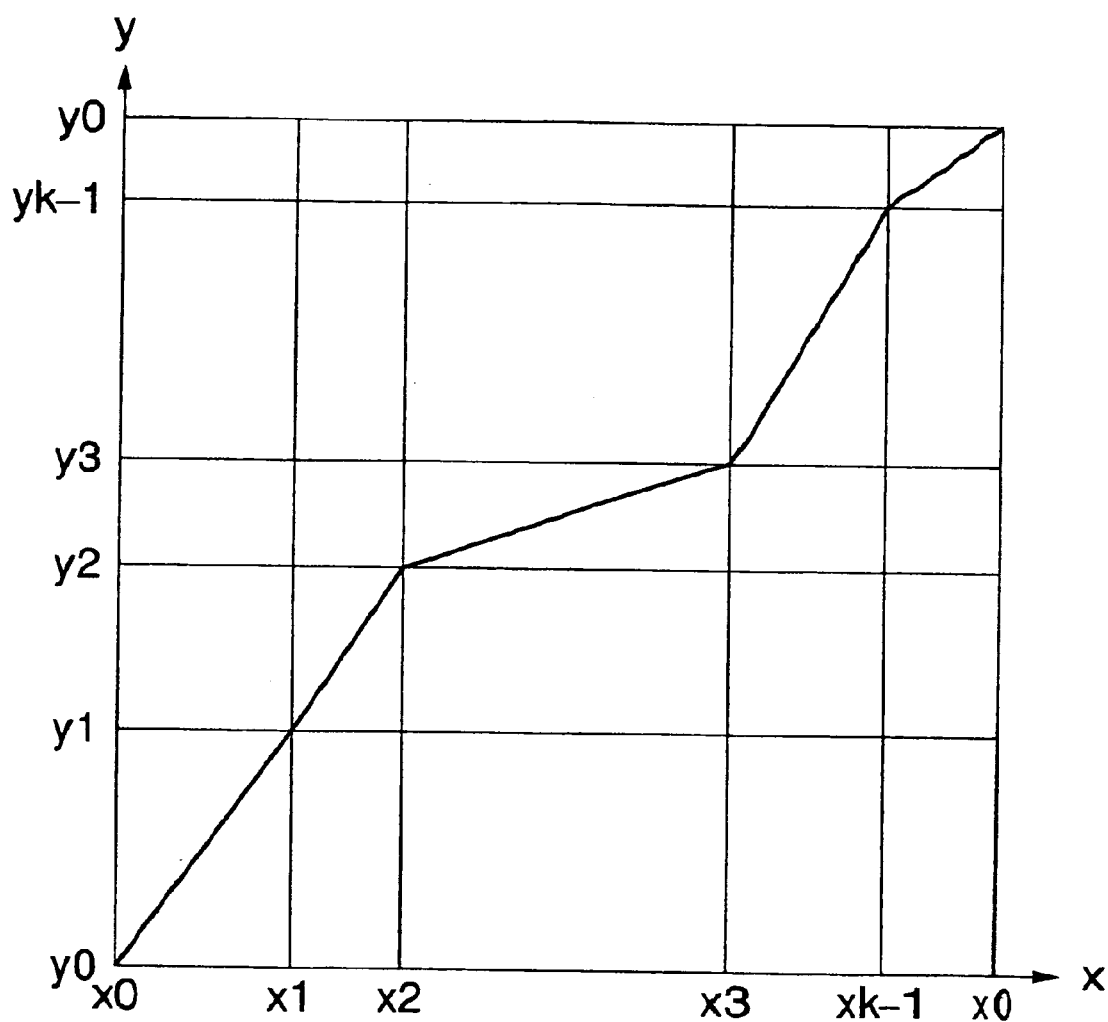
FIG. 27 shows correspondence of points other than closest point pairs obtained through linear interpolation.
Figure 28:
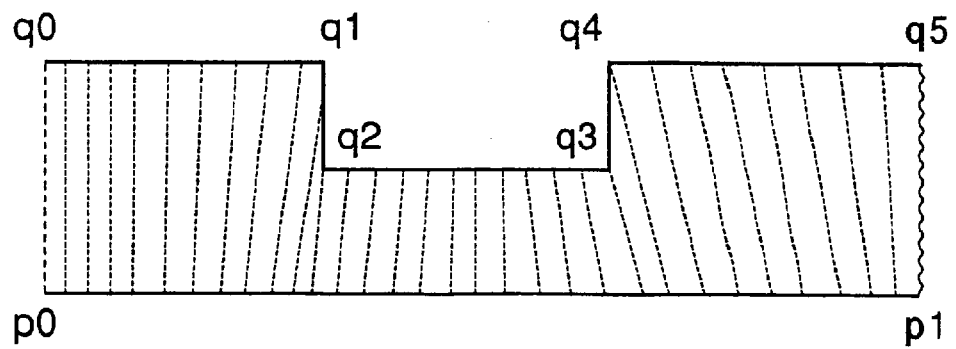
FIG. 28 shows a surface created along the path in FIG. 27.

As stated previously, this equation is the linear interpolation of $(x_i, y_i)$ and $(x_{i+1}, y_{i+1})$, which is shown in FIG. 27. The surface represented by this path is shown in FIG. 28. The contours are the same as in FIG. 24. This example shows a straight-line homotopy. Comparing FIGS. 24 and 28 makes it obvious that the surface in FIG. 28 is smoother than that in FIG. 24 so that the formation of "wrinkles" are avoided.

A closest pair vertex according to Definition 1 is determined by comparing the distance between discrete points, but this concept can be expanded to a continuous version of toroidal graph. That is, closest pair points can be defined as "the pair of points on the contour lines that are mutually closest." However, since the number of closest pair points can be infinite, appropriate sampling is performed for the actual implementation.

As described above, according to the surface construction method, representation of a closest pair vertex is considered first, followed by that of other points. Therefore, problems of the conventional method such as unnatural attachment of triangle patches based on the local structure of contours can be avoided. Furthermore, since the method first takes every closest pair vertex over the entire circle of the contour into consideration, its resistance to noise due to the local structure of contour is improved.

(4) Surface generation based on the homotopy model

As previously stated, a vertex on the continuous toroidal graph represents the correspondence between the points of the upper and lower contours and the corresponding points are connected by homotopy. More specifically, the surface is generated by the locus of homotopy from f to gU, where U is a function on the continuous toroidal graph, representing the correspondence between contours. When the homotopy is a straight-line homotopy, it simply means that they are connected by a straight line segment. In the following, surface generation using the homotopy model is discussed.

In this homotopy model, the surface patch between adjacent contours is generated by connecting corresponding points on each contour by a homotopy. In this model, which is different from the representation of corresponding pair points on the discrete toroidal graph, all the points on each contour have their corresponding points on the adjacent contours, and a homotopy is used like fiber for connecting the corresponding points. The surface patch between the contours is regarded as the locus of the homotopy. A simple example to understand this model is a cylinder. The surface between two circles are generated by connecting corresponding points on each circle. With details omitted, this model includes parametric surfaces.

⊚ Generation of parametric surfaces using a homotopy

Let the lower and upper contour lines be expressed by maps f, g: $X \to R^3$, where $X=[x_0, x_1] \in R$.

For simplicity, let the lower contour line be on the plane z=0 and the upper line z=1 and X=I. Then, "two points $P(p_x, p_y)$ and $Q(q_x, q_y)$ connected by a homotopy F" means that there exists $x \in I$ such that $$F(x, 0) = f(x) = (p_x, p_y, 0)$$

and $$F(x, 1) = g(x) = (q_x, q_y, 1)$$

hold. Namely, any cross section of the surface between the lower and upper contours on the plane z=t is given by F(x, t) for $x \in X$, where F is a homotopy from f to g. In other words, the surface is represented by the bivariate function F(x, t).

Figure 29:
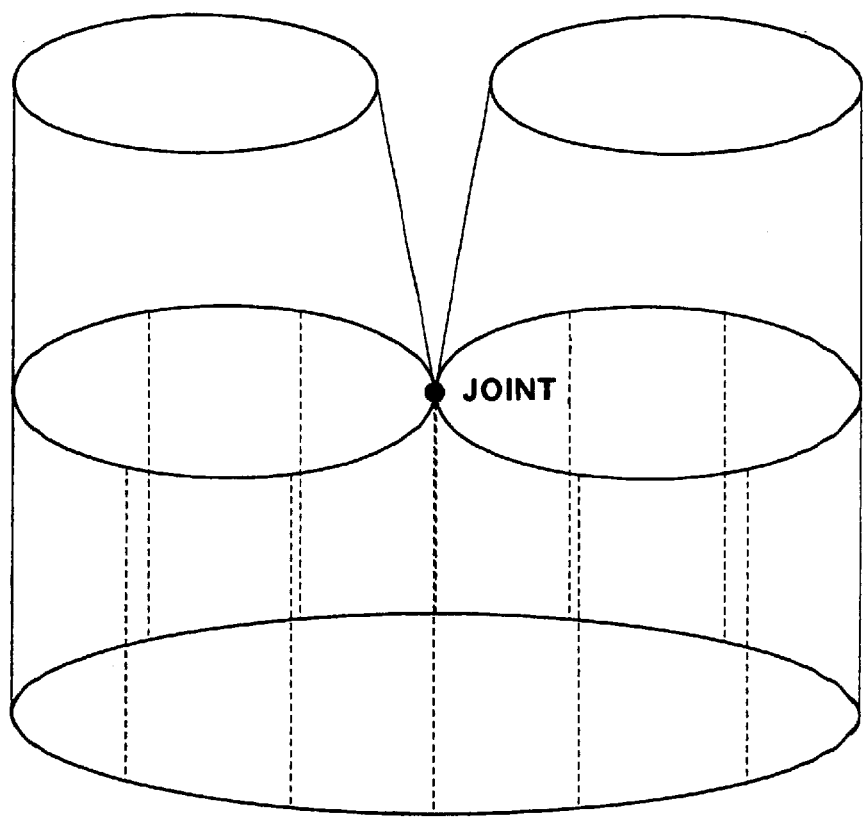
FIG. 29 shows branch handling of an object.

When two contour lines are both single loops, they are homeomorphic. When two contours contain different numbers of loops, they are not homeomorphic. In that case, branch handling is necessary. For simplicity, we assume that the upper contour consists of two loops and the lower contour consists of one loop. Branch handling can be accomplished by introducing an intermediate contour between the upper and lower contours such that the two are joined at one point. As illustrated in FIG. 29, when this joint is regarded as one point, the intermediate contour line consists of two loops, and when this joint is regarded as two separate points, the intermediate contour line consists of a single loop.

⊚ Generation of surfaces from the toroidal graph representation

Let f, g: $I \to R^3$ be functions representing the lower and upper contour lines. For the homotopy model, the acceptable path to be considered must be represented on the toroidal graph by a monotonously increasing continuous function U: $I \to I$ that has its inverse function $U^{-1}$. Then, the surface to be generated is expressed by the homotopy between f(x) and g(U(x)). When a straight-line homotopy is used, it is expressed as follows.

$$\tilde{F}(x, t) = \begin{cases} (1-t)f(x) + tg(0) & x \leq t \\ (1-t)f(0) + tg(x) & x > t \end{cases} \quad [13]$$

The cardinal splines can be also used. Let the function representing a series of four contour lines be $f_{-1}$, $f_0$, $f_1$ and $f_2$, and the respective acceptable paths be $U_{-1}$, $U_0$ and $U_1$. Then the surface between $f_0$ and $f_1$ is represented by the following equation.

$$F(x, t) = w_{-1}(t)f_{-1}(U_{-1}^{-1}(x)) + \\ w_0(t)f_0(x) + w_1(t)f_1(U_0(x)) + w_2(t)f_2(U_1(U_0(x))) \quad [14]$$

where $$(w_{-1}(t)w_0(t)w_1(t)w_2(t)) = (t^3 t^2 t 1)\begin{pmatrix} -a & 2-a & -2+a & a \\ 2a & -3+a & 3-2a & -a \\ -a & 0 & a & 0 \\ 0 & 1 & 0 & 0 \end{pmatrix} \quad [15]$$

When $f_i$ is represented by the cardinal spline function, the surface is referred to as the cardinal spline surface.

[4] Automatic construction of Reeb graph from cross sectional contours (1) Introduction This chapter describes a method for automatically obtaining codes when cross sectional contours are given. This technique enables the handling of the shape of a natural object using the given cross sectional contours. First, the Reeb graph of an object is automatically reconstructed. The coding of the surface can be computed from the Reeb graph easily. Here, $C^2$ continuity and non-degeneracy of singular points are assumed.

This operation can be regarded as the reverse operation of generating surfaces from codes described in chapter [2]. It allows users to describe a Reeb graph or cross sections instead of coding a surface directly. This method is also useful when the result is directly fed to the surface reconstruction system using cross sectional data.

When applications in the medical field are considered, preparing the data for the surface reconstruction system involves a sequence of steps: CT-scanning of the organ, photographing, registration, digitizing the outline curves of contours, deciding which contours are to be connected, smoothing out misregistered data points, and, finally, surfacing.

One of the most difficult parts of this process is deciding between which contours surface patches should be generated. This is where the Reeb graph comes in. The graph represents each contour as a node and shows the topological relations between contours in two successive cross sections.

For example, FIGS. 4a–4c previously described show the Reeb graph of the height function of a torus. In this example, a point in the Reeb graph represents a contour on a cross-sectional plane. When the data is complicated, as in the case of semicircular canals in a human inner ear, the manual generation of the Reeb graph is laborious and difficult. It becomes almost impossible to understand the global topological structure of objects from the overwhelming number of cross sections.

To make understanding the topological structure less overwhelming, an automatic method of reconstructing the Reeb graph was developed. If a pair of contours with each contour lying on the adjacent cross sections are considered, a weight function of the pair of contours can be defined. This method constructs the graph automatically using the weight function and a priori knowledge of the number of holes (handles) through the surface. First, this algorithm automatically generates the major parts of the edges of the Reeb graph where the number of contours does not change. Then, the rest of the graph is determined using the weight function and a priori knowledge concerning the handles. Specifically, the graph is completed by adding edges that do not contradict the known number of handles in descending order of the weight (edges are added first where the weight is greatest).

(2) Definition of the Reeb graph

The Reeb graph represents the topological "skeleton" of a 3D object and shows between which contours the surface patches should be generated.

The Reeb graph is defined on a manifold, which can be regarded as a space that has the same local properties as the Euclidean space. For instance, a plane or a sphere is a 2D manifold. Hereafter, it is assumed that the surface of a 3D object is a 2D manifold.

In this chapter, the Reeb graph of the height function h(X) is used on the surface of an object's 2D manifold. Here, h(X) gives the height of the point on the object surface at X=(x, y, z) embedded in $R^3$, where x, y, z $\in$ R. Namely, h(x, y, z)=z.

The Reeb graph of the height function on a surface is the quotient space of the graph in $R^3$. This quotient space identifies $(x_1, y_1, z)$ and $(x_2, y_2, z)$ if these two points are in the same connected component on the cross section of the surface at the height z (FIGS. 4a–4c). This is easy to see when cross-sectional planes perpendicular to a z axis as in FIG. 4b are considered, that is, the Reeb graph represents the contours on each plane as nodes. A hole through an object surface (a handle) appears as a loop in the Reeb graph when all the critical points are nondegenerate and the number of edges incident to each saddle point is three. This knowledge is used in the algorithm described below.

The Reeb graph shows between which contours the surface patches exist. In what follows, it is assumed that the equation of the ith cross-sectional plane from the bottom is $z=z_i$, and this plane is referred to as the ith frame.

(3) Construction of the Reeb graph
  ⊚ Weight function

A weight function to construct the Reeb graph can be defined when a series of cross sections exist. Given a pair of contours with each contour lying on the adjacent cross sections, the function gives the weight. When handling branches, edges between contours are spanned in descending order of weight.

The weight function can be constructed in several ways. The weight function should give greater weight to pairs of contours that are closer to each other. In this case, the inverse of the "average distance" between the contours was used. In what follows, average distance is divided by the distance D between contours in order to compare the weight of pairs of contours at different cross-sectional planes.

$L^j_i$ denotes the ith contour on the jth frame and $q(L^j_i, L^{j+1}_k)$ the weight of the edge that corresponds to the surface patch generated between $L^j_i$ and $L^{j+1}_k$. $N^j$ is the number of contours in the jth frame and $N_{frame}$ is the number of frames. The contours are assumed to be approximated by polygons and the following equation is used in the implementation.

$$q(L^j_i, L^{j+1}_k) = n^j_i D_j \Big/ \sum_{m=0}^{n^j_i} f(x^j_{i,m}, L^{j+1}_k). \quad [16]$$

Here, $D_j$ is the distance between the jth and j+1th frames. $x^j_{i,m}$ is the mth vertex of the polygon that approximates $L^j_i$ which has $n^j_i$ vertices. f is defined by the following equation.

$$f(x, A) = \min_{y \in A} d(x, y) \qquad [17]$$

where d is the distance function, and A is a set of points in $R^3$ and x, y $\in R^3$. The function f gives the minimum distance between x and points in set A.

◎ Automatic construction of the Reeb graph

Now the reconstruction of the Reeb graph with our algorithm is described using the weight function and the given series of cross sections. First, as in Case 1 described below, the major parts of the graph where the number of contours does not change are generated. The changing situation is handled in Case 2. Edges that do not contradict knowledge of the number of holes are then spanned in the Reeb graph in descending order of weight.

Case 1

$$N^j = N^{j+1}$$

Case 1a

The contours consist of pairs of contours $L^j_{i1}$ and $L^{j+1}_{i2}$ that are nearest to each other. That is, for said pair, $$q(L^j_{i1}, L^{j+1}_{i2}) = \max_{k=0}^{k=N^{j+1}-1} q(L^j_{i1}, L^{j+1}_k) \text{ and} \qquad [18]$$

$$q(L^{j+1}_{i2}, L^j_{i1}) = \max_{k=0}^{k=N^j-1} q(L^{j+1}_{i2}, L^j_k)$$

hold. (Such a pair is called "a nearest contour pair".)

Using the weight function, edges connect the pairs of contours. Cases 1 and 2 are illustrated in FIGS. 30a–30e. It is assumed that cases such as those illustrated in FIGS. 30a and 30b do not occur.

Case 1b

Cases other than case 1a.

Figure 30A:
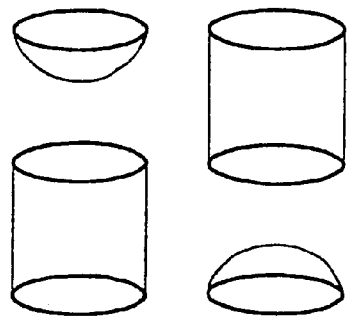
FIG. 30a shows correspondence of contours.
Figure 30B:
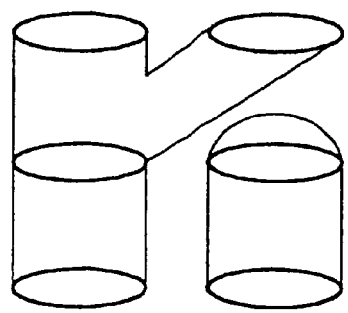
FIG. 30b shows correspondence of contours.
Figure 30C:
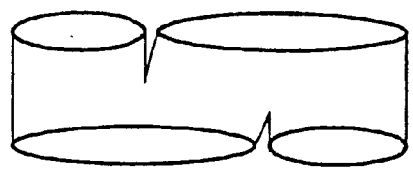
FIG. 30c shows correspondence of contours.

It is considered that bifurcation occurs as shown in FIG. 30c. In this implementation, an edge is spanned between a pair $L^j_{i1}$ and $L^{j+1}_{i2}$, when $$q(L^j_{i1}, L^{j+1}_{i2}) = \max_{k=0}^{k=N^{j+1}-1} q(L^j_{i1}, L^{j+1}_k) \text{ or} \qquad [19]$$

$$q(L^{j+1}_{i2}, L^j_{i1}) = \max_{k=0}^{k=N^j-1} q(L^{j+1}_{i2}, L^j_k)$$

holds.

Case 2

$$N^j \neq N^{j+1}$$

Case 2a

Figure 30D:
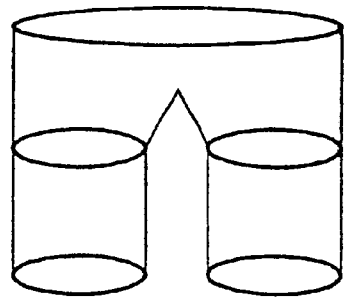
FIG. 30d shows correspondence of contours.

Bifurcation occurs between the two frames (FIG. 30d).

Case 2b

Figure 30E:
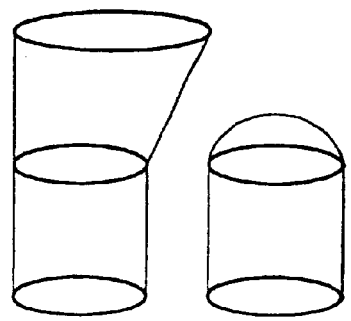
FIG. 30e shows correspondence of contours.

No bifurcation occurs (FIG. 30e).

The two cases can be discriminated by the weight function. When both $q(L^j_{i1}, L^{j+1}_k)$ and $q(L^j_{i2}, L^{j+1}_k)$ are high, there is a strong possibility of bifurcation from $L^{j+1}_k$ to $L^j_{i1}$ and $L^j_{i2}$.

Thus, it is possible to judge a possibility of bifurcation even using only the weight function. However, here is proposed an algorithm that uses an object's global information in addition to its weight. We let $N_{conn}$ and g be the number of connected components and the number of holes (handles) of the object, respectively. $M_{conn}$ and l are the number of connected components and the number of loops of the Reeb graph, respectively. In the nine-step algorithm described below, we assume that $N_{conn}=1$. Initially, there is no edge in the graph.

Algorithm

Step 1. The function q of all the pairs of contours on the adjacent frames are computed and a table is generated that shows for each contour $L^f_c$ (f is the frame No. and c the contour No.) its nearest adjacent contour $L^{f'}_{c'}$ (f' is the frame No.+di, and c' the nearest contour No.) that gives the maximum value of q with the value of q where di=±1.

Step 2. All the pairs of Case 1 are processed adding to the graph the edges.

Step 3. Pairs of consecutive contour pairs $L^j_{i1}$ and $L^{j+1}_{i2}$ of Case 2 are selected from the table and edges are spanned between nearest contour pairs.

Step 4. If l>g or $M_{conn} < N_{conn}$, the algorithm goes to Step 9.

Step 5. A list of the contour pairs that are not spanned at Step 3 is generated in descending weight order. Edges thus generated are $E_1, E_2, \ldots$.

Step 6. The topmost pair of contours from the list is chosen.

Step 7. When the edge spans the topmost pair, if l≦g and $M_{conn} \geq N_{conn}$, the edge is added to the graph. Otherwise, the edge is rejected.

Step 8. The pair thus processed is removed from the list. If the list is not empty, the algorithm returns to Step 6.

Step 9. If the graph generated does not coincide with expectations, the values of the weight of the pairs of contours that should not be connected are modified to zero interactively and the algorithm then returns to Step 1.

Once the Reeb graph is constructed with the aforementioned algorithm to identify the corresponding contours, the object can be reconstructed using the surface reconstruction technique described in [3]. To apply this algorithm to multi-component objects with $N_{conn}>1$, it is necessary to specify g for each connected component at Step 4.

◎ Medical applications

The algorithm was used to reconstruct the 3D surface of a human ear cochlea and semicircular canals. A human ear specimen fixed with celloidin (tissue slice fixing agent) processing was serially sectioned into slices 20 μmm thick. Photographs were taken of the specimen, converted to image data using a Graphica drum scanner (G-225C), and then outline curves of the objects to be reconstructed were plotted with a stylus pen using an $HP_{9000}$ series model 550 computer. Finally, the modified contour data was fed into a Silicon Graphics' Personal Iris, where the Reeb graph was created and the object's surface reconstructed.

Figure 31:
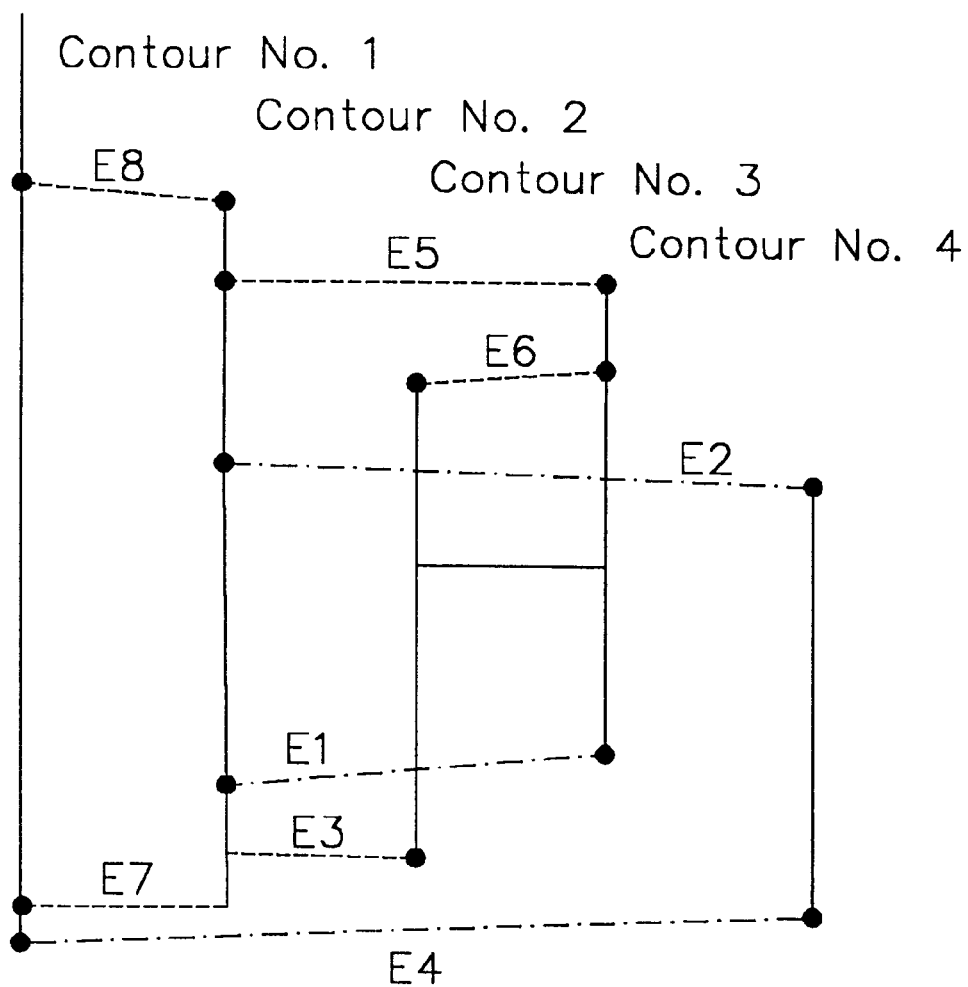
FIG. 31 is a Reeb graph of human cochlea constructed from cross-sectional data.

FIG. 31 illustrates the Reeb graph of a human cochlea constructed from cross-sectional data, representing the spiral structure correctly. In this example, the number of holes g=0.

In this case, first of all, the edges shown by solid lines in FIG. 31 were generated. Then, the edges $E_1$ and $E_2$ were selected. $E_3$, however, was rejected as it makes a loop in the graph. In the same way, $E_4$ was selected, and $E_5$, $E_6$, $E_7$, and $E_8$ were rejected. The procedure ended here as the graph coincided with a priori knowledge.

Figure 32:
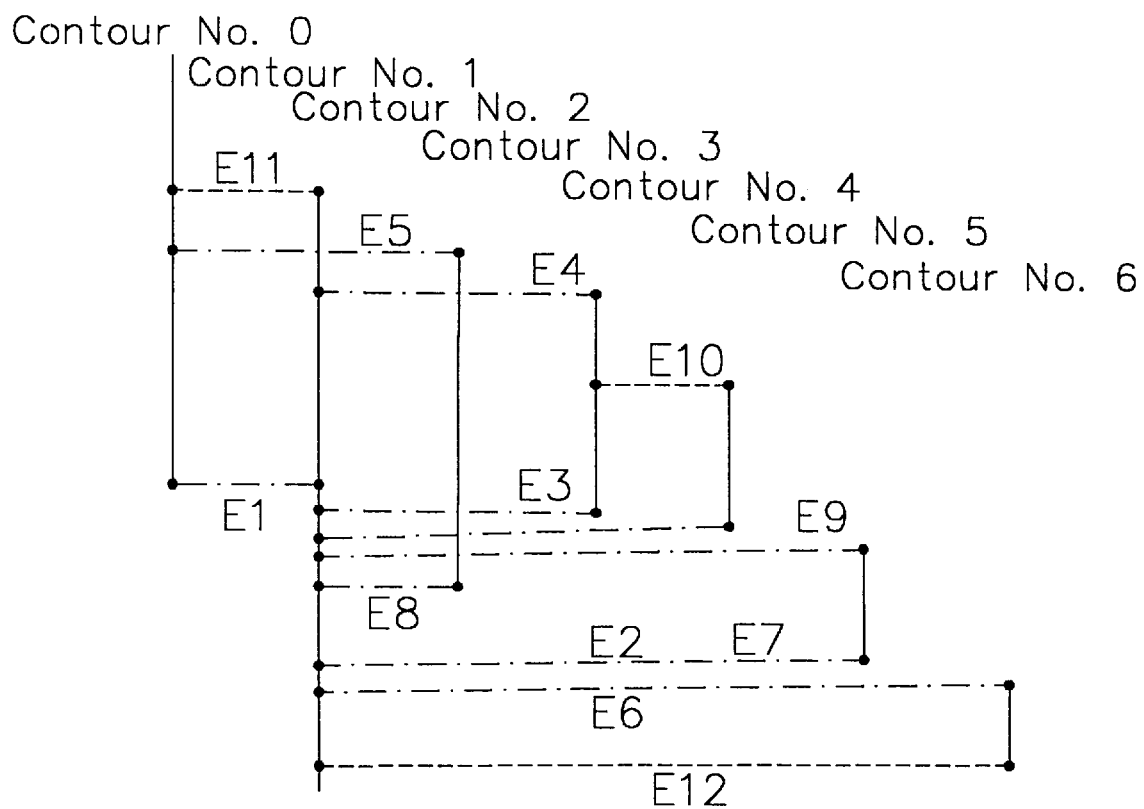
FIG. 32 is a Reeb graph for semicircular canals of an inner ear.

FIG. 32 shows the Reeb graph of semicircular canals in the inner ear. The organ has three holes. In this case, the edges $E_1, E_2, \ldots, E_8$, and $E_9$ were selected, and $E_{10}$, $E_{11}$ and $E_{12}$ were rejected. As a result, three loops were truly generated in the graph.

This automatic algorithm works better than usual human visual methods because, when there are sufficient cross sections, the algorithm handles branches correctly because the value of the function q becomes high for such contours. This information is hard to be obtained by only looking at the cross sections. No human interaction was required in this experiment.

(4) Coding of the surface using the Reeb graph

Once the Reeb graph is reconstructed, it is easy to obtain the codes for the surface. Therefore, it allows users to code the object by describing a Reeb graph or cross section data instead of coding the surface directly. The coding can be obtained by the following procedures scanning the Reeb graph from top to bottom.

1. When a node of the graph newly appears at a certain level, the corresponding code is Put_e2. When it is contained in an existing contour (let it be contour #n), the corresponding code is Put_e2(n).
2. When a node of the graph disappears at a certain level, the corresponding code is Put_e0.
3. When two edges are merged, the coding is Put_e0_merge. When the child contours of the new contour do not coincide with the child contours of the two contours that have been merged, an error is reported.
4. When an edge splits, the corresponding code is Put_e1_divide.

The children of the split contour (the second parameter "clist") are decided by checking the containment relation of contours. When the contour of one of the branches (let it be #m) is contained in the other (let it be #n), the third parameter is "outside", while otherwise (a sibling contour) it is "inside". In the case of "outside", it is checked if the child contours of #m have become the children of #n. In the case of "inside", it is checked if the child contours of #m and #n coincide with the child contours of the old contour.

After the code at a certain level is computed, it is checked whether the parent-child relation of contours at that level coincides with the result of applying the derived operator to the tree structure of contours. If it does not, it is an error. The weight of one of the edges violating the parent-child relation is modified to zero, and the automatic construction procedure is used again.

EMBODIMENTS

The preferred embodiments of the present invention will next be described in view of the aforementioned premised techniques.

Regarding the premised technique [1], Morse theory, which teaches information concerning singular points and indices only, can show as a concept the type of cells constituting a solid. However, Morse theory fails to present a concrete geometrical relationship in which those cells are to be connected to one another. The Reeb graph does not solve this problem of Morse theory since it cannot provide information regarding knots or hierarchical relation, though it can provide information regarding the mutual relationship between singular points. In order to understand a knot, information on embedding, that is, geometrical information, is indispensable. These problems must be solved to achieve the industrial object of precise solid coding, if not a mathematical object.

In view of the above, the present invention introduces icon display. Icon display allows expression of hierarchical relation between contours, based on their tree structure, and visual specification with ease of the embedded state of a solid. Icon display is associated with the four types of operators (Put-e0, etc.) which are necessary and sufficient for solid coding. This permits solid encoding with topological integrity assured, using icons as a user interface and operators for system internal processing.

The technique [1] above aims at newly designing a solid. It is not a technique for automatic re-structuring of an extant solid based on its cross sections. The aim of the present invention, on the other hand, is equivalent to the re-structuring of a solid using its cross sections as key frames. The technique [1] is thus utilized in the fourth embodiment of the present invention as a mere example of an application and not as the primary means.

Regarding the premised technique [2], when a solid is encoded by technique [1], a surface is created for it with technique [2]. Here, critical sections are all known since they correspond to respective operators (or icons) in the encoding according to the technique [1]. Thus, homotopic connection between respective critical sections will be able to re-create the surface of the solid. This is because the topology remains the same between critical sections, and homotopical connection keeps the topology unchanged. The technique [2] is related to the technique [1] and utilized in preferred embodiment 4, similar to technique [1].

Regarding the premised technique [3], with cross sectional data given, corresponding points are detected between a corresponding contour pair to create a surface between the contours. In the technique [3], corresponding contour pairs are assumed to have been known, and contour branching is not considered.

A toroidal graph is used for detecting corresponding point pairs. Besides a conventional discrete toroidal graph, a continuous toroidal graph, suggested by the present inventor, may also be applied in the present invention. The latter is more effective for detection of more natural corresponding point pairs.

When the continuous toroidal graph is applied, the algorithm suggested by the present inventor may be employed for detecting the longest path passing the maximum number of runs. A run is used for grouping predetermined closest point pairs together to reduce amount of computation and to find a natural pass.

With the closest point pairs known, all the points on one of the two contours, i.e., the contour f(x), can be corresponded to those on the other corresponding contour g(y) through interpolation between the closest point pairs. Given x and y are arc distances on the respective contours, the corresponding point pairs can be expressed as y=U(x). With U known, a surface can be created by connecting f(x) and g(U(x)) with homotopy F.

After corresponding point pairs are found by the technique [4], the technique [3] is used as main means in the first and second preferred embodiments of the present invention. That is, corresponding point pairs are automatically detected using the technique [3] in the present invention in which an animator is not required to designate those points manually, thereby reducing burden.

Regarding the premised technique [4], as preparation for resorting the technique [3], corresponding contour pairs are detected between adjacent cross sections. Detection of such pairs may be considered equivalent to generation of the Reeb graph.

Corresponding contour pairs are detected differently depending on the case. For the same number of contours contained in adjacent cross sections, closer contours are corresponded to each other according to a weight function. For different numbers of contours, closer contours are corresponded to each other while the number of connected components and handles of an object are checked. This processing can be achieved following the algorithm for automatic generation of the Reeb graph suggested by the present inventor.

In the present invention, however, for facilitating specification by users, predetermined default is set for the numbers of connected components and handles. Default setting is made in consideration of subsequent animation creation. Besides these parameters, spontaneously generated/ disappearing contours are presumed based on a tree structure, introduced in [2], which represents the hierarchical relation of contours. A user is prompted to input simple instructions to verify his/her intention.

Embodiment 1

In the premised techniques, the ultimate object desired is a solid with homotopically created surface. Thus, the main object of the premised techniques is expression of an object's 3D shape as a still picture.

In the present invention, on the other hand, a solid is used merely as means for the final target animation frames. The main purpose of the present invention is expression of a 2D object shape as a motion picture. For this purpose, the z axis of a solid is used as the time axis in the present invention. In the first embodiment, an automatic intermediate dividing system for animation creation according to the present invention will be described.

Hardware needed for the system to achieve this embodiment comprises only a personal computer (PC) to be used as a platform for automatic intermediate dividing and an image scanner for inputting key frame images drawn by an animator into the PC. If key frames are prepared using image drawing software run on a PC, an image scanner is unnecessary. As another configuration, a printer and a magnetic storage device may be employed for outputting respective frame images of created animation and for storing animation data.

Figure 33:
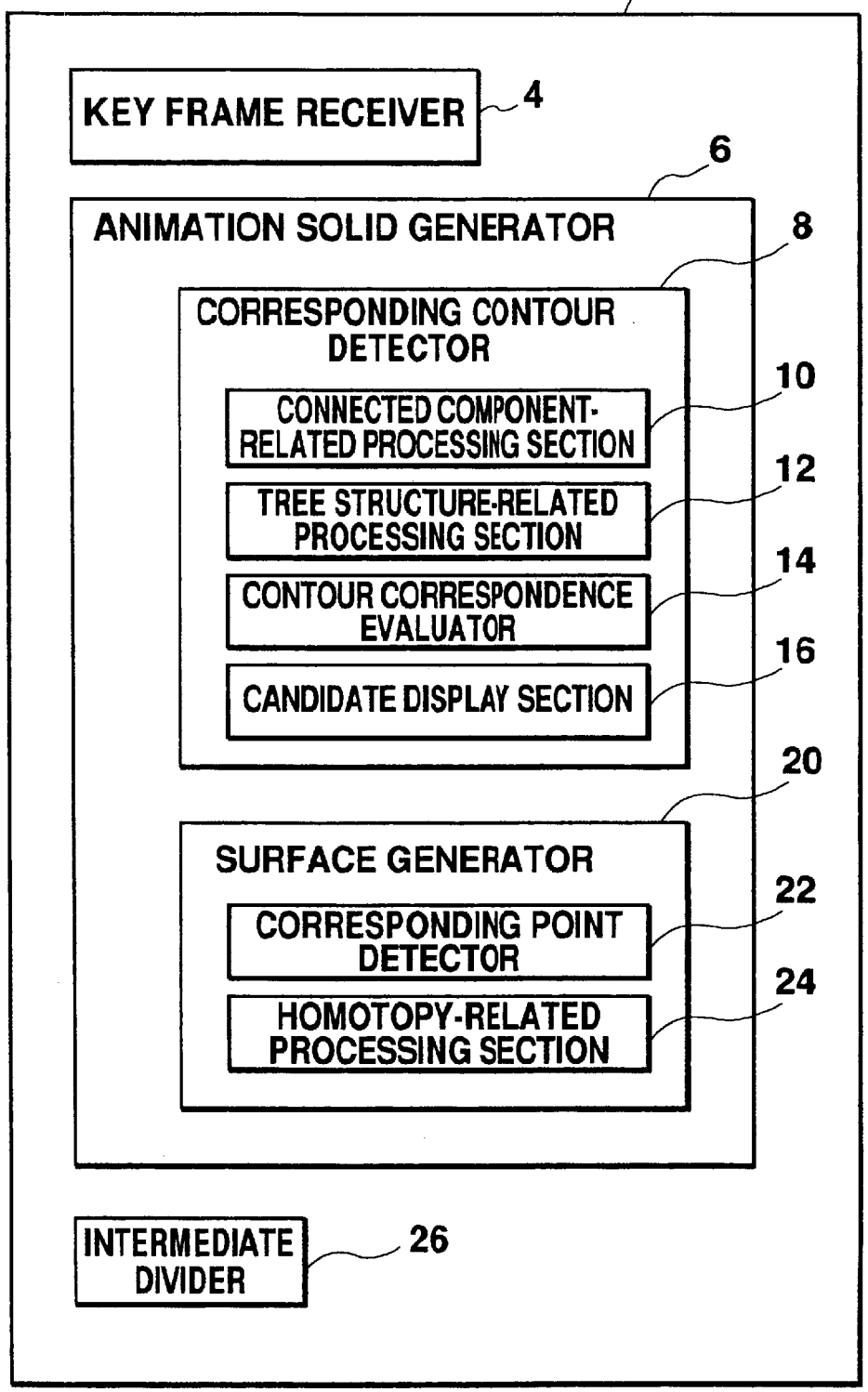
FIG. 33 is a block diagram illustrating the configuration of software modules employed in an intermediate dividing system of the first embodiment.

FIG. 33 is a block diagram illustrating the configuration of software modules employed in an intermediate dividing system 2 of this preferred embodiment. This system mainly comprises a key frame receiver 4 for receiving key frame images, an animation solid generator 6 for generating an animation solid based on a plurality of key frames, and an intermediate divider or tweening section 26 for obtaining intermediate frames by chopping a created animation solid.

The animation solid generator 6 includes a corresponding contour detector 8 for detecting corresponding contour pairs between adjacent key frames and a surface generator 20 for homotopically generating a surface between corresponding contour pairs.

The corresponding contour detector 8, which utilizes the promised technique [4], includes a connected component-related processing section 10 for processing information regarding connected components, a tree structure-related processing section 12 for presuming contours to disappear based on the tree structure of contours and for other processing relating to a tree structure, a contour correspondence evaluator 14 for evaluating correspondence probability between contours, based on their proximity, connected components and a tree structure. The surface generator 20 includes a corresponding point detector 22 for detecting corresponding point pairs between corresponding contour pairs by using the promised technique [3], a homotopy-related processing section 24 for generating the surface of an animation solid based on the extended toroidal graph using

Figure 34:
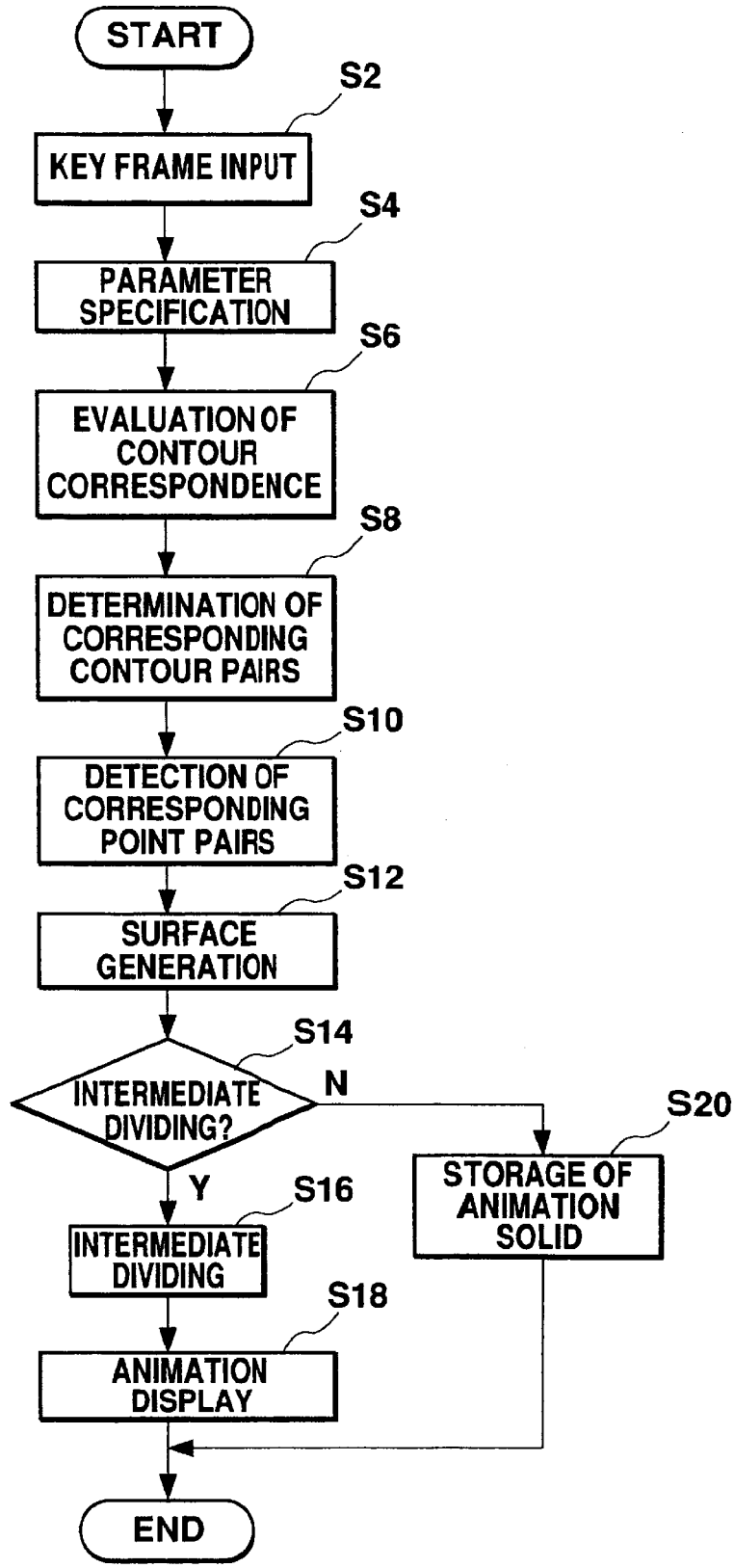
FIG. 34 is a flowchart showing an intermediate dividing procedure executed by an intermediate dividing system of the first embodiment.

[3] (4) "Surface Creation based on a Homotopy Model." In the following, an intermediate dividing procedure by the system 2 will be described with reference to FIG. 34.

(S2) Key Frame Input

A user inputs a plurality of key frames. The contours of an object drawn on the key frames are approximated using various shape functions, such as points, circles, polygons, Bezier, and NURBS. Functions may be selectable by a user. If precision is required, the selected function will be those which allow precise reproduction of quadratic curves, such as an NURBS curve. Here, two key frames F0 and F1 shown in FIG. 35 are input. The key frames F0 and F1 both show a circular object 30 (hereinafter "Oc30") and a rectangular object 32 (hereinafter "Or32"). Oc30 is shown on the left half of the key frame F0 and moved to the right half on the key frame F1. It is a circle on the former and transformed to be an oval on the latter. Images may be drawn by free-hand on key frames.

(S4) Parameter Specification

The user then specifies various parameters as to the following two points.

1. the number of connected components of an object: $N_{conn}$ 2. whether to consider the tree structure of contours The number of connected components is the number of objects appearing on a key frame. In this example, the larger number of connected components appearing on the two key frames is defined as $N_{conn}$. Note that if the number of connected components is unspecified by a user, the system sets default values as follows;

$$N_{conn} = \max (N^{F0}, N^{F1})$$

wherein $N^{F0}$ and $N^{F1}$ are the numbers of contours contained in the key frames F0 and F1, respectively. Here, provided that the user did not specify, the system, in particular, the connected component-related processing section 12 sets as $N_{conn}=2$ since $N^{F0}=N^{F1}=2$ is known from FIG. 35.

A tree structure is an embracing relation among contours, as is defined in the premised technique [2] using terms of a parent contour, a child contour, etc. When a tree structure is considered, subsequent corresponding contour pair detection should obey the following rules.

1. A disappearing contour, if any, is a child contour at the lower end (a leaf) of the tree structure.

2. A spontaneously generated contour cannot be a parent contour of an extant contour.

Without specification by users, the system, in particular the tree structure-related processing section 12, internally sets default of "a tree structure not considered." In this embodiment, it is provided that a tree structure is not considered.

(S6) Evaluation of Contour Correspondence

The contour correspondence evaluator 14 evaluates correspondence among contours. For evaluation, all of the contour pairs that may possibly correspond to each other between the key frames F0 and F1 are extracted, while the specifications made at S4 is considered. In this example wherein the number of connected components or $N_{conn}$ is 2, the following two pairs are possible when represented as (a contour contained in F0, a contour contained in F1):

Combination 1 (Oc30, Or32) and (Or32, Oc30)
Combination 2 (Oc30, Oc30) and (Or32, Or32).
Given the third combination as follows
Combination 3 (Oc30, Oc30) and (Or32, Oc30), two contours of this combination will be integrated into a single contour, thereby leaving a single connected component only. This contradicts $N_{conn}=2$. Therefore, the above two combinations are only of possibility, and they are intact candidates for a corresponding contour pair when a tree structure is not considered here.

Following this, judgment is made to see which pair is most reasonable by evaluating the proximity of paired contours of the four pairs included in the above combinations. The most reasonable pair is thought to be a closest contour pair. Closest contour pairs can be obtained using a weight function of the promised technique [4]. Of the above pairs, the pair (Or32, Or32) is judged as a closest contour pair in this case. The combination 2, which includes this pair, is automatically selected as the combination of corresponding contour pairs.

(S8) Determination of Corresponding Contour Pairs

A corresponding contour pair has been selected at S6. The present system, particularly a candidate display 16, displays the thus selected corresponding relation on its screen as shown in FIG. 36. If the displayed relation is acceptable, the user inputs "OK" to thereby determine that pair as a corresponding contour pair. This processing at S8 may be skipped as an optional function.

(S10) Detection of Corresponding Point Pairs

The surface generator 20 (see FIG. 33) detects respective corresponding point pairs on the contours constituting the corresponding contour pairs (Oc30, Oc30) and (Or 32, Or32).

Figure 37:
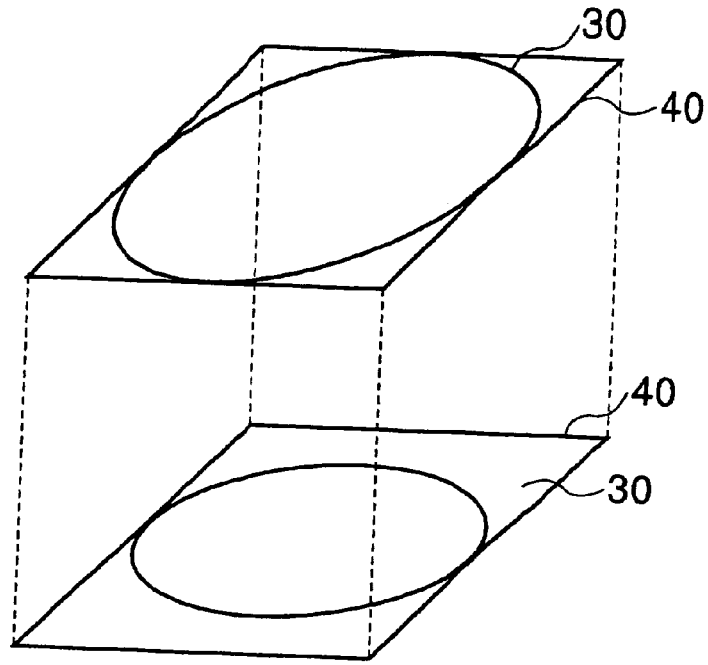
FIG. 37 shows normalization of contours for detection of corresponding points (S10) in first embodiment.

The pair (Oc30, Oc30) will be taken as an example here. As shown in FIG. 37, the two contours are transformed or normalized so as to fit into squares of the same size. The shape of the contours are expressed by means of a spline curve or a NURBS curve. The shape functions of the upper and lower contours are defined as f(x) and g(y), respectively, wherein x and y are arc length. This denomination corresponds to the case where arc length is used as a parameter for a continuous toroidal graph in the promised technique [3] (3).

Figure 38:
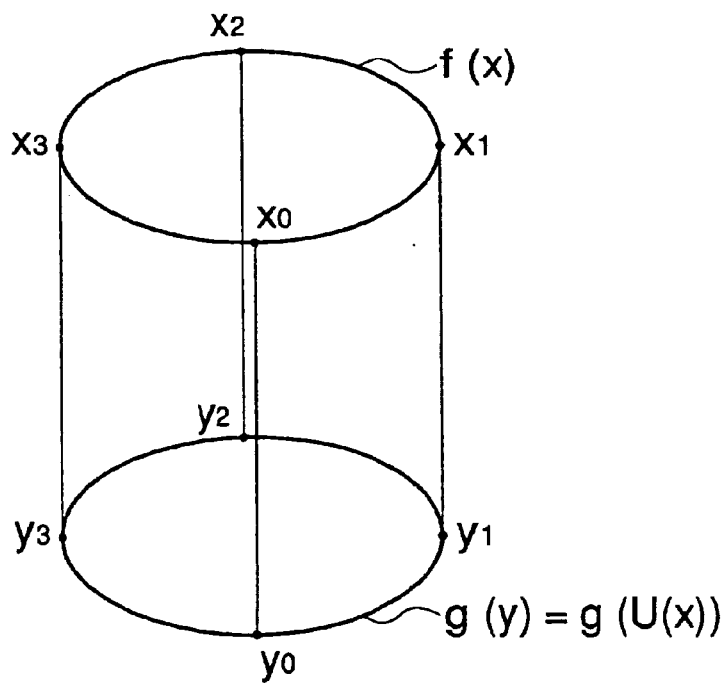
FIG. 38 shows closest point pairs obtained through corresponding points detection (S10) in the first embodiment.

Closest point pairs are next obtained between the upper and lower contours. Given a point a on one of the paired contours, or the contour A, is the closest point of the point b on the other paired contour B and vice versa, these points a and b make a closest point pair. FIG. 38 shows the thus obtained closet point pairs xi-yi. An algorithm for finding the maximum number of the longest runs is utilized for implementation of closest point pair detection.

With closest point pairs detected, correspondence between points other than paired closest points is determined through interpolation. In the example shown in FIG. 38, points between the points x0 and x1 on the upper arc contour are assumed corresponding to those between the points y0 and y1 on the lower arc contour. When correspondence is known with respect to all of the points on the contours, a monotone nondecreasing increase function y=U(x) is fixed. Corresponding point pairs are expressed using this function. Or32 will be processed in the same way.

(S12) Surface Creation

The homotopy-related processing section 24 creates a surface of an animation sold. This creation is made utilizing the surface creation technique with homotopy, introduced in the premised technique [3] (4). In concrete terms, point pairs on two contours, whose correspondence are all known according to y=U(x), are connected to each other by homotopy as if they are connected via a fiber. For connection with a straight line, a straight line homotopy $$F(x,t)=(1-t)f(x)+tg(x)$$

may be employed. To be more precise, g(x) in the above expression should be g(U(x)). Precision requirements are less strict for animation than for solid designing, so most animation cases may be handled with a straight line homotopy.

Figure 39:
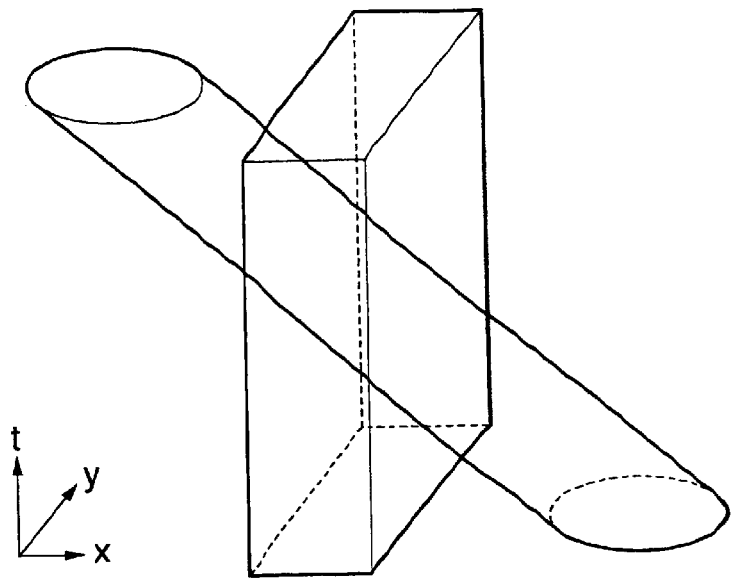
FIG. 39 shows an animation solid created in the first embodiment.

FIG. 39 shows the animation solid created as above. Upper and lower surfaces correspond to the key frames F0 and F1, respectively. This animation solid is characterized by consisting of two imaginary solids relative to Oc30 and Or32. Those two solids are treated as separate solids passing through each other although they seem joining each other in FIG. 39, since the connected components is defined as 2 ($N_{conn}=2$) here.

(S14) Verification of Intermediate Dividing

With the animation solid created, the system prompts the user whether or not to execute intermediate dividing. The system proceeds to S16 with "YES" input, and to S20 with "NO."

(S16) Intermediate Dividing

The system encourages the user to input parameters necessary for intermediate dividing. The parameters are, for instance, display times of the key frames F0 and F1 and/or the number of intermediate frames to be created. With display times specified, the necessary number of intermediate frames according to NTSC may be calculated by dividing the difference in display time of the two key frames by 1/30 seconds. To the contrary, if the number of intermediate frames to be created is input, intermediate dividing can be performed without frame display time input.

Figure 40:
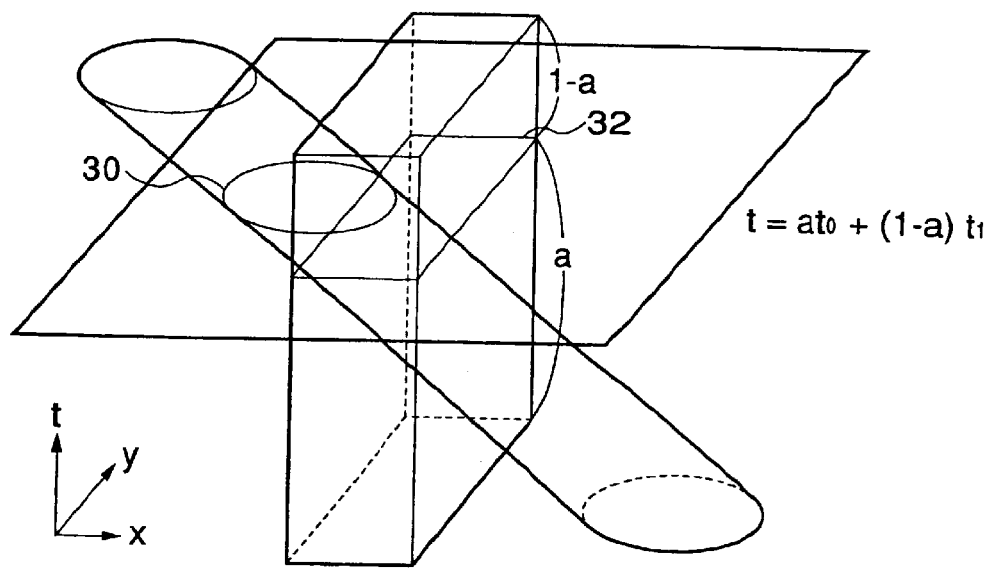
FIG. 40 shows intermediate dividing processing of first embodiment.

FIG. 40 shows intermediate dividing processing. Given that the key frames F0 and F1 correspond to respective display times t0 and t1, an intermediate frame to be displayed at time t=at0+(1−a)t1, a∈[0,1] is defined by the cross sectional shape of a plane which includes a point dividing the vertical axis of the animation solid at the ratio (1−a):a. In FIG. 40, the obtained intermediate frame presents Oc30 and Or32 partly overlapping each other.

(S18) Animation Display

Figure 41:
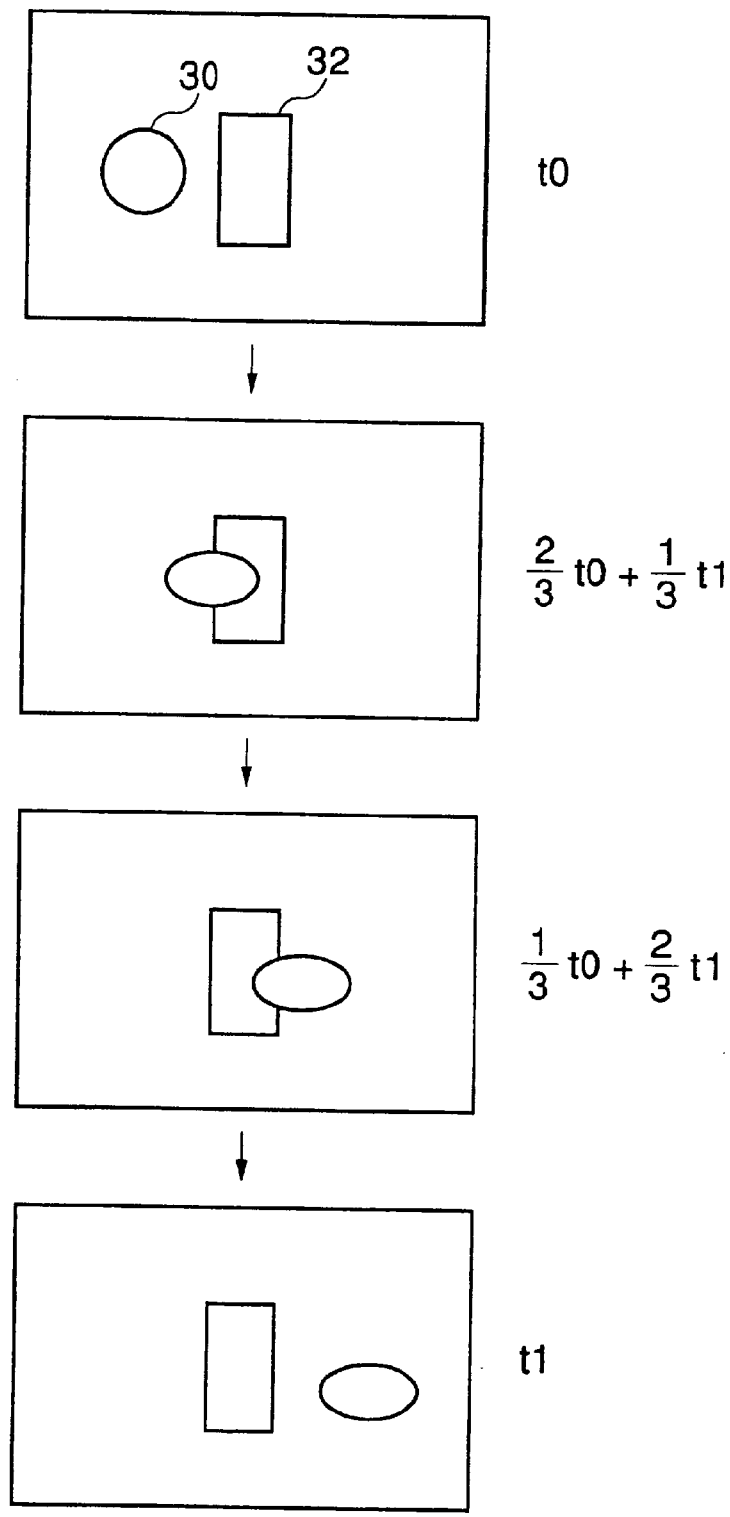
FIG. 41 shows an animation created using two intermediate frames of the first embodiment.

Animation is created from intermediate frames which have been obtained between the key frames F1 and F0 by varying the parameter a. FIG. 41 shows an animation created using two intermediate frames. That is, an animation solid is chopped by planes at t=2t0/3+t1/3 and t=t0/3+2t1/3 so that two intermediate frames are obtained. By inserting those two intermediate frames between two key frames and displaying all four frames sequentially, animation is created in which Oc30 traverses Or32. Whether Oc30 passes in front of or behind Or32 is determined depending on which image data regarding Oc30 or Or32 is first drawn for display on intermediate frames. For Oc30 passing in front of Or32, the image data for Or32 is first drawn and the image data for Oc30 will later be superimposed thereon. The system may inquire the user as to which object is located farther. If Or32 is farther, the system processes Or32 prior to OC30 to create desired animation.

The system may ask the user if the displayed animation is acceptable. If the user inputs "NO", the system returns to S8 so that correspondence between contours may be manually corrected. If more than one correspondence is possible for the contours, the candidate display section 16 (see FIG. 33) may, for example, display all of the possible pairs in decreasing order of corresponding probability.

(S20) Storage of Animation Solid

With "NO" input at S14, the system does not execute intermediate dividing and instead stores the created animation solid in a memory device. Naming the animation solid here will help to make an animation database. For reproduction, the animation in need is retrieved from the memory device and processed via intermediate dividing at S16 before displaying.

Following data are necessary for storing animation solids:
1. key frame images
2. information on corresponding contour pairs between key frames
3. information on corresponding point pairs on corresponding contour pairs
4. homotopy for connecting between corresponding point pairs.

The data 4 may be omissible if a straight line, etc., is specified as default. In either case, data amount is rather small, so animation solids are preferably applied to communication. That is, an animation provider may send animation solids via his transmitter to various households, and they may receive the solids via their receivers. Each of the receivers executes intermediate dividing at S16 and displaying at S18 for the received animation solids. In this type of transmission, the provider may send additional information, such as information necessary for intermediate dividing including the number of necessary frames or the like, to respective households by attaching the information to the animation solids.

Embodiment 2

In the above embodiment 1, the number of contours is consistent between key frames. In embodiment 2, correlation between parameter specification and presumption of generated/disappearing contours will be described, taking an example in which the number of contours is changed between key frames.

EXAMPLE 1

Discrete Two Circles (Type 1)

FIG. 42 shows images on the key frames F0 and F1. The key frame F0 contains one object Oc40. The key frame F1 contains separate objects Oc42 and Oc44. In the following, intermediate dividing processing will be described in line with the major steps (see FIG. 34) of the first embodiment.

(S4) Parameter Specification
1. The Number of Connected Components of an Object: $N_{conn}$
   A default value is $N_{conn}=\max(N^{F0}, N^{F1})$. With $N^{F0}=1$ and $N^{F1}=2$ here, the default is set as $N_{conn}=2$.
2. Whether to consider a tree structure of contours.
   "A tree structure not considered" is internally set as default.

(S6) Evaluation of Contour Correspondence
Since $N_{conn}$ is 2 here, possible corresponding contour pairs between the key frames F0 and F1 are limited to the followings:
   Combination 1: (Oc40, Oc42) and Oc44 is spontaneously generated
   Combination 2: (Oc40, Oc44) and Oc42 is spontaneously generated.
Since the pair (Oc40, Oc42) is the closest contour pair, the Combination 1, which includes this pair, is automatically selected as the most reasonable combination of corresponding contour pairs.

Following the above, the system processes S8 and S10.
(S12) Surface Creation
FIG. 43 shows the created animation solid. Oc40 and Oc42 are connected, while Oc44 is generated at a desired point. A cross section which includes the vertex 46 of a solid relating to Oc44 serves as a critical cross section. The system arranges this critical cross section at the position t=(t0+t1)/2, for instance. It is to be noted that although the solid relating to Oc44 is a cone here, it may be a column as well.

Figure 44:
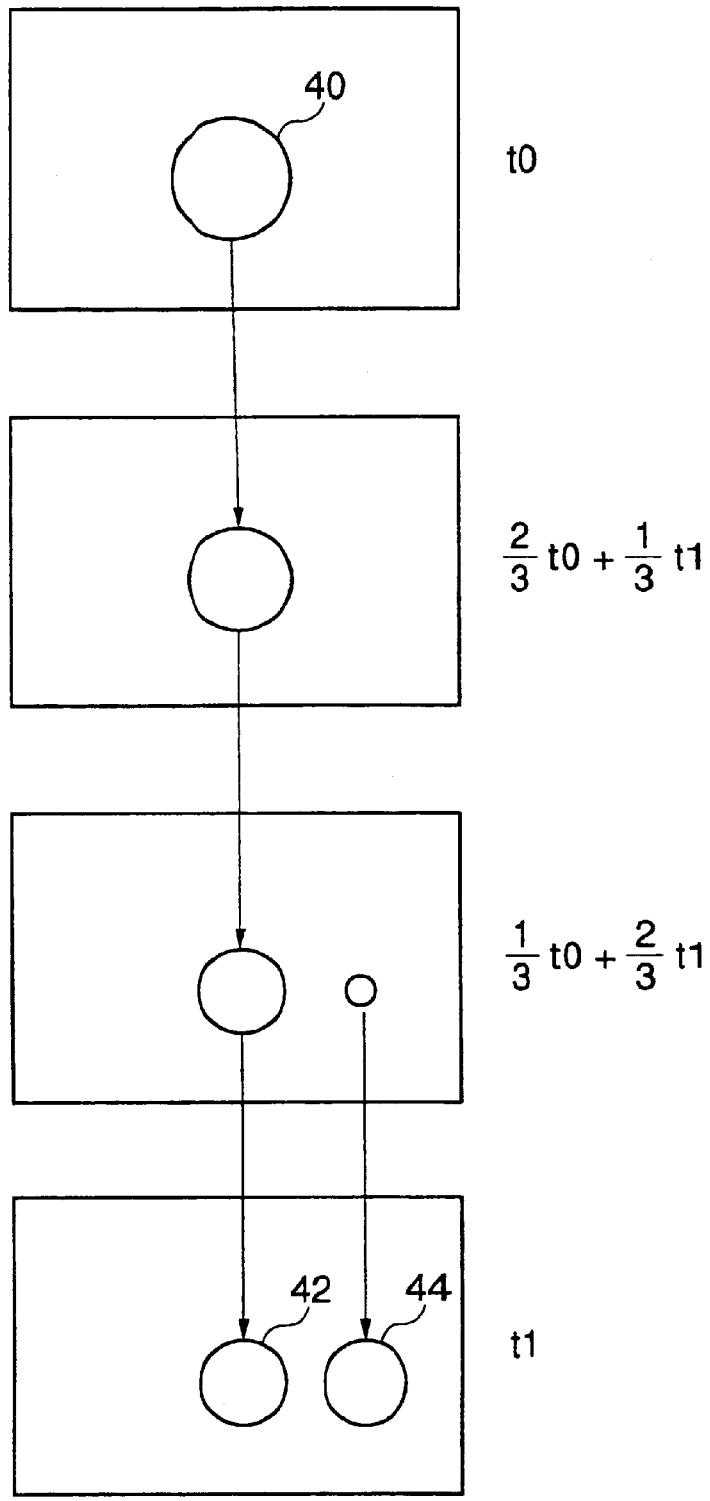
FIG. 44 shows frames of an animation created in Example 1 of the second embodiment.

Following the above, provided that the system proceeds to the processing at S14 and S16.
(S16) Intermediate Dividing
Similar to the first embodiment, an animation solid is chopped by planes at t=2t0/3+t1/3 and t=t0/3+2t1/3 so as to obtain two intermediate frames.
(S18) Animation Display
FIG. 44 shows a case where two intermediate frames are created. Clearly, Oc40 is gradually transformed to Oc42, while Oc44 gradually appears on the screen. Given that the solid relating to Oc44 is a column in FIG. 43, Oc44 will suddenly appear on the screen in its ultimate size. Also, if the solid relating to Oc44 is a cone and the vertex of the cone is moved to the right, the obtained animation will show Oc44 gradually approaching from the right side of the screen. The processing at S20 of the first embodiment is performed in the same way.

EXAMPLE 2

Discrete Two Circles (Type 2)

Figure 46:
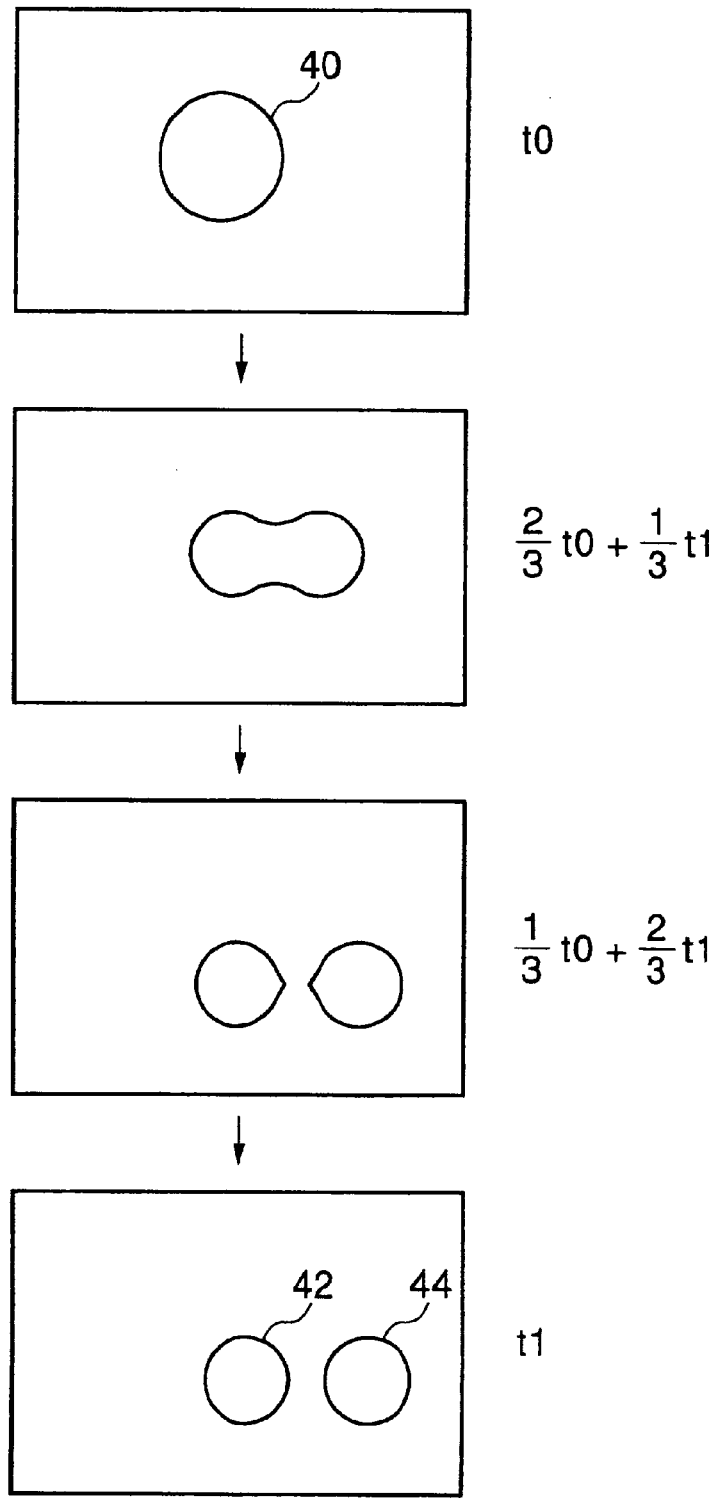
FIG. 46 shows frames of animation created in Example 2 of the second embodiment.

Provided that the two key frames F0 and F1 in FIG. 42 are also input in this example. Oc44, however, is not spontaneously generated here because a desired animation is the one which shows Oc40 branching into Oc42 and Oc44. To create this animation, the following two approaches are available.
[Approach 1]
Similar to Example 1, animation is automatically created without specifying parameters at S4. In such a case, the created animation will be the one shown in FIG. 44. This animation, however, is not acceptable here and the user thus inputs "NO" at S18. Responding to this input, the system returns to the processing at S8, where the user may manually correct the correspondence between contours. For correction, the user may use a mouse to explicitly select Oc40 and Oc42 for one pair and Oc40 and Oc44 for another.
[Approach 2]
The number of connected component $N_{conn}$ is explicitly specified at S4. In this example, $N_{conn}=1$ may be specified. With this specification, the animation solid bifurcates as shown in FIG. 45. Bifurcation produces a saddle point 48. The cross section containing this point 48 will serve as a critical cross section. The system may arrange this critical cross section at the position t=(t0+t1)/2 and use this section as if it is a key frame. Two portional surfaces are created by means of homotopy respectively between the contour on the key frame F0 and the two contours 50 and 52 on the critical cross section of the animation solid, and between the latter and the contour on the key frame F1. FIG. 46 shows the resulting created animation.

EXAMPLE 3

Two Overlapping Circles (Type 1)

FIG. 47 shows key frames F0 and F1 for the third example. The key frame F0 contains circles Oc60 and Oc62, the latter containing the former. The key frame F1 shows a single circle Oc64.

Provided that parameters are not specified at S4, so the default values are set as $N_{conn}=2$ and "a tree structure not considered." Possible corresponding contour pairs between the key frames F0 and F1 are limited to the following:

Combination 1: (Oc60, Oc64) and Oc62 spontaneously disappears

Combination 2: (Oc62, Oc64) and Oc60 spontaneously disappears.

Since the pair (Oc60, Oc64) is a closest contour pair, the combination 1 which includes this pair is selected as a corresponding contour pair.

Figure 48:
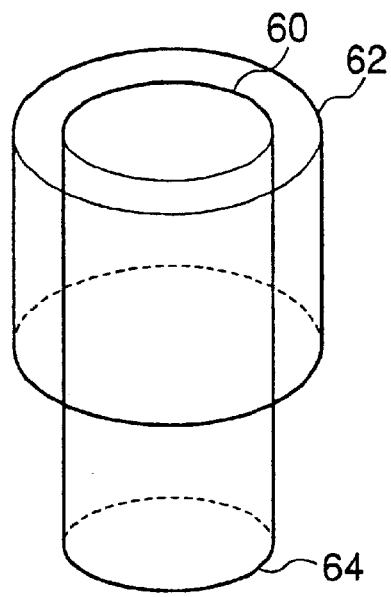
FIG. 48 shows an animation solid created in Example 3 of the second embodiment.

FIG. 48 shows a created animation solid. This animation solid consists of two imaginary solids relating to an exterior circle Oc62 and to an interior circle Oc60. Although those solids seem to overlap each other in the drawing, the system treats them as separate solids as $N_{conn}=2$ is specified. Performing intermediate dividing to the animation solid (processing not shown) will result in animation in which the exterior circuit Oc62 abruptly disappears.

EXAMPLE 4

Overlapping Two Circles (Type 2)

Figure 49:
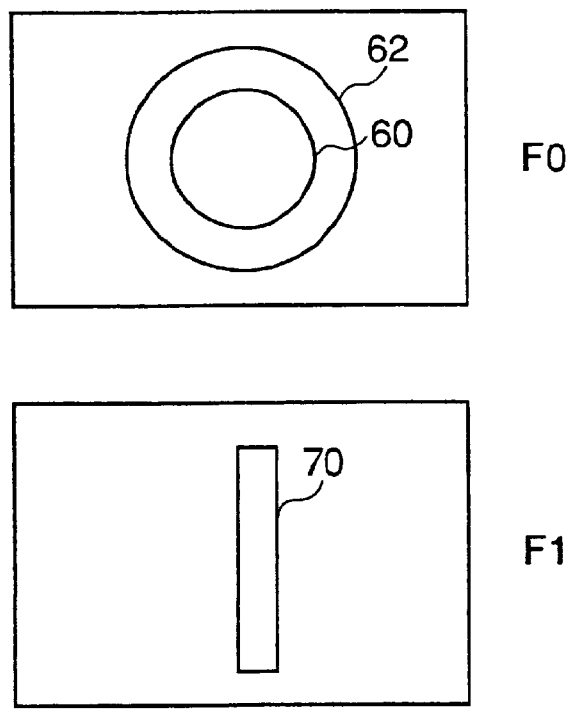
FIG. 49 shows key frames F0 and F1 in Example 4 of the second embodiment.

FIG. 49 shows key frames F0 and F1 for the fourth example. The key frame F0 is the same as that for the third example, whereas the key frame F1 is different in that it contains a single rectangular Or70. The key frame F0 may be a torus viewed from its front, whereas the key frame F1 viewed from its side, or from a different direction by 90 degrees. The user wishes in this example to create from these two key frames an animation which presents a rotating torus by 90 degrees.

If no parameters are specified at S4, similar to the third example, possible corresponding contour pairs between the key frames F0 and F1 are limited to the following:

Combination 1: (Oc60, Or70) and Oc62 spontaneously disappears.

Combination 2: (Oc62, Or70) and Oc60 spontaneously disappears.

Provided that the pair (Oc60, Or70) is determined as a closest contour pair through calculation, the obtained animation presents an image in which Oc62 suddenly disappears. This is completely different from a rotating torus. In order to solve this deficiency, the following two approaches are available.

Approach 1

The same approach as approach 1 in the second example.

Approach 2

Figure 51:
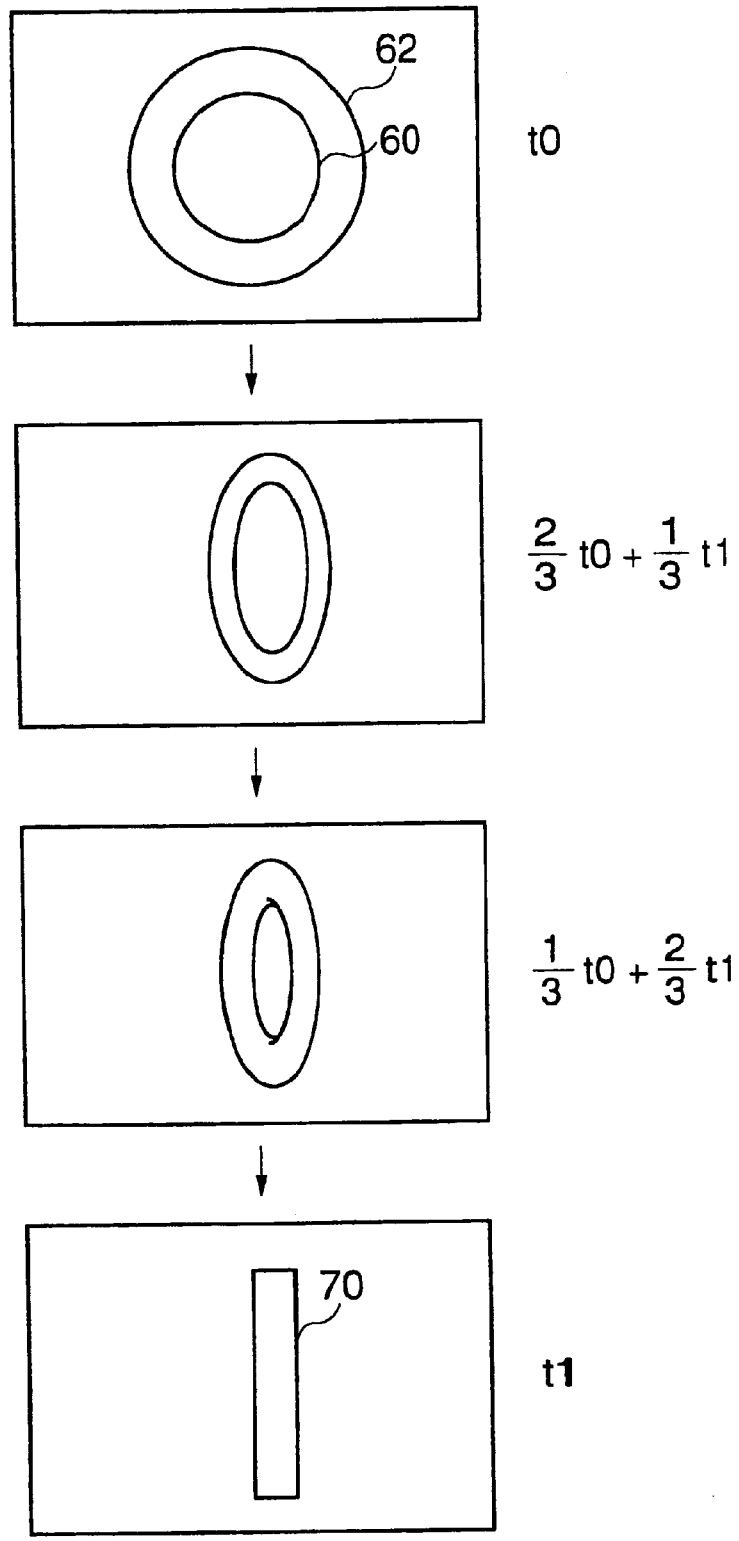
FIG. 51 shows frames of an animation created in Example 4 of the second embodiment.

The number of the connected components $N_{conn}$ is explicitly specified as 1 at S4. The created animation solid with this specification is shown in FIG. 50. In this solid, the interior circle Oc60 of the torus disappears at a ridge 72. The cross section including this ridge will serve as a critical cross section. The ultimately created animation is shown in FIG. 51. By modifying this example, animation which presents a man closing his eyes can be created. Also, by displaying these frames in reverse, the created animation will show a man opening his eyes.

Further, other approaches may be possible in this example because the circles Oc60 and Oc62 of the torus constitute a hierarchical structure.

Approach 3

"A tree structure to be considered" is explicitly specified at S4. Thus specified, the rule "a disappearing contour, if any, is the child contour at the lower end of the tree structure," is applied. Given the contours of Oc60 and Oc62 are denoted as #60 and #62, respectively, the tree structure of contours contained in the frame F0 is expressed as

0-#62-#60.

Referring to this, #60 must disappear if one of the contours is to disappear. Thus, the animated solid will be the one shown in FIG. 50. Therefore, a system may be designed, with respect to the parameters concerning the number of connected components and a tree structure, such that it performs specified processing irrespective of the other unspecified processing, when either one of these two parameters was specified. Users can specify the easier of these depending on the situation.

The fourth example differs from the third one in the point as to whether the object in the animation can exist as an actual 3D object. The animation solid of the third example (see FIG. 48) has no non-virtual existence. On the contrary, the fourth example (see FIG. 50) can exist since it is a rotating torus. For generating an extant 3D object animation, "a tree structure to be considered" may be set as system default. In this second preferred embodiment, the number of contours changes between key frames. Here, a circle was mentioned as the shape of an object. Since a circle and a polygon are homeomorphic, objects of various shapes may also be processed according to the second embodiment. Further, since the above four patterns are, in many cases, essential to even further complicated animation, the present embodiment may be applicable in a wider range.

Embodiment 3

In designing a system according to the first and second embodiments, the followings may be preferably provided as an optional function.

(1) Curve Segment Processing Function

FIG. 52 shows key frames F0 and F1: the key frame F0 shows an open curve 80 (a curved segment) having two ends 82 and 84, and the key frame F1 shows one loop 86.

Figure 53:
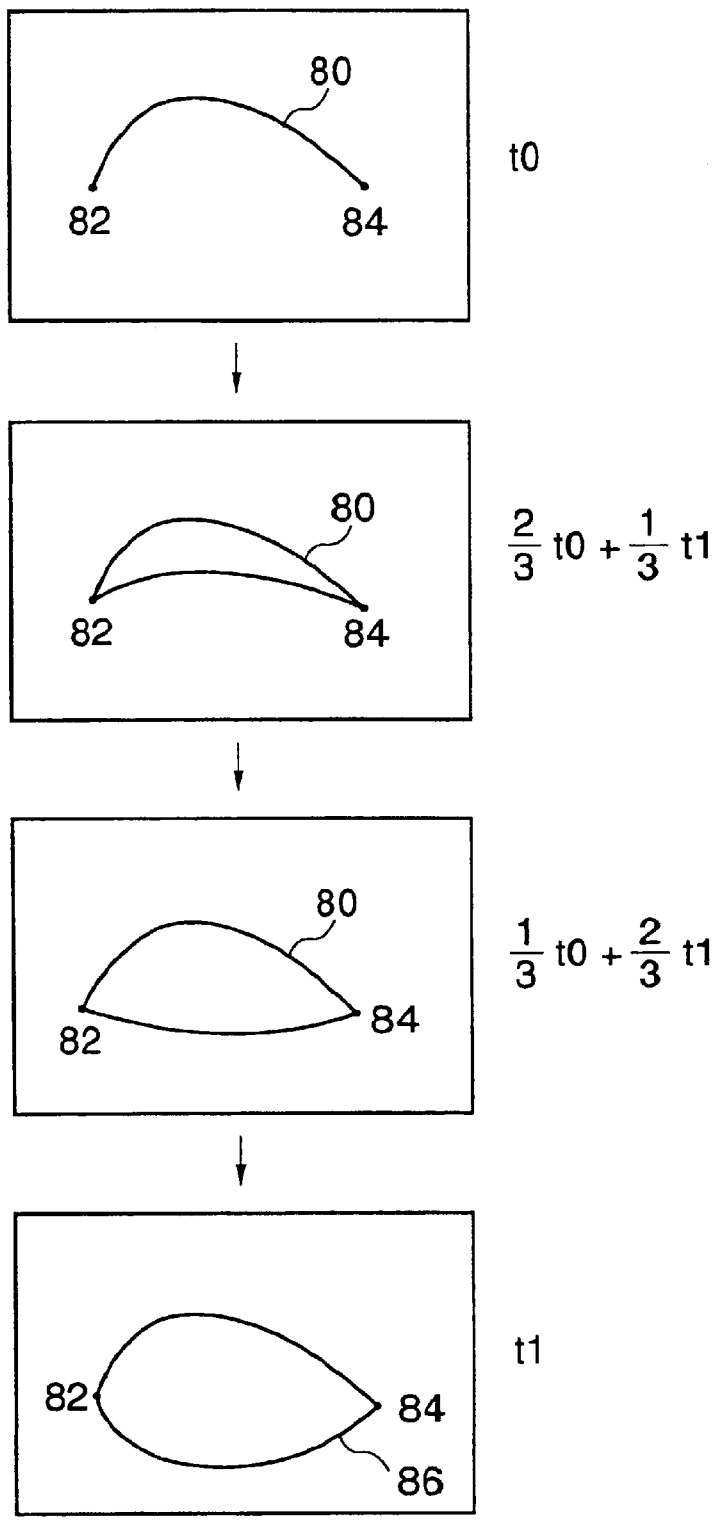
FIG. 53 shows animation creation from the key frames of FIG. 52 using techniques in Example 4 of the second embodiment.

As already mentioned, the fourth example of the second preferred embodiment is applicable in generating the animation of an opening eye. The drawing on the key frames of FIG. 52 can be interpreted as an opening eye. Thus, the animation shown in FIG. 53 can be created through the processing of the fourth example of the second embodiment.

Figure 54:
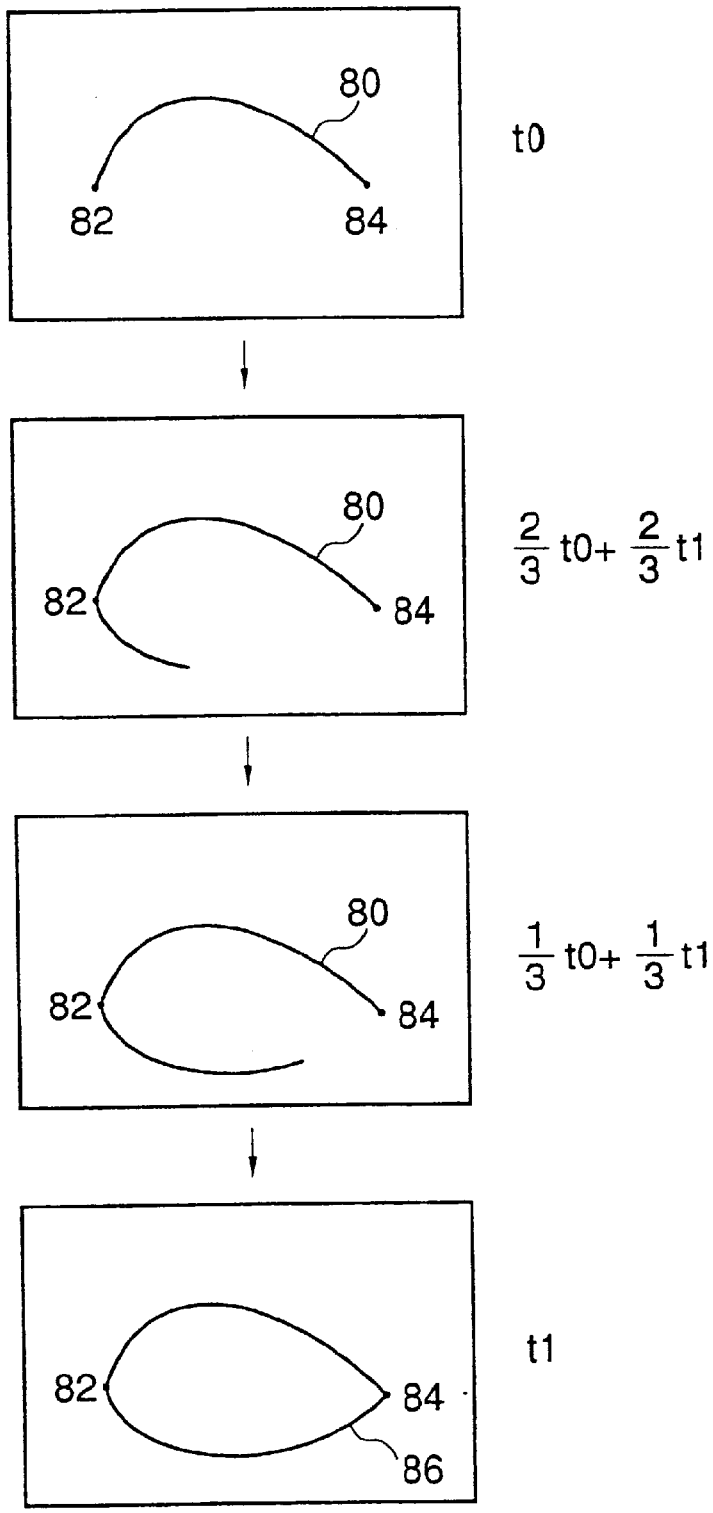
FIG. 54 shows animation creation from the key frames of FIG. 52 using the function 1 in the third embodiment.

However, the change from the key frame F0 to the key frame F1 may occur in a different way as shown in FIG. 54. That is, a curve segment may extend from one end 82 of the open segment 80 until it reaches the other end 84. For dealing with such cases as well, the system may receive an instruction to link both ends of an open curve. When a key frame includes an open curve, the system displays FIGS. 53 and 54 and a user selects one of these. Without any replay input, the system may select the animation of FIG. 53 as default and proceeds to subsequent processing.

Referring to FIG. 55, the advantage of this curve segment processing function will be described. The key frame F0 shows a mountain viewed from its side. The key frame F1 shows the same mountain viewed from its top. The image on the key frame F0 consists of two open curves, namely a slop line 90 and a snow-crown line 92. If the slop line 90 is specified as a default setting and the snow-crown line 92 is specified such that the both ends thereof is linked to each other, the created animation will be a natural animation with a changing view point from the key frame F0 to F1.

(2) Correction Function for View Point (camera eye) Movement

In cases where a camera moves or a person sees scenery in a moving train, for instance, all of the objects displayed in a screen may move in the same direction.

FIG. 56 shows two key frames F0 and F1 both of which have a rectangular Or100 and a circle Oc102. These objects move in parallel between key frames. If corresponding contour pairs are detected using a weight function from these key frames without any correction, the pair (Oc102, Or100) may be erroneously detected as a closest contour pair. This will result in an unexpected animation.

In order to solve this deficiency, the system receives a user instruction when a plurality of objects move in the same manner between key frames. If a user specifies as "a parallel movement to be considered," the system first detects motion vectors of the objects using a conventional technique, such as block matching, and then detects corresponding contour pairs after nulling the movement of the objects.

Embodiment 4

In the above embodiments 1 to 3, the present systems have been described based on the premised techniques [3] and [4]. Those systems do not expect users to be familiar with topology.

Some animation solids for relatively simple animation may be composed without any knowledge of topology. In such cases, a new system may be available based on the premised techniques [1] and [2]. In this system, a user himself creates an animation solid using icons, etc. In designing a solid using icons, topological integrity is assured to the created solids according to the premised techniques [1] and [2]. In other words, once an animation solid is created, intermediate frames which are to be created through intermediate dividing will retain topological integrity. The system introduced in this embodiment may be implemented as an optional function to the systems of the first to third embodiments.

Figure 57:
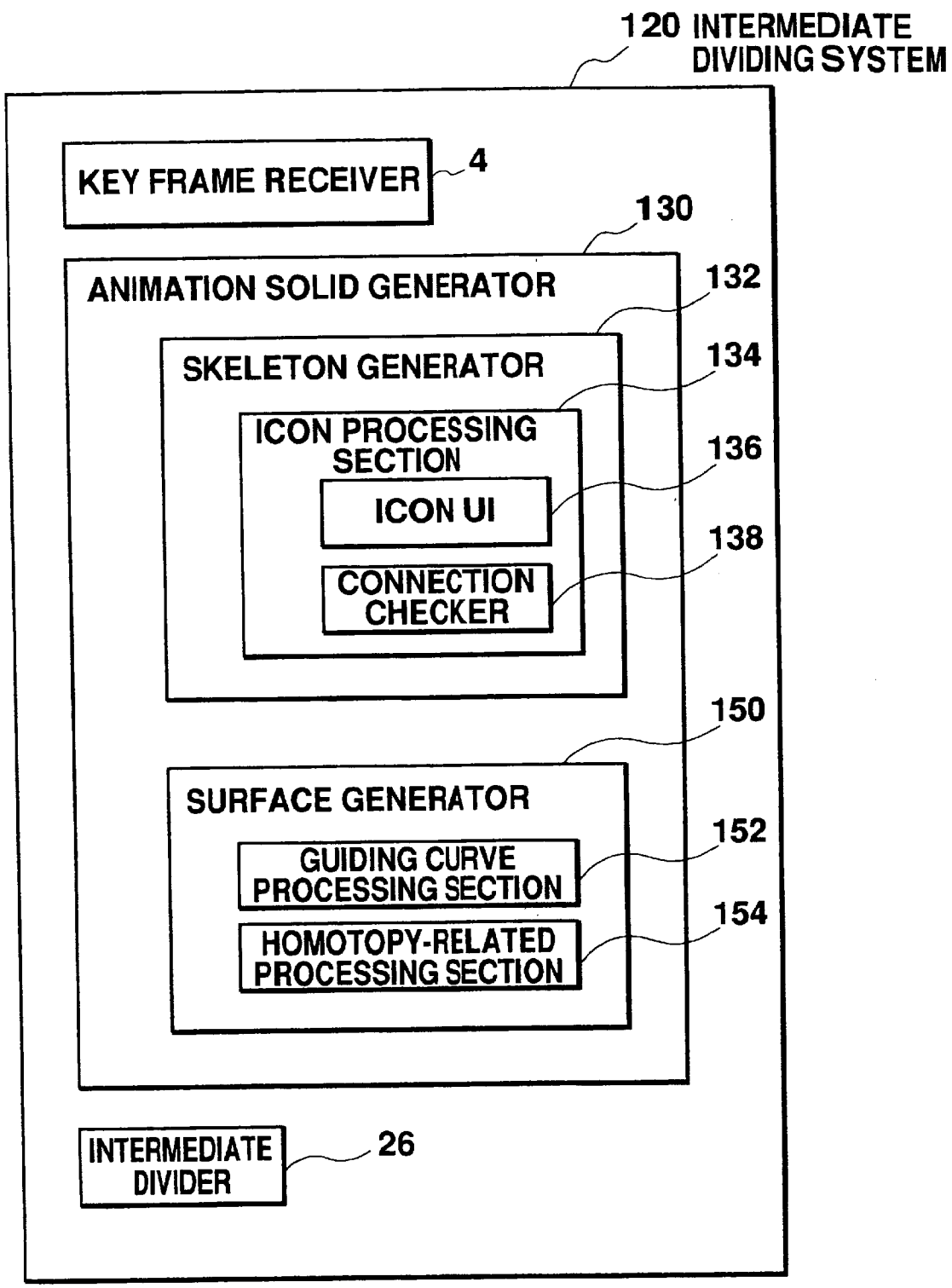
FIG. 57 is a block diagram showing a software modules for achieving the intermediate dividing system of the fourth embodiment.

FIG. 57 shows the configuration of software modules employed in an intermediate dividing system of the fourth preferred embodiment. The same members in this drawing as those in FIG. 33 are given the same reference numerals with their explanations omitted.

An animation solid generator 130 comprises a skeleton generator 132 for generating the skeleton of an animation solid and a surface generator 150 for generating a surface by pasting patches to the skeleton.

The skeleton generator 132 includes an icon processing section 134. The icon processing section 134 has an icon user interface (UI) 136 and a connection checker 138. The icon UI 136 provides icons for constructing a Reeb graph. The icon UI 136 prepares icons corresponding to K-cells or a dummy icon, and displays them to encourage users to select. A user can move necessary icons to a desired point through click and drag.

The connection checker 138 checks if icons are legally connected. For instance, the icon corresponding to the operator Put_e0 should not be given to the vertex of an animation solid. Acceptable icon sequences are all known, so the checker 138 notifies the user of an error display if an illegal sequence is detected.

The surface generator 150 includes a guiding curve processing section 152 and a homotopy-related processing section 154. The guiding curve processing section 152 receives input of a guiding curve. The premised technique [2] introduces (i) to (v) as homotopy F, wherein (v) is regarded as a guiding curve open for free specification by users. In actual implementation, however, (i) to (v) can all be considered guiding curves because they all define homotopy. If a straight line (i) is defined as a guiding line, paired corresponding points on paired corresponding contours are connected via a straight line upon specification of those points in a screen. For a cardinal spline (iv), four points must be specified to determine a spline curve. Corresponding points are specified for adjacent four contours to thereby determine a guiding curve for the region defined by the four contours. Following user specification as to corresponding point pairs, the guiding curve processing section 152 calculates a function for a concerned guiding curve.

Figure 58:
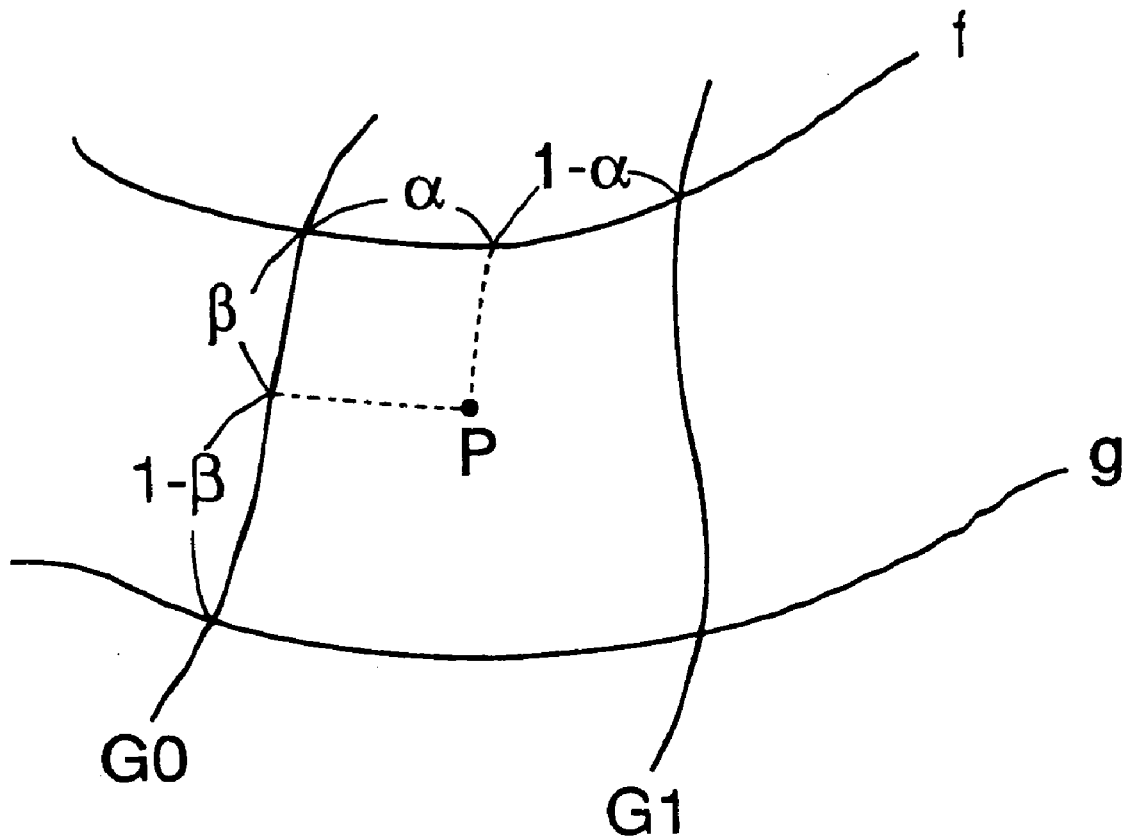
FIG. 58 is a diagram for use in explaining a method for pasting surface patches by a homotopy-related processing section.

When all of the points on one contour have corresponding points on its adjacent contour, the homotopy-related processing section 154 connects between corresponding points on the two adjacent contours as if they are linked via a fiber, as in the fist embodiment. However, when a surface is created using only the corresponding point pairs specified by the user, a surface patch is pasted for every region defined by the guiding curves adjacent to each other and the corresponding contour pair. Referring to FIG. 58, a method for pasting surface patches will be described. In the drawing, f and g are shape functions of a corresponding contour pair and G0 and G1 are those of guiding curves. The position of the point P which divides G0 and G1 at the ratio $\alpha:(1-\alpha)$ and f and g at the ratio $\beta:(1-\beta)$ can be identified as blending of curves expressed as $$(1-\beta)f+\beta g$$

and $$(1-\alpha)G0+\alpha G1.$$

An example of blending is the following:

$$(1-\beta)f(\alpha)+\beta g(\alpha)+(1-\alpha)G0(\beta)+\alpha G1(\beta)-(1-\beta)(1-\alpha)f(0)-\beta(1-\alpha)f(1)-(1-\beta)\alpha g(0)-\beta\alpha g(1).$$

In this way, the surface patch for this region can be uniquelly determined. Similar processing will be performed to other regions.

Figure 59:
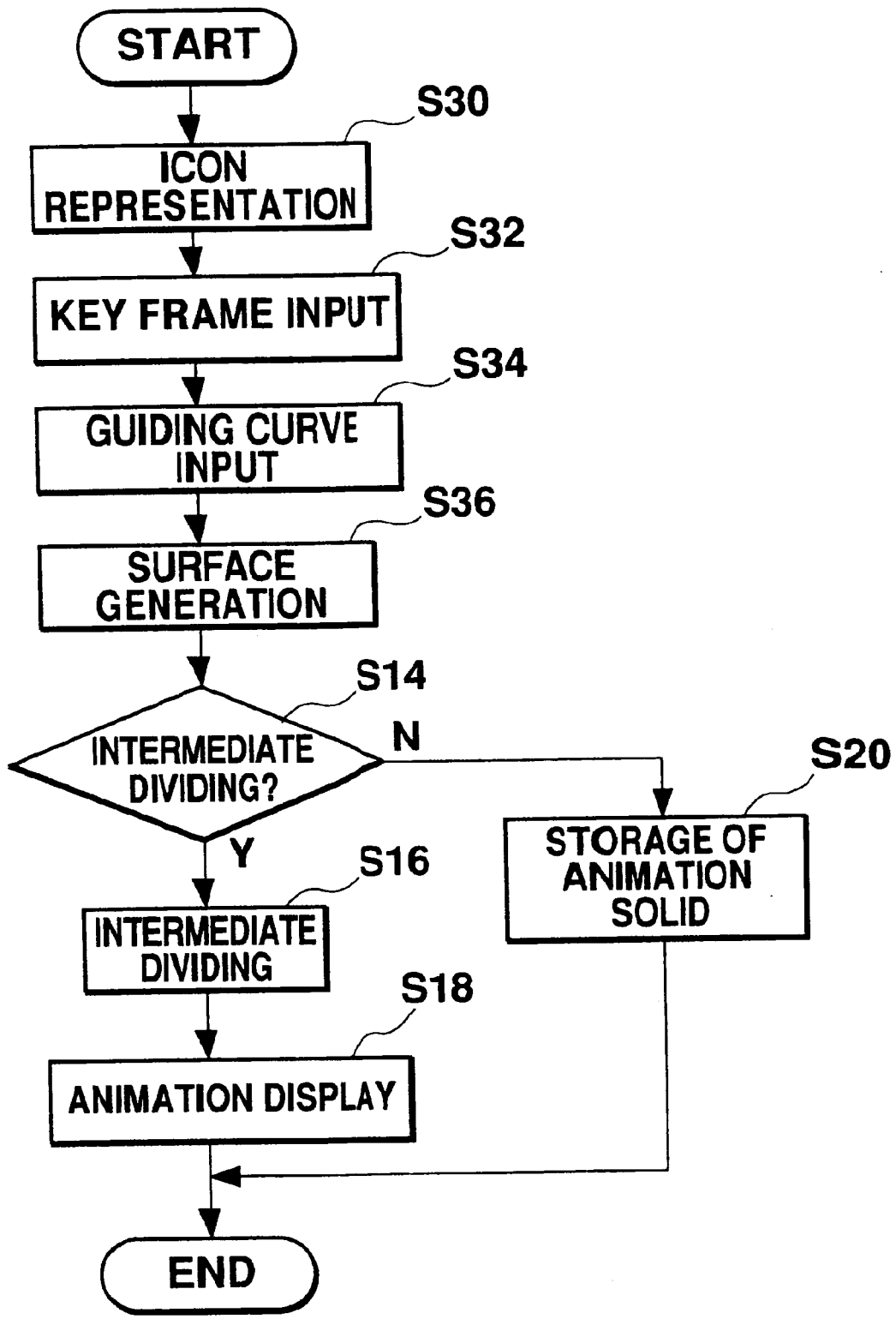
FIG. 59 is a flowchart showing an intermediate dividing procedure of the fourth embodiment.

In the following, an intermediate dividing procedure according to this embodiment will be described with reference to flowcharts in FIG. 59.

Figure 60:
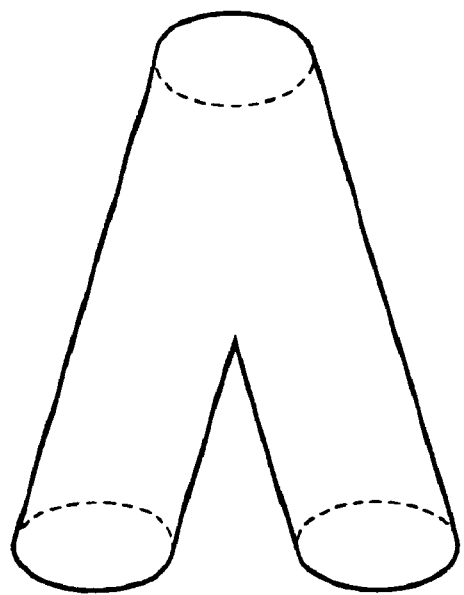
FIG. 60 shows an animation solid to be created by users in the fourth embodiment.
Figure 61:
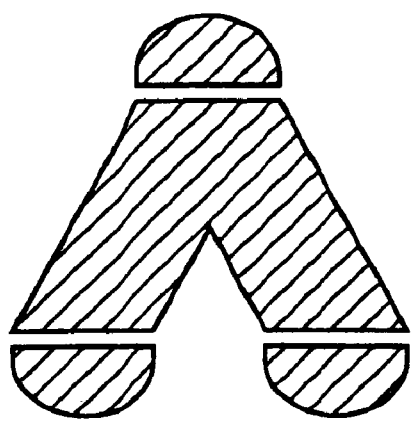
FIG. 61 shows the animation solid of FIG. 60 represented with icons.

A user first imagines an animation solid based on the animation he wishes to create and expresses that solid using icons (S30). If creation of animation of a circle branching into two circles is desired, an animation solid to be created is a bifurcating solid as shown in FIG. 60. A user inputs this solid using icons, as shown in FIG. 61. In the drawing, icons from top to bottom respectively correspond to the operators Put-e2, Put-e1-divide, and two operators Put-e0 in this sequence.

Upon completion of icon input, the system encourages the user to input key frames. In this embodiment, a critical frame in which an object changes its shape and topology with time is input as a key frame. In the example shown in FIG. 61, key frames consist of a frame corresponding to creation of an $e^2$ cell, a frame corresponding to pasting of $e^1$, and a frame corresponding to pasting of $e^0$.

Figure 62:
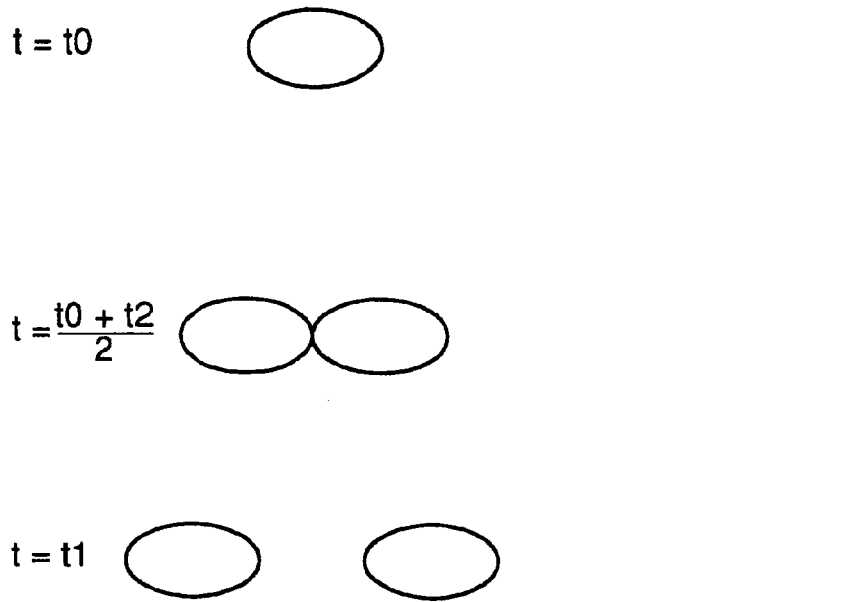
FIG. 62 shows images and positions of the key frames of the animation solid of FIG. 60.
Figure 63:
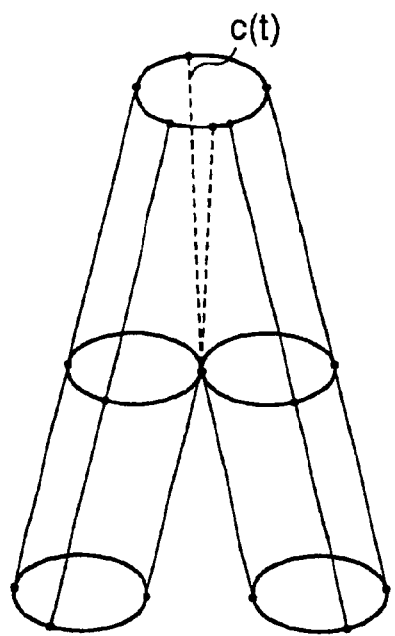
FIG. 63 shows key frames of FIG. 62 connected via guiding curves.

Responding to a system instruction, the user inputs images drawn on the three key frames at t=t0, t=(t0+t1)/2, and t=t1 (S32). FIG. 62 shows the screen display after the above input. Since the key frames at t=t0 and t=t1 correspond to a flat top and bottom, respectively, consideration for "the case of degeneracy" of the premised technique [2] may be made. The system now awaits input of a guiding curve. The user inputs a guiding curve using a mouse, etc., to let the system know the positions of corresponding point pairs on corresponding contour pairs (S34). In the example shown in FIG. 62, a path c(t) must be defined for Put-e1-divide between the positions t=t0 and t=(t0+t1)/2. This path is input together with other guiding curves. FIG. 63 shows the state after the guiding curves are all input.

Following the above, the homotopy-related processing section 154 pastes patches to thereby generate an animation solid (S36). The rest is the same as the steps after S14 in FIG. 34.

What is claimed is:

1. An animation creation method comprising:
   a key frame preparation step of preparing a plurality of key frames each containing a 2D image to become a part of a target animation; and
   a solid generation step of generating an animation solid, one axis thereof representing time, the surface thereof being generated through matching of a contour of the animation solid with a contour of the image contained in the key frames and through consideration of topology of the animation solid.

2. The method according to claim 1, further comprising an interpolation step of obtaining an image for an intermediate frame by taking a section of the animation solid that intersects the time axis.

3. The method according to claim 2, wherein the intermediate frame does not correspond to a key frame.

4. The method of claim 1, wherein the animation solid represents an illegal 3D spatial solid.

5. The method according to claim 1, wherein the solid creation step comprises:
   a corresponding contour detection step of detecting correspondence of contours between adjacent key frames based on proximity of contours of objects contained in the adjacent key frames; and
   a surface creation step of generating a surface between corresponding contours using homotopy.

6. The method according to claim 5, wherein the corresponding contour detection step deduces the occurrence of spontaneous disappearance or generation of a contour between the key frames when numbers of contours does not coincide between the key frames.

7. The method according to claim 5, wherein the corresponding contour detection step deduces spontaneously disappearing or generated contours by referring to a tree structure of contours.

8. The method according to claim 5, wherein the corresponding contour detection step comprehends branches of contours based on numbers of connected components of the animation solid.

9. The method according to claim 5, wherein the surface creation step generates a surface through detection of corresponding points on corresponding contours based on their proximity, and through connection between corresponding points with locus of homotopy.

10. The method according to claim 5, wherein the corresponding contour detection step subtracts effect due to movement of an object before detecting correspondence of contours.

11. The method according to claim 5, wherein the corresponding contour detection step displays detected corresponding contours ordered according to probability of correspondence.

12. The method according to claim 5, wherein, when a contour of an object contained in one of the adjacent key frames is an open curve and that in an other is a loop, the corresponding contour detection step verifies if the loop corresponds to an open curve having its both ends linked.

13. An animation generation method comprising obtaining an image to be included in an intermediate frame that will become a part of a target animation based on predetermined key frames by focusing on topology of an animation solid, sectional images thereof matching images included in the key frames, one axis of the animation solid representing time, and wherein the key frames and the intermediate frame correspond to respective sections of the animation solid that intersect the time axis.

14. An animation creation method, comprising:
    preparing a plurality of key frames each containing an image to become a part of a target animation; and
    generating an animation solid, one axis thereof representing time, the surface thereof being generated through matching of a contour of the solid with a contour of the images contained in the key frames and through applying homotopy which connects the contours of the solid.

15. The method according to claim 14, wherein the preparing step prepares key frames in which 2D shapes of images become non-homeomorphic with time.

16. The method according to claim 14, wherein the animation solid is a solid defined by parallel cross sections each corresponding to a key frame, having the time axis perpendicular to the cross sections, the time axis representing display time of the key frames.

17. The method of claim 14, further comprising interpolating an intermediate frame by taking a cross section of the animation solid that intersects the time axis.

18. The method according to claim 17, wherein the intermediate frame does not correspond to a key frame.

19. A recording medium storing a computer program for animation creation, wherein the program comprises:
    a key frame module that receives a plurality of key frames each containing an image to become part of a target animation;
    a solid creation module that generates an animation solid having one axis representing time, wherein the solid creation module generates a surface of the animation solid through matching of a contour of the solid with a contour of the images contained in the key frames and through consideration of topology of the solid; and
    an interpolation module that obtains an image for an intermediate frame by taking a section of the solid that intersects the time axis.

20. An animation creation system comprising:
    a transmitter for transmitting a plurality of key frames and an animation solid, said animation solid having contours that correspond with contours of an image contained in the key frames; and
    a receiver for receiving the key frames and the animation solid.

21. The system according to claim 20, wherein the animation solid has one axis representing time.

22. The system according to claim 21, wherein the animation solid includes information on corresponding contour pairs between key frames, information on corresponding point pairs on the corresponding contour pairs and homotopy combining the corresponding point pairs.

23. The system according to claim 21, further comprising an interpolation module that obtains an image for an intermediate frame by taking a section of the animation solid that intersects the time axis.

24. The system according to claim 23, wherein the intermediate frame does not correspond to a key frame.

25. An animation creation apparatus, comprising:
    a key frame preparation unit that receives a plurality of key frames each containing an image to become a part of a target animation; and an animation solid generator that generates a 3D animation solid having one axis be a time axis, wherein a surface of the animation solid is determined using contour matching of a sectional contour of the animation solid with a contour of the image contained in the key frames and using topology of the animation solid.

26. The apparatus according to claim 25, further comprising an interpolation unit that obtains an image for an intermediate frame by taking a sectional contour of the animation solid that intersects the time axis.

27. The apparatus according to claim 25, wherein the animation solid generator comprises:
   a corresponding contour detector that detects corresponding contours between adjacent key frames of the plurality of key frames based on proximity of images contained in the adjacent key frames; and
   a surface generator that generates a surface between the corresponding contours using homotopy.

* * * * *